United States Patent
Burnham et al.

(10) Patent No.: US 6,284,810 B1
(45) Date of Patent: Sep. 4, 2001

(54) METHOD AND APPARATUS FOR MICROCELLULAR POLYMER EXTRUSION

(75) Inventors: Theodore A. Burnham, Belmont; Sung W. Cha, W. Roxbury; Robert H. Walat, Boston; Roland Y. Kim, Somerville; Jere R. Anderson, Newburyport, all of MA (US); James F. Stevenson, Morristown, NJ (US); Nam P. Suh, Sudbury; Matthew Pallaver, Lexington, both of MA (US)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 09/258,625

(22) Filed: Feb. 26, 1999

(Under 37 CFR 1.47)

Related U.S. Application Data

(63) Continuation of application No. PCT/US97/15088, filed on Aug. 26, 1997, and a continuation of application No. 08/777,709, filed on Dec. 20, 1996.
(60) Provisional application No. 60/026,889, filed on Sep. 23, 1996, and provisional application No. 60/024,623, filed on Aug. 27, 1996.

(51) Int. Cl.[7] ....................................................... B29D 7/00
(52) U.S. Cl. ........................... 521/79; 264/45.9; 264/46.1
(58) Field of Search ............................. 521/79; 264/45.9, 264/46.1

(56) References Cited

U.S. PATENT DOCUMENTS

| | | |
|---|---|---|
| 3,108,148 | 10/1963 | Coyner . |
| 3,227,664 | 1/1966 | Blades et al. . |
| 3,227,784 | 1/1966 | Blades et al. . |
| 3,253,066 | 5/1966 | Hardy et al. . |
| 3,277,221 | 10/1966 | Parrish . |
| 3,343,214 | 9/1967 | Myers . |
| 3,375,211 | 3/1968 | Parrish . |
| 3,375,212 | 3/1968 | Bonner, Jr. . |
| 3,384,531 | 5/1968 | Parrish . |
| 3,406,230 | 10/1968 | Baxter et al. . |
| 3,431,164 | 3/1969 | Gilbert . |
| 3,584,090 | 6/1971 | Parrish . |
| 3,624,192 | 11/1971 | McCoy et al. . |
| 3,637,458 | 1/1972 | Parrish . |
| 3,720,572 | 3/1973 | Soda et al. . |
| 3,787,543 | 1/1974 | Parrish . |
| 3,796,779 | 3/1974 | Greenberg . |
| 3,812,225 | 5/1974 | Hosoda et al. . |
| 3,981,649 | 9/1976 | Shimano et al. . |
| 3,988,404 | 10/1976 | Orimo et al. . |
| 4,260,351 | 4/1981 | Takano et al. . |
| 4,344,710 | 8/1982 | Johnson et al. . |
| 4,344,907 | 8/1982 | Herrington . |
| 4,350,663 | 9/1982 | McAlister . |
| 4,424,287 | 1/1984 | Johnson et al. . |
| 4,436,679 | 3/1984 | Winstead . |
| 4,454,087 | 6/1984 | Hayashi et al. . |
| 4,470,938 | 9/1984 | Johnson . |
| 4,473,665 | 9/1984 | Martini-Vvedensky et al. . |
| 4,548,775 | 10/1985 | Hayashi et al. . |
| 4,728,559 | 3/1988 | Hardenbrook et al. . |
| 4,761,256 | 8/1988 | Hardenbrook et al. . |
| 4,791,144 | 12/1988 | Nagou et al. . |
| 4,873,218 | 10/1989 | Pekala . |

(List continued on next page.)

FOREIGN PATENT DOCUMENTS

| | | |
|---|---|---|
| 2501966 | 7/1975 | (DE) . |
| 9411804 | 10/1994 | (DE) . |
| 4425319 | 1/1996 | (DE) . |
| 0 039 041 A2 | 11/1981 | (EP) . |
| 0 376 064 A2 | 7/1990 | (EP) . |
| 0 411 923 A2 | 2/1991 | (EP) . |
| 0 441 762 A2 | 8/1991 | (EP) . |
| 0 453 687 A1 | 10/1991 | (EP) . |
| 0 528 536 A1 | 2/1993 | (EP) . |
| 0 707 935 A2 | 4/1996 | (EP) . |
| 0 722 975 A1 | 7/1996 | (EP) . |
| 0 799 853 | 10/1997 | (EP) . |
| 0 818 292 | 1/1998 | (EP) . |
| WO 89/00918 | 2/1989 | (WO) . |
| WO 90/07546 | 7/1990 | (WO) . |
| WO 92/17533 | 10/1992 | (WO) . |
| WO 95/24440 | 9/1995 | (WO) . |
| WO 96/00644 | 1/1996 | (WO) . |
| WO 96/16782 | 6/1996 | (WO) . |
| WO 96/34039 | 10/1996 | (WO) . |
| WO 98/08667 | 3/1998 | (WO) . |
| WO 98/31521 | 7/1998 | (WO) . |

OTHER PUBLICATIONS

Baldwin, D.F., et al. "An Extrusion System for the Processing of Microcellular Polymer Sheets: Shaping and Cell Growth Control", Cabios Computer Applications in the Biosciences, vol. 36, No. 10, May 1996, pp. 1425–1435, XP000637008.

(List continued on next page.)

Primary Examiner—Morton Foelak
(74) Attorney, Agent, or Firm—Wolf, Greenfield & Sacks, P.C.

(57) ABSTRACT

Continuous polymeric extrusion nucleation systems and methods useful for making polymeric microcellular foamed materials, including crystalline and semi-crystalline polymeric microcellular materials, are provided. Pressure drop rate is an important feature in some embodiments, and the invention provides systems for controlling these and other parameters. One aspect involves a multiple-pathway nucleator that is separated from a shaping die by a residence chamber. Another aspect involves a die for making advantageously thick articles, including a multiple-pathway nucleation section. Microcellular material can be continuously extruded onto wire, resulting in a very thin, essentially closed-cell microcellular insulating coating secured to a wire. Other very thin microcellular products can be fabricated as well.

72 Claims, 27 Drawing Sheets

U.S. PATENT DOCUMENTS

| | | |
|---|---|---|
| 4,877,815 | 10/1989 | Buckmaster et al. . |
| 4,906,672 | 3/1990 | Stone et al. . |
| 5,034,171 | 7/1991 | Kiczek et al. . |
| 5,082,608 | 1/1992 | Karabedian et al. . |
| 5,098,267 | 3/1992 | Cheng . |
| 5,110,998 | 5/1992 | Muschiatti . |
| 5,124,096 | 6/1992 | Brambilla . |
| 5,128,382 | 7/1992 | Elliott, Jr. et al. . |
| 5,158,986 | 10/1992 | Cha et al. . |
| 5,160,674 | 11/1992 | Colton et al. . |
| 5,182,307 | 1/1993 | Kumar . |
| 5,227,103 | 7/1993 | Muschiatti . |
| 5,250,577 | 10/1993 | Welsh . |
| 5,266,605 | 11/1993 | Welsh . |
| 5,286,429 | 2/1994 | Blythe et al. . |
| 5,334,356 | 8/1994 | Baldwin et al. . |
| 5,340,844 | 8/1994 | Welsh et al. . |
| 5,356,944 | 10/1994 | Blythe et al. . |
| 5,358,675 | 10/1994 | Campbell et al. . |
| 5,369,135 | 11/1994 | Campbell et al. . |
| 5,500,450 | 3/1996 | Simandl et al. . |
| 5,571,848 | 11/1996 | Mortensen et al. . |
| 5,670,102 | 9/1997 | Perman et al. . |
| 5,684,055 | 11/1997 | Kumar et al. . |
| 5,830,393 | 11/1998 | Nishikawa et al. . |
| 5,866,053 | 2/1999 | Park et al. . |
| 5,955,511 | 9/1999 | Handa et al. . |

OTHER PUBLICATIONS

Baldwin, D.F. et al., "A Processing System for the Extrusion of Microcellular Polymer Sheets: Shaping and Cell Growth Control", Cellular and Microcellular Materials, Proceedings of the 1994 International Mechanical Engineering Congress and Exposition held Nov. 1994, MD—vol. 53:85–107 (ASME 1994).

Daniel F. Baldwin et al., An Extrusion System for the Processing of Microcellular Polymer Sheets: Shaping and Cell Growth Control, May 1996, p. 1425–1435, Polymer Engineering and Science, vol.36 No. 10.

Daniel F. Baldwin et al., A Microcellular Processing Study of Poly (Ethylene Terephthalate) in the Amorphous Amorphous and Semicrystalline States. Part I: Microcell Nucleation, Jun. 1996, p. 1437–1445, Polymer Engineering and Science, vol. 36, No. 11.

Daniel F. Baldwin et al., A Microcellular Processing Study of Poly (Ethylene Terephthalate) in the Amorphous and Semicrystalline States. Part II: Cell Growth and Process Design, Jun. 1996, p. 1446–1453 1453, Polymer Engineering and Science, vol.36, No. 11.

Collias, D.J., et al. "Does a Microcellular structure Improve the Modulus of Tougheness of a Polymer Matrix?", Antec '92 pp. 1532–1535.

Durril, P.L. et al., Diffusion and Solution of Gases into Thermally Softened or Molten Polymers: Part II AIChE Journal, vol. 15, pp. 106–110, Jan., 1969.

Koros, W.J., et al., Sorption and Transport of $Co_2$ Above and Below the Glass Transition of Poly (Ethylene Terephthalate), Polymer Engineering and Science, Mid Jan., 1980, vol. 20, pp. 14–19.

Krevelen, D.W., "Permation of Polymer, The Diffusive Tranport of Gases, Vapours and Liquids in Polymers", pp 402–425, 1976.

Kumar, V., et al., "Solid–State PETG Foams", Antec '96 proceedings, pp. 1920–1924.

Kumar, V., et al., "Microcellular Pet Foams Produced by the Solid–State Process", Antec '96 proceedings, pp. 1894–1899.

LeMay, J.D. et al. "Low Density Microcellular Material", MRS Bulletin, Dec. 1990, pp. 19–45.

Park, C. B. et al., "Filamentary Extrusion of Microcellular Polymers Using a Rapid Decompressive Element" Polymer Engineering & Science, vol. 36, No. 1, Jan. 15, 1996, pp. 34–48, XP000583331.

Park, C.B. et al, "Cell Nucleation by Rapid Pressure Drop in Continuous Processing of Microcellular Plastics", Use of Plastics and Plastic Composites: Materials and Mechanics Issues, MD—vol. 46, pp. 537–552, ASME 1993.

Park, C.B. et al., "Effect Of The Pressure Drop Rate On Cell Nucleation In Continuous Processing Of Microcellular Polymers", Polymer Engineering and Science, Mid–Mar. 1995, vol. 35, No. 5, pp. 432–440.

Park, C.B. et al., "Axiomatic Design of a Microcellular Filament Extrusion System", Research in Engineering Design, 1996, pp. 166–177.

Stevenson, James F., "Polymer Processing", "Microcellular Plastics", Chapter 3, Hansen/Gardner Publications, Inc. 1996.

Baldwin, D.F., "Microcellular Polymer Processing and the Design of a Continuous Sheet Processing System", Ph.D. Thesis, M.I.T.

Park, Chul Bum, "The Role of Polymer/Gas Solutions in Continuous Processing of Microcellular Polymers", Ph.D Thesis, MIT, Aug. 10, 1993.

Martini, J. The Production and Analysis of Microcellular Foam, Master's Thesis, Mechanical Engineering, MIT, Aug., 1981, 153 pp.

Park, C.B., et al., "Effect of the Pressure Drop Rate on Cell Nucleation in Continuous Processing of Microcellular Polymers", Polymers Engineering and Science, vol. 35, No. 5, pp. 432–440, Mar. 1995.

66X  100 µm 285X  50µm

1mm

1mm 41X   500μm 40.7X   500μm 99X  100μm 184X  100μm 44.1X 500µm 30.3X 500µm 180X  100μm 65X  100μm 59X 100μm

100 μm

100 μm

METHOD AND APPARATUS FOR MICROCELLULAR POLYMER EXTRUSION

RELATED APPLICATIONS

This application commonly-owned, co-pending is a continuation of International patent application serial no. PCT/US97/15088, filed Aug. 26, 1997, which claims priority to commonly-owned, co-pending U.S. provisional patent application serial no. 60/024,623 entitled "Method and Apparatus for Microcellular Extrusion", filed Aug. 27, 1996 by Burnham, et al., to commonly-owned, co-pending U.S. provisional patent application serial no. 60/026,889, entitled "Method and Apparatus for Microcellular Extrusion", filed Sep. 23, 1996 by Kim, et al, and to commonly-owned, co-pending U.S. patent application serial no. 08/777,709, entitled "Method and Apparatus for Microcellular Extrusion", filed Dec. 20, 1996 by Kim, et al, each of which is incorporated herein by reference.

FIELD OF THE INVENTION

The present invention relates generally to polymeric foam processing, and more particularly to a continuous microcellular polymer extrusion system and method that allows control of the material density, cell density, thickness, and shape of microcellular and supermicrocellular material.

BACKGROUND OF THE INVENTION

Foamed polymeric materials are well known, and typically are produced by introducing a physical blowing agent into a molten polymeric stream, mixing the blowing agent with the polymer, and extruding the mixture into the atmosphere while shaping the mixture. Exposure to atmospheric conditions causes the blowing agent to gasify, thereby forming cells in the polymer. Under some conditions the cells can be made to remain isolated, and a closed-cell foamed material results. Under other, typically more violent foaming conditions, the cells rupture or become interconnected and an open-cell material results. As an alternative to a physical blowing agent, a chemical blowing agent can be used which undergoes chemical decomposition in the polymer material causing formation of a gas.

U.S. Pat. No. 3,796,779 (Greenberg; Mar. 12, 1976) describes injection of a gas into a flowing stream of molten plastic, and expansion to produce a foam. The described technique typically produces voids or cells within the plastic that are relatively large, for example on the order of 100 microns or greater. The number of voids or cells per unit volume of material typically is relatively low according to that technique and often the material exhibits a non-uniform distribution of cells throughout the material. Therefore, thin sheets and sheets having very smooth finishes typically cannot be made by the technique, and materials produced typically have relatively low mechanical strengths and toughness.

U.S. Pat. No. 4,548,775 (Hayashi, et al.) describes a technique involving extruding an expandable resin through a plurality of holes bored in a die and then fusing together material extruded from the holes. The technique is designed to form a high-density skin layer on the foamed material since, according to Hayashi, et al., with single-hole dies the extrudate is deformed by foaming after the material leaves the die and it is not possible to form a skin layer uniformly.

U.S. Pat. No. 3,624,192 (McCoy, et al.) disclose extrusion of thermoplastic polyaromatic resin, admixed with a nucleating agent, through a network of slits to form a foam board.

U.S. Pat. No. 3,720,572 (Soda, et al.) disclose production of "synthetic wood" defined by an elongated microporous article formed of a plurality of coalesced, foamed resin strands. Borders between the strands mimic wood grain, which is the object of the invention.

U.S. Pat. No. 4,473,665 (Martini-Vvedensky, et al.; Sep. 25, 1984) describes a process for making foamed polymer having cells less than about 100 microns in diameter. In the technique of Martini-Vvedensky, et al., a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged at pressure in supercritical fluid for a period of time, and then quickly returned to ambient conditions creating a solubility change and nucleation. In a continuous process, a polymeric sheet is extruded, then run through rollers in a container of supercritical fluid at high pressure, and then exposed quickly to ambient conditions. In another continuous process, a supercritical fluid-saturated molten polymeric stream is established. The stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

In continuous extrusion processes in general, typical goals involve high production rates (flow rates), production of material having a desired shape, size, material density and cell density, especially materials having relatively thin or thick portions, and production of materials with a highly smooth surface. In all cases, of course, it is a goal to produce material at the lowest possible cost. While conventional foam processing can operate at very high output rates, typical known continuous microcellular extrusion production rates do not approach the rates achievable with conventional processes. In conventional foam polymer processing, a desired shape, size and density of a product generally can be achieved using a conventional shaping die. However, extruding very thin material or very thick microcellular material can be difficult. With respect to thick sheets, it has been difficult or impossible to create the necessary solubility change uniformly throughout a thick product produced by extrusion to produce a thick microcellular article continuously. With respect to thin sheets, where the cell size is large relative to the thickness of the sheet, small holes in the sheet can develop where a particular cell is of a dimension larger than the thickness of a sheet. Additional control problems exist in many known thin foam sheet extrusion techniques. Accordingly, it has been a challenge to extrude thin coatings of conventional foam cellular material onto substrates such as wire. In particular, where a substrate such as wire must be isolated from moisture, if a foam material is to be used to coat the substrate then the foam should be essentially completely closed-cell material. Therefore, it has been difficult or impossible to extrude thin, closed-cell polymeric material onto wire to form a coating having acceptable electrical insulation properties under various conditions.

Traditionally, chlorofluorocarbons (CFC's), hydrochlorofluorocarbons, (HCFC's), and alkanes (butane, pentane, isopentane) have been used as blowing agents to produce foam products. These agents reportedly provided superior foaming control, as they reportedly are partially soluble in polymers, acting as plasticizers to lower the glass transition temperature (Tg) of the material, thereby reducing melt viscosity and permitting process cooling of the extruder melt as necessary to obtain foam physical characteristics such as mechanical strength, smooth foam, and unruptured cells. In part due to environmental problems associated with these agents, however, effort has been directed towards the use of low environmental impact atmospheric gases such as carbon dioxide, nitrogen, and air as blowing agents, and success has been met in some cases (see, e.g., U.S. Pat. No. 5,158,986 (Cha), above). But successful control during foaming with atmospheric gases has been more difficult to achieve than with conventional agents. Some references report that the solubility of atmospheric gases in polymers is inherently lower than conventional blowing agents, therefore Tg and melt viscosity are not reduced to the same degree, necessitating relatively higher processing temperatures when using atmospheric gases in order to maintain necessary melt flow. Higher processing and melt temperatures can produce reduced polymer melt strength as compared to similar conditions using conventional blowing agents, resulting, in many cases, in explosive cell expansion upon release of the melt to atmosphere.

In some instances, control in atmospheric gas blowing agent processes has been addressed with high temperature melt processing during the incorporation of the blowing agent, followed by melt cooling prior to extrusion and foaming to increase melt strength. In particular, several patents and publications focusing on foaming of amorphous polymers using solely carbon dioxide as blowing agent have stressed criticality of melt and/or die temperature do not exceed a particular temperature.

For example, U.S. Pat. No. 4,436,679 issued to Winstead on Mar. 13, 1984, and U.S. Pat. Nos. 5,266,605 and 5,250,577 issued to Welsh on Nov. 30, 1993 and Oct. 5, 1993, respectively, disclose cooling prior to the extrusion of amorphous polymer foams formed using solely carbon dioxide blowing agent. European Patent Application EP 0 707 935 A2 published Apr. 24, 1996 by Baumgart et al. (Assignee BASF) describes extrusion of amorphous polymeric material with a large temperature drop to control extrusion.

Due to the process and material limitations described above, and in particular temperature limitations, those of ordinary skill in the art would not expect to achieve highly-controlled, high volume microcellular processing of crystalline and semi-crystalline polymers, especially when using atmospheric gases. Crystalline and semi-crystalline polymers differ from amorphous materials in that they have a distinct crystalline melting temperature (Tm) that is much higher than their glass transition temperature. If cooled to Tm, these materials will abruptly solidify, making further processing impossible. Prior to this abrupt solidification, the melt strength of the polymer will not increase appreciably with increased cooling, as in the case of amorphous polymers, because the temperature of the polymer is necessarily so much higher than Tg. That is, crystalline and semi-crystalline polymers must be processed at temperatures well above (relative to Tg) ceiling temperature for amorphous polymers, driving cell expansion and making it extremely difficult to maintain small cell sizes.

Therefore, the production of microcellular material using atmospheric gases has focused primarily on amorphous polymers, which become viscous and flow easily at temperatures above Tg.

While the above and other reports represent several techniques associated with the manufacture of microcellular material, there is a need in the industry for a viable continuous method of producing crystalline and semi-crystalline microcellular material.

It is, therefore, an object of the invention to provide a high-throughput, continuous, microcellular or supermicrocellular polymer extrusion system effective in producing microcellular material of high quality and in any of a variety of desired thicknesses, in producing microcellular material as a coating for wire, and in producing high-quality crystalline and semi-crystalline microcellular material.

SUMMARY OF THE INVENTION

The present invention provides methods and systems for producing microcellular material, and microcellular articles. In one aspect, the invention provides a method that involves establishing a first stream of a fluid, single-phase solution of a precursor of foamed polymeric material and a blowing agent, and continuously nucleating the blowing agent mixed with the precursor by dividing the stream into separate portions and separately nucleating each of the separate portions. The separate portions can be nucleated simultaneously by, in one embodiment, diverging the first stream into at least two divided solution streams and separately nucleating each of the divided streams. The divided streams can be recombined into a single stream of nucleated, fluid polymeric material. Nucleation can be effected by subjecting each of the separate portions to conditions of solubility change, or thermodynamic instability, sufficient to create sites of nucleation in the solution in the absence of an auxiliary nucleating agent. The method can further involve shaping the recombined stream into a desired shape while lowering pressure applied to the recombined stream to a pressure allowing final foaming of the material.

In another aspect, the invention provides a method for rapidly mixing a fluid polymeric material and a fluid that is a gas under ambient conditions and that can serve as a blowing agent. The method involves introducing, into fluid polymeric material flowing at a rate of at least about 10 lbs/hr, a fluid that is a gas under ambient conditions. In a period of less than about 1 minute, a single-phase solution of the fluid and the polymer are created. The fluid is present in the solution in an amount of at least about 2% by weight based on the weight of the solution. In one embodiment, the method is carried out by injecting the fluid that is a gas under ambient conditions through at least one orifice of an extruder barrel. The method can involve injecting the fluid through at least about 100 orifices into the barrel in another embodiment, and through more orifices according to other embodiments. This aspect of the invention can find use in a variety of mixing arrangements, and finds particularly advantageous use in connection with other methods of the present invention.

In another aspect, the invention provides a method that involves maintaining in extrusion apparatus a relatively constant pressure profile in a mixture of fluid polymeric material and fluid that is a gas under ambient conditions and that can serve as a blowing agent. Specifically, the method involves providing an extruder having an inlet at an inlet end thereof designed to receive a precursor of foamed material and an outlet at an outlet end thereof designed to release foamed material from the extruder and an enclosed passageway connecting the inlet with the outlet constructed and arranged to advance a fluid polymeric stream within the passageway in a downstream direction from the inlet end toward the outlet end. The method involves establishing a stream of fluid polymeric material flowing in the extruder in a downstream direction and introducing a fluid that is a gas under ambient conditions into the stream at an injection location of the extruder. The stream is maintained, downstream of the injection location and upstream of a foaming region, under pressure varying by no more than about 1,500 psi. The extruder can include a nucleation region at which a single-phase solution of fluid polymeric material and blowing agent flowing therethrough is nucleated, and the relatively constant pressure can be maintained downstream of the injection location and upstream of the nucleation region. The fluid that is gas under ambient conditions, and that can serve as blowing agent, can be introduced into the extruder through one or more orifices, for example 4, 25, 50, or 100 or more orifices, and can be introduced therethrough simultaneously. Introduction of the gas can be carried out in an extruder barrel with a screw including flights passing each of the orifices at a rate of at least about 0.5 passes per second, or more.

In another aspect, the invention provides a method of creating very high pressure drop rates in material to be foamed. One method involves establishing a stream of a material to be foamed including a blowing agent, and continuously decreasing the pressure within successive, continuous portions of a flowing stream of the material to be foamed, the pressure continuously decreased at a rate that increases. This can involve establishing a fluid, single-phase solution of a precursor of foamed polymeric material and a blowing agent, and continuously nucleating the solution by continuously decreasing the pressure within successive, continuous portions of the flowing, single-phase stream at a rate which increases.

In another aspect, the invention involves a method involving continuously extruding microcellular material onto a wire substrate. This method can involve incorporation of all others of the methods described in accordance with the invention.

The invention also provides, according to another aspect, a method involving continuously extruding microcellular polymeric material having cells of essentially uniform size of less than about 50 microns average size from a single-phase solution of polymeric material and blowing agent. The blowing agent is present in the solution, according to the method, in an amount less than about 80% saturation concentration. The saturation concentration is determined at the lowest pressure in the system after the point of blowing agent injection but prior to the nucleating pathway of extrusion apparatus in which the method is carried out.

In another aspect, the invention provides a method including continuously extruding essentially closed-cell microcellular polymeric material having cells of essentially uniform size of less than about 50 microns average size. The polymeric material has a minimum cross-sectional dimension of less than about 0.5 mm, and is extruded from a single-phase solution of polymeric material and blowing agent.

In another aspect, the invention involves a method including continuously extruding foamed polyethylene terephthalate (PET) of I.V. less than one. Another aspect involves continuous extrusion of foamed crystalline or semicrystalline polymeric material of density less than about 8 lbs./ft$^3$. In another aspect, the method involves extruding foamed crystalline or semicrystalline polymeric material essentially free of foam-controllability modifiers.

The invention also provides a method of producing foamed material. A continuous stream of crystalline or semi-crystalline polymeric material is established, and the stream is a continuous homogeneous single-phase solution of the polymeric material and the blowing agent is formed. The homogeneous single-phase solution is subjected to a rapid pressure drop to form nucleated polymeric material, and the material is continuously extruded into a work area as microcellular polymeric material.

Also provided is a method involving establishing a continuously-flowing stream of a fluid, single-phase solution of polymeric material and blowing agent, continuously nucleating the solution and extruding and foaming the solution through a shaping die. In the method a microcellular foamed polymeric material is produced at a die temperature at least 100° F. (37.8° C.) greater than Tg of the polymeric material.

The invention provides a series of systems and forming dies, as well. In one aspect the invention provides a polymer forming die mountable on polymer extrusion apparatus. The die includes a polymer receiving end constructed and arranged to receive a fluid, non-nucleated, single-phase solution of polymeric material and blowing agent, a polymer foam extrusion end constructed and arranged to release foamed material to ambient conditions, and a fluid pathway connecting the polymer receiving end to the foam extrusion end. The pathway has length and cross-sectional dimensions that are defined as follows. When fluid polymer admixed homogeneously with about 6 wt % $CO_2$ is passed through the pathway at a rate of about 40 lbs. fluid per hour, a pressure drop rate in the fluid polymer of at least about 0.3 GPa/sec is created. The fluid pathway that creates this pressure drop can include a single channel, or at least two separate fluid channels that can, in turn, communicate with a shaping channel to shape polymeric microcellular foam material.

The invention also provides a system including a polymeric material nucleator constructed and arranged for use in combination with polymer extrusion apparatus. The nucleator includes a polymer receiving end constructed and arranged to receive a fluid, non-nucleated, single-phase solution of a polymeric material and a blowing agent, a nucleated polymer releasing end constructed and arranged to release nucleated polymeric material, and a fluid pathway connecting the receiving end to the releasing end. The pathway has length and cross-sectional dimensions that are defined as above, that is, as follows. When fluid polymer admixed homogeneously with about 6 wt % $CO_2$ is passed through the pathway at a rate of about 40 lbs. fluid per hour, a pressure drop in the fluid polymer of at least about 0.3 GPa/sec is created. The system includes, as well, a chamber for controlling the density of microcellular material released by the nucleator. The chamber has an inlet communicating with the nucleator releasing end and an outlet, and has a diameter of at least about 0.25 inch and a length to diameter ratio of at least one. The chamber is constructed and arranged to maintain polymeric material within the chamber at a pressure of at least about 150 psi. This inhibits the formation and growth of cells within the chamber.

The invention also provides polymer extrusion apparatus including a polymer nucleator having a polymer receiving end constructed and arranged to receive a fluid, non-nucleated, single-phase solution of a polymeric material and a blowing agent, a nucleated fluid releasing end, and a fluid pathway connecting the polymer receiving end to the releasing end. The athway decreases in cross-sectional dimension in a downstream direction, and the apparatus is constructed and arranged to feed a fluid, non-nucleated, single-phase solution of a polymeric material and a blowing agent to the nucleator receiving end.

In another embodiment, the invention provides a system for producing microcellular material. The system includes an extruder having an inlet end for receiving a precursor of microcellular material, an outlet designed to release microcellular material from the extruder, and an enclosed passageway connecting the inlet with the outlet. The passageway is constructed and arranged to receive a blowing agent and to contain a homogeneous, single-phase solution of the blowing agent with the precursor in a fluid state at an elevated pressure within the passageway and to advance the solution as a fluid stream within the passageway in a downstream direction from the inlet toward the outlet. The enclosed passageway includes a nucleating pathway in which a single-phase solution of blowing agent and microcellular material precursor passing therethrough can be nucleated. The extruder is adapted to receive wire and to position the wire in communication with the passageway. Another system, or this system can include a wire take-up device positioned to receive microcellular polymeric material-coated wire ejected from the system.

All of the above-described methods can, in certain embodiments, be used in conjunction with any others, and any can be used individually or in combination with any others with any of the above-described systems, or any combination of the systems. Similarly, any of the systems can be used alone, or in combination, and can be used with one or more, singly or in combination, of the above-described methods. The systems and methods are described in more detail in the detailed description of the invention below, and any of the features that can optionally be added to any of the arrangements can also be added to any others of the arrangements.

The invention also provides a series of articles. In one aspect, the invention provides a foamed material obtained by continuously introducing a blowing agent into a material comprising a crystalline or semi-crystalline polymeric material, and causing the material to take the form of the foamed material. The foamed material is in the shape of a continuous extrusion, and is microcellular. In another aspect, the invention provides an article including wire, and a coating of microcellular material around the wire, which can be of thickness as described herein with regard to very thin microcellular material. The coating is well-secured to the wire, and provides good electrical insulation. The microcellular material has a maximum thickness of less than about 0.5 mm. The material can be microcellular polyolefin and can have an average cell size of less than about 30 microns. In one embodiment, the material has a maximum cell size of about 50 microns. The material can be essentially closed-cell, and can have a moisture absorption of less than about 0.1% by weight based on the weight of the coating after immersion in water for 24 hours.

In another aspect, the invention provides an article comprising foamed PET of I.V. less than one. Another aspect involves foamed crystalline or semicrystalline polymeric material of density of less than 8 lbs./ft$^3$. Another aspect involves foamed crystalline or semicrystalline polymeric material essentially free of foam-controllability modifiers.

DETAILED DESCRIPTION OF THE INVENTION

Figure 1:
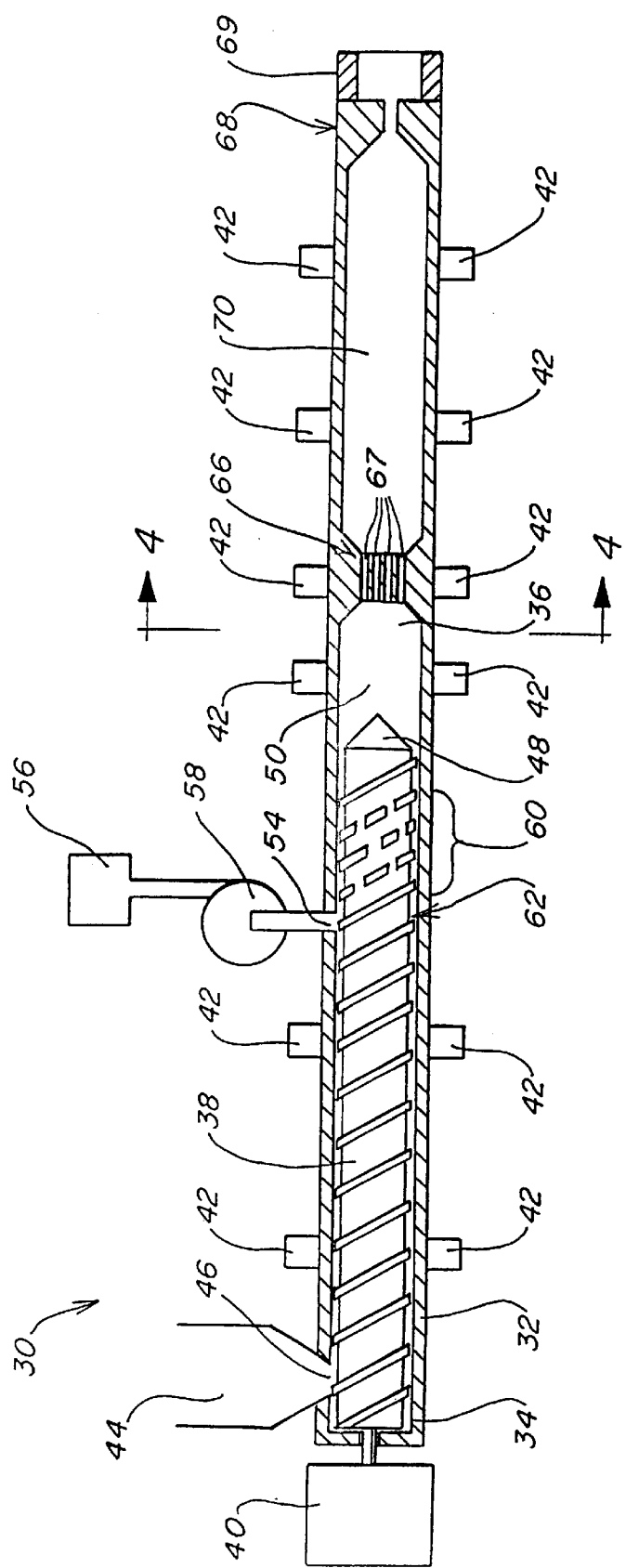
FIG. 1 illustrates an extrusion system of the invention including a multi-hole nucleator, residence chamber downstream thereof, and shaping die downstream of the residence chamber.

Commonly owned, co-pending U.S. provisional patent application serial no. 60/024,623, entitled "Method and Apparatus for Microcellular Extrusion", filed Aug. 27, 1996 by Burnham, et al., (pending), commonly-owned, co-pending U.S. provisional patent application serial no. 60/026,889 entitled "Method and Apparatus for Microcellular Extrusion", filed Sep. 23, 1996 by Kim, et al., (pending), and commonly-owned, co-pending U.S. patent application serial no. 08/777,709 entitled "Method and Apparatus for Microcellular Polymer Extrusion", filed Dec. 20, 1996 all are incorporated herein by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a multi-phase mixture in which, throughout the polymeric material, sites of aggregation of at least several molecules of blowing agent are formed. A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc.

The present invention provides a system for extruding microcellular or supermicrocellular polymeric material. The material can be extruded onto a substrate such as wire. For purposes of the present invention, microcellular material is defined as foamed material containing cells of size less than about 100 microns in diameter, or material of cell density of generally greater than at least about $10^6$ cells per cubic centimeter, or preferably both. In some embodiments, microcellular material of the invention contains cells of size less than about 50 microns in diameter, more preferably less than about 30 microns in diameter. The void fraction of microcellular material generally varies from 5% to 98%. Supermicrocellular material is defined for purposes of the invention by cell sizes smaller than 1 μm and cell densities greater than $10^{12}$ cells per cubic centimeter.

In preferred embodiments, microcellular material of the invention is produced having average cell size of less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, and more preferably still about 15 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below. In one set of preferred embodiments the void fraction of the microcellular material of the invention is as described below with reference to FIG. 14.

In one embodiment, essentially closed-cell microcellular material is produced. As used herein, "essentially closed-cell" is meant to define material that, at a thickness of about 100 microns, contains no connected cell pathway through the material.

Although not necessary for all embodiments, one set of embodiments of the invention relies upon separate nucleation of separate portions of a stream of a single-phase solution of a fluid polymeric material admixed with blowing agent. The separate portions then are recombined to form a single stream or article. In a preferred embodiment the separate portions are separately nucleated simultaneously. By dividing a stream into separate portions, separately nucleating the separate portions simultaneously, and recombining the separate portions to form a single, nucleated stream or microcellular article, much higher throughput can be achieved and thicker parts can be made because of the simultaneous nucleation and because separate nucleation of smaller quantities and recombination of the smaller quantities to form a larger quantity results in better uniformity of high-quality cells throughout a cross-section of polymer.

Separate nucleation of separate portions of a fluid stream and recombination of the stream can occur at a multiple-pathway nucleator that is positioned upstream of the shaping die of the apparatus. In this way, nucleation and shaping are separated, with separate nucleation resulting in a relatively large cross-sectional stream of a high density of nucleation, with very good uniformity, and this stream is fed to a shaping die which can make use of the large-cross-section, high-cell-density stream to shape a variety of parts. By separating nucleation from shaping, nucleation occurs in a manner free of the limitation of the shape of the fin product. The multiple-pathway nucleator can be separated from the shaping die, in this set of embodiments, by a chamber that controls the pressure and temperature of a fluid polymeric mixture within the chamber. Thus, the density of the material, and cell density, can be controlled. To facilitate recombination of the separate portions, a mixer, such as a static mixer, can be positioned downstream of the nucleator, optionally in chamber 70, described below.

Separation of nucleation from shaping can be carried out with single-hole nucleators or other nucleators that do not include multiple pathways, while realizing advantages of the technique.

In another set of embodiments, nucleation and shaping occur in the same general area, namely, at a nucleating shaping die, and the nucleating shaping die can include a plurality of a separate nucleating pathways, that is, can defme a multiple-pathway nucleating die, which can allow higher throughput and thicker parts than are achievable typically in prior art techniques.

Referring to FIG. 1, an extrusion system 30 according to one embodiment of the invention is illustrated schematically. Extrusion system 30 includes a barrel 32 having a first, upstream end 34 and a second, downstream end 36. Mounted for rotation within barrel 32 is an extrusion screw 38 operably connected, at its upstream end, to a drive motor 40. Although not shown in detail, extrusion screw 38 includes feed, transition, gas injection, mixing, and metering sections.

Positioned along extrusion barrel 32, optionally, are temperature control units 42. Control units 42 can be electrical heaters, can include passageways for temperature control fluid, or the like. Units 42 can be used to heat a stream of pelletized or fluid polymeric material within the extrusion barrel to facilitate melting, and/or to cool the stream to control viscosity, skin formation and, in some cases, blowing agent solubility. The temperature control units can operate differently at different locations along the barrel, that is, to heat at one or more locations, and to cool at one or more different locations. Any number of temperature control units can be provided.

Extrusion barrel 32 is constructed and arranged to receive a precursor of a fluid polymeric material. Amorphous, semicrystalline, and crystalline material including styrenic polymers, polyolefins such as polyethylene and polypropylene, fluoropolymers, crosslinkable polyolefins, polyamides, polyaromatics such as polystyrene and polyvinyl chloride can be used. Typically, this involves a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. When chemical blowing agents are used, they typically are compounded in polymer pellets introduced into hopper 44.

Immediately downstream of the downstream end 48 of screw 38 in FIG. 1 is a region 50 which can be a temperature adjustment and control region, auxiliary mixing region, auxiliary pumping region, or the like. For example, region 50 can include temperature control units to adjust the temperature of a fluid polymeric stream prior to nucleation, as described below. Region 50 can include instead, or in addition, standard mixing units (not shown), or a flow-control unit such as a gear pump (not shown). In another embodiment, region 50 is replaced by a second screw of a tandem extrusion apparatus, the second screw optionally including a cooling region.

When a physical blowing agent is used, along barrel 32 of system 30 is a port 54 in fluid communication with a source 56 of a physical blowing agent. (This apparatus is not required when a chemical blowing agent alone is used). Any of a wide variety of blowing agents known to those of ordinary skill in the art such as hydrocarbons, chlorofluorocarbons, nitrogen, carbon dioxide, and the like can be used in connection with this embodiment of the invention and, according to a preferred embodiment, source 56 provides carbon dioxide as a blowing agent. A pressure and metering device 58 typically is provided between blowing agent source 56 and port 54. Supercritical fluid blowing agents are especially preferred, in particular supercritical carbon dioxide.

Any of a wide variety of blowing agents can be used in connection with the present invention, for example, physical blowing agents and chemical blowing agents. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide. Where a chemical blowing agent is used, the blowing agents can be introduced into systems of a invention by being compounded within polymer pellets feed into the system, or other techniques available to those of ordinary skill in the art.

Device 58 can be used to meter the blowing agent so as to control the amount of the blowing agent in the polymeric stream within the extruder to maintain a level of blowing agent at a level, according to one set of embodiments, between about 1% and 15% by weight, preferably between about 3% and 12% by weight, more preferably between about 5% and 10% by weight, more preferably still between about 7% and 9% by weight, based on the weight of the polymeric stream and blowing agent. In another set of embodiments, described below, it is preferred that lower levels of blowing agent be used. As will become apparent to the reader, different levels of blowing agent are desirable under different conditions and/or for different purposes which can be selected in accordance with the invention.

The pressure and metering device can be connected to a controller (not shown) that also is connected to drive motor 40 and/or a drive mechanism of a gear pump (not shown) to control metering of blowing agent in relationship to flow of polymeric material to very precisely control the weight percent blowing agent in the fluid polymeric mixture.

Although port 54 can be located at any of a variety of locations along the extruder barrel, according to a preferred embodiment it is located just upstream from a mixing section 60 of the extrusion screw and at a location 62 of the screw where the screw includes unbroken flights.

Figure 2:
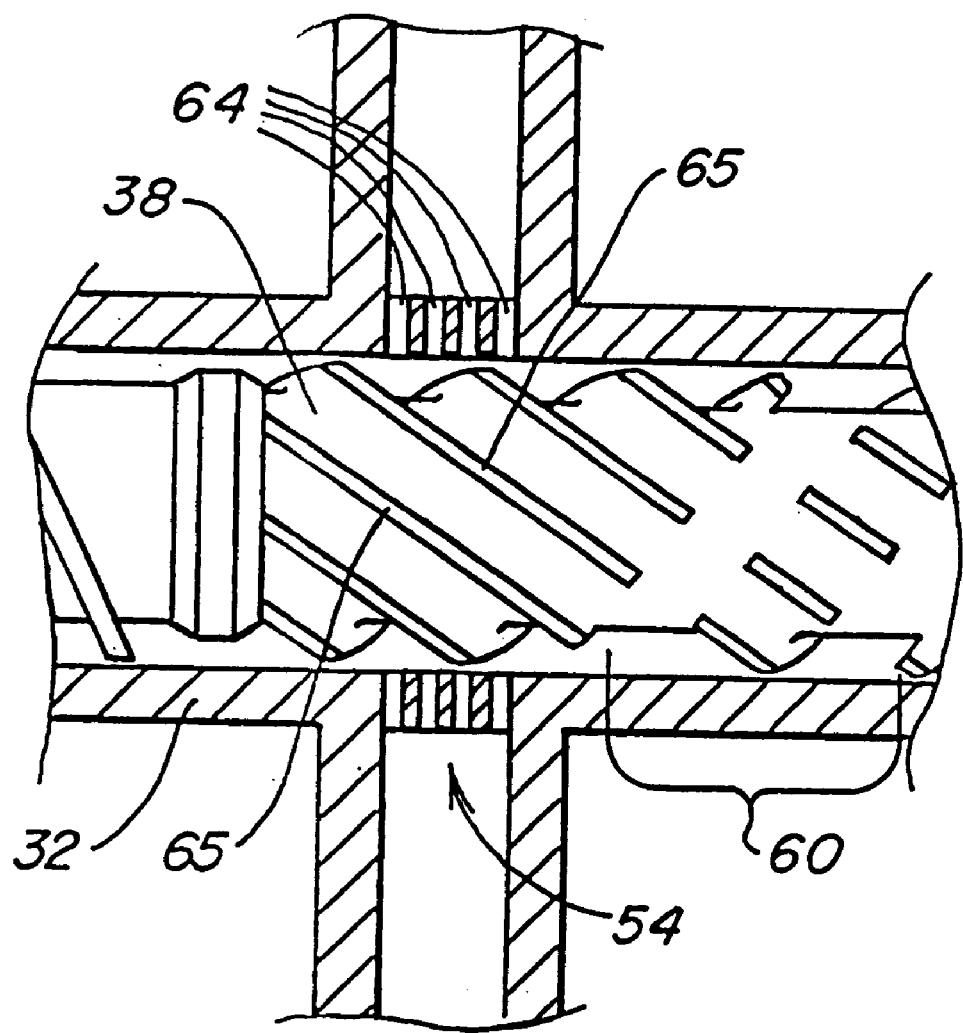
FIG. 2 illustrates a multi-hole blowing agent feed orifice arrangement and extrusion screw.

Referring now to FIG. 2, a preferred embodiment of the blowing agent port is illustrated in greater detail and, in addition, two ports on opposing top and bottom sides of the barrel are shown. In this preferred embodiment, port 54 is located at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to quickly produce a single-phase solution of the foamed material precursor and the blowing agent.

Port 54, in the preferred embodiment illustrated, is a multi-hole port including a plurality of orifices 64 connecting the blowing agent source with the extruder barrel. As shown, in preferred embodiments a plurality of ports 54 are provided about the extruder barrel at various positions radially and can be in alignment longitudinally with each other. For example, a plurality of ports 54 can be placed at the 12 o'clock, 3 o'clock, 6 o'clock, and 9 o'clock positions about the extruder barrel, each including multiple orifices 64. In this manner, where each orifice 64 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 2) in which the blowing agent orifice or orifices are positioned along the extruder barrel at a location where, when a preferred screw is mounted in the barrel, the orifice or orifices are adjacent full, unbroken flights 65. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 54 are positioned at a distance of from about 15 to about 30 barrel diameters from the beginning of the screw (at upstream end 34).

The described arrangement facilitates a method of the invention that is practiced according to one set of embodiments. The method involves introducing, into fluid polymeric material flowing at a rate of at least about 40 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.5% by weight based on the weight of the solution in this arrangement. In preferred embodiments, the rate of flow of the fluid polymeric material is at least about 60 lbs/hr., more preferably at least about 80 lbs/hr., and in a particularly preferred embodiment greater than at least about 100 lbs/hr., and the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

Returning again to the embodiment illustrated in FIG. 1, a system is provided that can produce microcellular or supermicrocellular product having very small cell size, high cell density, and controlled cell density, in articles having very small cross-sectional dimension or very large cross-sectional dimensions by separating nucleation from shaping. This involves, according to the embodiment of FIG. 1, a nucleator 66 located far enough downstream of blowing agent injection port 54 that it will receive a fluid, single-phase solution of the polymeric precursor of the microcellular material and the blowing agent, and a shaping die 68 located downstream of nucleator 66. In the preferred embodiment illustrated, nucleator 66 is a multiple-pathway nucleator including a plurality of separate nucleating pathways 67, each fluidly connecting the region of the extrusion barrel upstream of the nucleator with the region of the extruder downstream thereof.

As used herein, "nucleating pathway" is meant to define a pathway that forms part of microcellular polymer foam extrusion apparatus and in which, under conditions in which the apparatus is designed to operate (typically at pressures of from about 1500 to about 5000 psi upstream of the nucleator and at flow rates of greater than about 10 lbs polymeric material per hour), the pressure of a single-phase solution of polymeric material admixed with blowing agent in the system drops below the saturation pressure for the particular blowing agent concentration at a rate or rates facilitating nucleation. A nucleating pathway defines, optionally with other nucleating pathways, a nucleation or nucleating region of an extruder. While a multiple-pathway nucleator is preferred in some embodiments, one aspect of the invention involves in its broadest sense the separation of nucleation and shaping, and in this aspect any arrangement can serve as a nucleator that subjects a flowing stream of a single-phase solution of foamed material precursor and blowing agent to a solubility change sufficient to nucleate the blowing agent. This solubility change can involve a rapid temperature change, a rapid pressure change, or a combination, and those of ordinary skill in the art will recognize a variety of arrangements for achieving nucleation in this manner.

Where a rapid temperature change is selected to achieve nucleation, temperature control units can be provided about nucleator 66. Nucleation by temperature control is described in U.S. Pat. No. 5,158,986 (Cha., et al.) incorporated herein by reference. Temperature control units can be used alone or in combination with a fluid pathway of nucleator 66 creating a high pressure drop rate in fluid polymeric material flowing therethrough.

As discussed above, separation of nucleation from shaping allows a large fluid stream of highly-nucleated, highly-uniform polymeric material to be fed to a die. Separation of nucleation from shaping also is advantageous in that shaping need not involve nucleation. Prevalent in the prior art is the assumption that control in foaming material via pressure drop is a challenge due to the fact that release of a fluid mixture of blowing agent and polymeric material from pressure in which the blowing agent is fluid into ambient conditions (typical of foam processing) can result in violent expansion of the blowing agent and the creation of open-cell material. While creation of open-cell material is desirable for a variety of products, it is often a goal to create closed-cell material and closed-cell, microcellular material is preferred in the present invention. Difficulty in control can be exacerbated by the fact that maintaining a fluid mixture of blowing agent and polymeric material prior to foaming often is accomplished by maintaining the mixture at a temperature above the melt temperature of the polymer, and at very high pressures. Rapid transferral from high-pressure, high-temperature conditions to ambient conditions is difficult to accomplish controllably. Even if a rapid pressure drop is accomplished, if the transfer to ambient temperature does not take place quickly, cells may continue to expand undesirably.

Therefore, the shaping die 68 and nucleator 66 of the invention can be separated from each other by a distance sufficient to allow conditions to be controlled such that shaping can be accomplished controllably. That is, the pressure and temperature conditions downstream of the nucleator need not be as severe as those upstream, where it is necessary to maintain a single-phase solution, so that high density nucleation can be achieved. A residence chamber 70 is positioned between nucleator 66 and shaping die 68 to control conditions of temperature and, where desired, pressure. Of course, if no pressure-control devices are provided within the chamber, pressure will drop naturally to some extent via flow through the chamber. Preferably, the residence chamber has an outer wall addressed by one or more temperature control units 42. Although not illustrated, temperature control units 42 can include fluid pathways through which a temperature control fluid, such as a cooling fluid, can be passed. Chamber 70 can be of any cross-sectional shape, and can be annular.

Chamber 70 has several functions, including recombining streams of nucleated material as they emerge from a multiple-pathway nucleator, and controlling the cell growth of the nucleated material by varying the length of time that it remains in the chamber ("residence time") and by varying the external pressure and temperature within the chamber. The chamber may contain mixing elements, such as a static mixer, to combine nucleated streams and provide a more uniform temperature or blowing agent concentration. The cooling function of the chamber can be used to form a skin on the exterior of the polymer. The degree of cell growth is a function of residence time, external pressure and temperature of polymer melt. Preferred chambers of the invention are designed with varying lengths to allow residence times of up to about 1.5 minutes, although residence times of at least about 10 seconds, 20 seconds, 40 seconds, 1 minute, or 1.25 minutes can be used.

By cooling a nucleated fluid mixture of polymeric material and blowing agent within chamber 70, shaping can occur with less simultaneous expansion. That is, expansion of cells can occur within the residence chamber in a controlled manner and then, with the fluid mixture of polymeric material and very small cells at a temperature high enough to allow shaping, the mixture can be passed through shaping die 68 and formed into a final product.

Also illustrated in FIG. 1 is an optional shaping element 69 downstream of shaping die 68. Shaping element 69 can provide further control over the thickness or shape of an extruded product by restricting expansion, further cooling the extrudate (via, for example, fluid cooling channels or other temperature control units in element 69, not shown), or a combination. Without element 69, extrudate is extruded into ambient conditions upon emergence from shaping die 68 (restricted only by polymeric extrudate downstream of the exit of the shaping die). With element 69, the extrudate generally emerges from shaping die into conditions of pressure slightly above ambient.

With reference to FIG. 1, several arrangements of the invention are described. In one, polymeric extrudate emerges from nucleating pathways into ambient conditions and is recombined there. This would involved elimination of components downstream of nucleator 66, and is described below with reference to FIGS. 3 and 5 with the exception that the arrangements of FIGS. 3 and 5 include regions downstream of the nucleator that provide enclosure and shaping for the extrudate. In another arrangement, only forming element 69 exists downstream of the nucleator (analogous to the embodiments of FIGS. 3 and 5). In another, the system includes nucleator 66, an enclosure downstream thereof (chamber 70) and a constriction at the end of the chamber (forming die 68). In still another, the system includes nucleator 66, chamber 70, forming die 68, and forming element 69, as illustrated in the complete system of FIG. 1. Described another way, the invention includes one or more constrictions constructed and arranged to define nucleating pathway(s) and one or more constrictions upstream and/or downstream of the nucleating pathway(s) that each optionally include temperature control and/or shaping capability.

Very thin product, such as sheet, can be made by controlling cell growth such that very small cells result and the cells are well-contained within the sheet (the cells do not create holes across the sheet), and very thick material can be produced (especially with a multi-hole nucleator) because controlled-growth cells are evenly distributed within residence chamber 70 just upstream of shaping die 68. In contrast, where in typical prior art microcellular processes the entire microcellular foaming process occurs at the shaping die, it has been difficult to produce thick material since rapid nucleation and cell growth in a single step typically cannot be made to occur uniformly throughout a large cross-section of material, and pressure drop rates sufficient to cause nucleation are difficult to achieve through nucleators of large cross sectional dimension.

In a preferred embodiment, nucleator 66 has a polymer receiving end in fluid communication with the extrusion barrel, constructed and arranged to receive a fluid, non-nucleated, single-phase solution of polymeric material and blowing agent supplied by the barrel. The nucleator includes a nucleated polymer releasing end in communication with residence chamber 70 constructed and arranged to contain nucleated polymeric material under conditions controlling cell growth, and a fluid pathway connecting the receiving end to the releasing end. The fluid pathway of the nucleator has length and cross-sectional dimensions creating a desired pressure drop rate through the pathway. In one set of embodiments, the pressure drop rate is relatively high, and a wide range of pressure drop rates are achievable. A pressure drop rate can be created, through the pathway, of at least about 0.1 GPa/sec in molten polymeric material admixed homogeneously with about 6 wt % $CO_2$ passing through the pathway of a rate of about 40 pounds fluid per hour. Preferably, the dimensions create a pressure drop rate through the pathway of at least about 0.3 GPa/sec under these conditions, more preferably at least about 1 GPa/sec, more preferably at least about 3 GPa/sec, more preferably at least about 5 GPa/sec, and more preferably still at least about 7,10, or 15 Gpa/sec.

The nucleator is particularly suitable for producing material at high throughput. Residence chamber 70 has a smallest cross-sectional dimension (i.e. diameter with a circular cross section, or cross section of an annular pathway, etc.) about 0.25 inch in one set of embodiments, about 0.4 inch in another set of embodiments, about 0.6 inch in another set of embodiments, about 0.8 inch in another set of embodiments, and about 1.0 inch in another set of embodiments. Chamber 70 has a length to diameter ratio of at least about 1, preferably at least about 2, and more preferably at least about 3. Preferably, the length to diameter ratio is at least 10, preferably 20, more preferably 40. Chamber 70 is constructed and arranged to maintain polymeric material within the chamber at a pressure of at least about 150 psi, preferably at least about 500 psi. Thus, the residence chamber should include a combination of one or more of temperature control, outlet orifice size, cross-sectional diameter, and length to control pressure accordingly.

Figure 3:
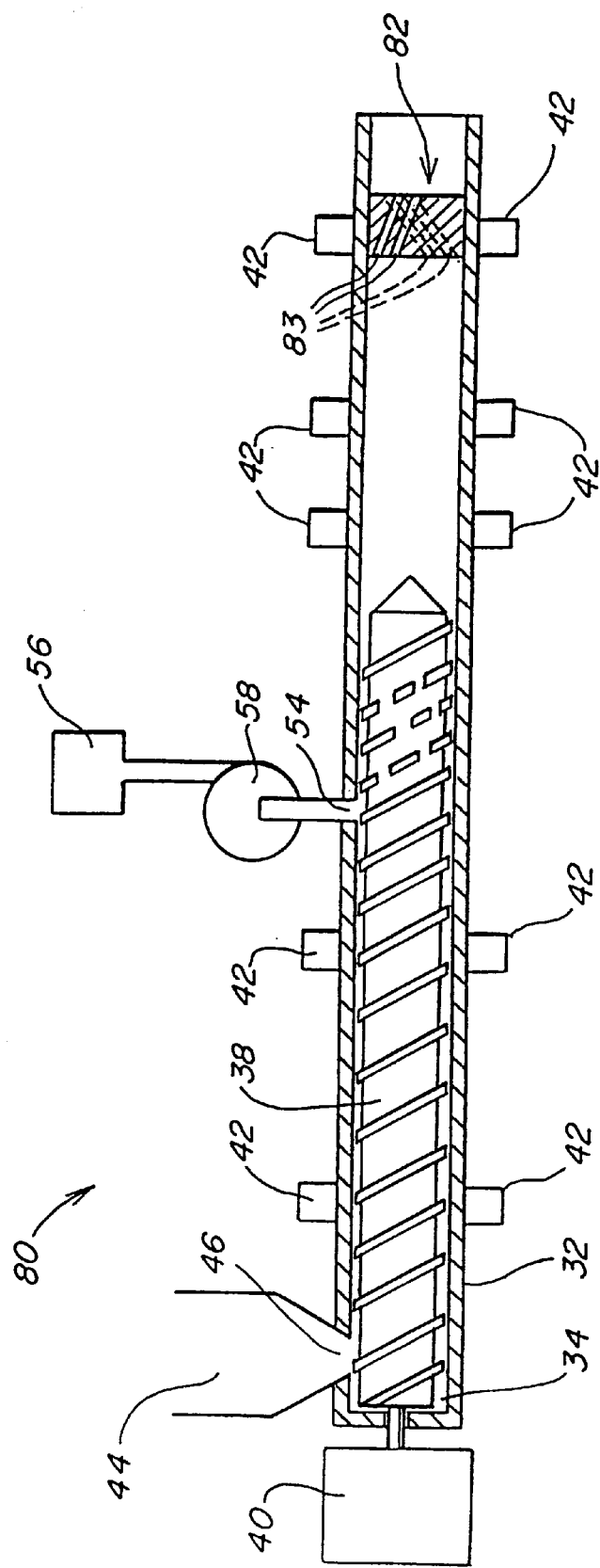
FIG. 3 illustrates an extrusion system of the invention including a multi-passage nucleating and shaping die.

Referring now to FIG. 3, an extruder system 80 is illustrated which is similar to extruder system 30 with the exception that it does not include a nucleator 66 separate from a shaping die, but includes a unique shaping die 82 of the invention which allows rapid nucleation and controlled cell growth to produce high-quality microcellular or supermicrocellular material. System 80 includes, generally, components similar to those of system 30, but shaping die 82 of the invention is a multiple-pathway die that includes separate nucleating pathways 83 into which a single-phase solution of polymeric material and blowing agent is introduced. Each nucleating pathway is arranged to provide a pressure drop rate in the material sufficient to cause nucleation, and nucleated product emerging from the nucleating pathways is recombined to form a microcellular or supermicrocellular product having dimensions unachievable, or difficult to achieve, without compromising cell size, density, or other aspects, in the prior art.

Thus, in the preferred embodiment of system 30 in which nucleator 66 is a multi-hole nucleator, and in the embodiment of system 80, including shaping die 82, each of the nucleator 66 and nucleating shaping die 82 includes at least two separate nucleating pathways each constructed and arranged to receive a fluid, single-phase solution of a polymeric material and non-nucleated blowing agent, each pathway constructed and arranged to create a pressure drop rate of at least about 0.1, 1, 3, 5, 7, 10, or 15 GPa/sec in molten polymeric material, or other higher pressure drop rates described above, when the molten polymeric material is admixed homogeneously with about 6 wt % $CO_2$ passing through the pathway at a rate of about 40 pounds fluid per hour. These conditions of percent $CO_2$ and flow rate are definitive of the construction of the nucleating pathways, and are not intended to be limiting with respect to particular flow rates and/or blowing agent concentrations to be used in accordance with the invention. The nucleating pathways are constructed, according to a variety of embodiments, to provide the above-noted pressure drop rates in solutions of fluid polymer and blowing agent according to other flow rates and/or blowing agent concentrations described herein.

A more detailed description of these fluid passageways is provided below, and any description applied to either of nucleator 66 or die 82 can be applied to the other. Thus, each of nucleator 66 according to the preferred embodiment and die 82 continuously nucleates blowing agent admixed with material to be foamed by dividing a fluid stream containing the material and blowing agent into separate portions and separately nucleating each of the separate portions. Die 82 is constructed and arranged to release foamed material to a channel exposed, without further constriction, to ambient conditions in the embodiment illustrated.

The nucleator and/or nucleating capacity of the die of the invention facilitates one aspect of the invention which involves extrusion apparatus constructed and arranged to nucleate a fluid, single-phase solution of a polymeric material and a blowing agent without the necessity of an auxiliary nucleating agent such as talc. In conventional foaming techniques, a nucleating agent such as talc can be used to create sites of nucleation. In such techniques, the limited number of nucleating agent particles and resulting low cell density and cell size are unacceptable in many applications, such as wire applications, involving very thin coatings. Auxiliary nucleating agents can also, for example, attenuate a signal in a wire via introduction of impurities. This is not to say that impurities, and additives commonly added in polymeric extrusion such as flame retardants, which can instigate nucleation, are excluded from mixtures to be extruded in the invention. Indeed, auxiliary nucleating agents can be added to formulations of the invention according to some embodiments. But in many embodiments nucleation can be made to occur without auxiliary nucleating agents.

The nucleator 66 and die 82 are designed to restrict a stream of blowing agent-containing polymeric material in order to create a high pressure drop rate required for cell nucleation, and can be made by forming a plurality of apertures in the face of a disc or, alternatively, from a porous material comprising a plurality of apertures. The dimensions and quantity of the plurality of apertures can be varied to achieve varying magnitudes of pressure drop, pressure drop rates, and polymer melt shear rates. The magnitude of the pressure drop can be varied by changing the aperture length. The rate at which the pressure drops can be varied by changing the number of apertures. The shear rate of the polymer melt can be varied by changing the cross-sectional dimension of the apertures. Since the magnitude of the solubility change required varies with the polymer type, temperature, and flow rate, different nucleators can be designed for different process applications.

Figure 4:
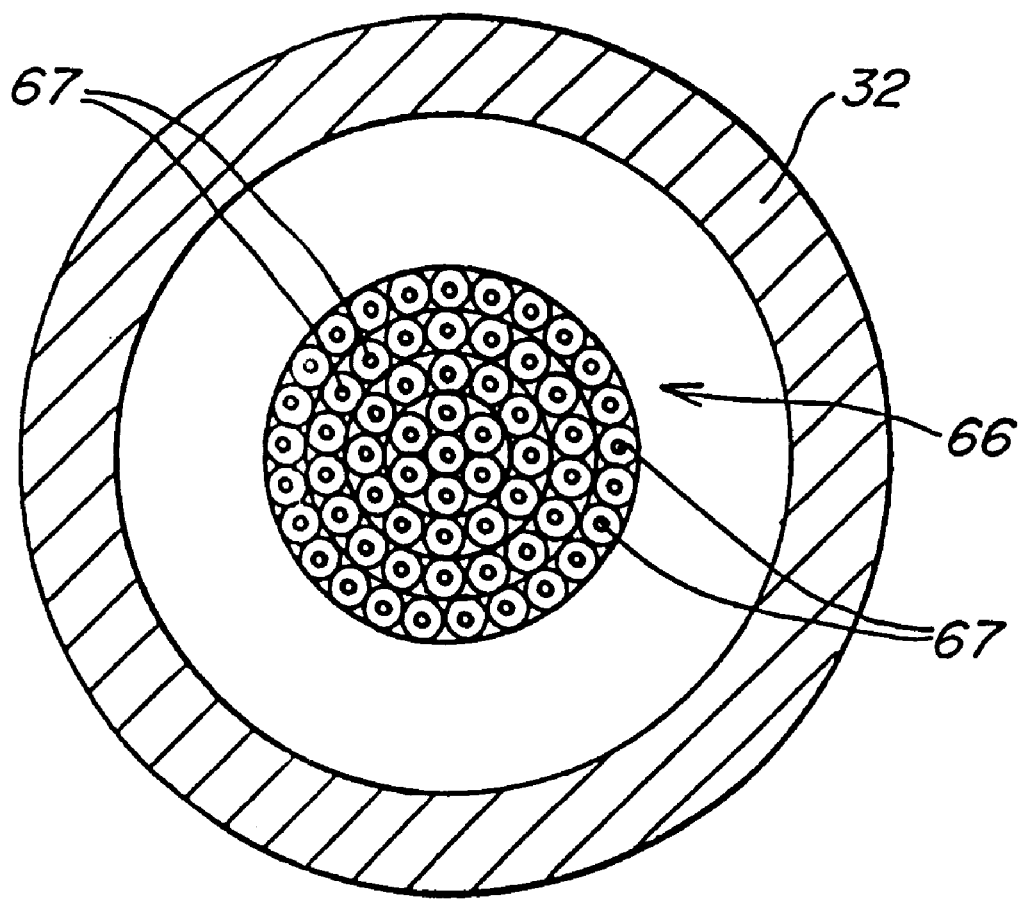
FIG. 4 is a cross-section through line 4—4 of FIG. 1.

FIG. 4 is a cross-section through lines 4—4 of FIG. 1, illustrating a multi-hole nucleator in one embodiment of the invention. The multi-hole nucleator includes a plurality of nucleating pathways 67, as illustrated. Arrangements for multi-hole nucleator 66 and die 82 of the invention can be very similar in at least the portion of each component designed to nucleate.

Figure 5:
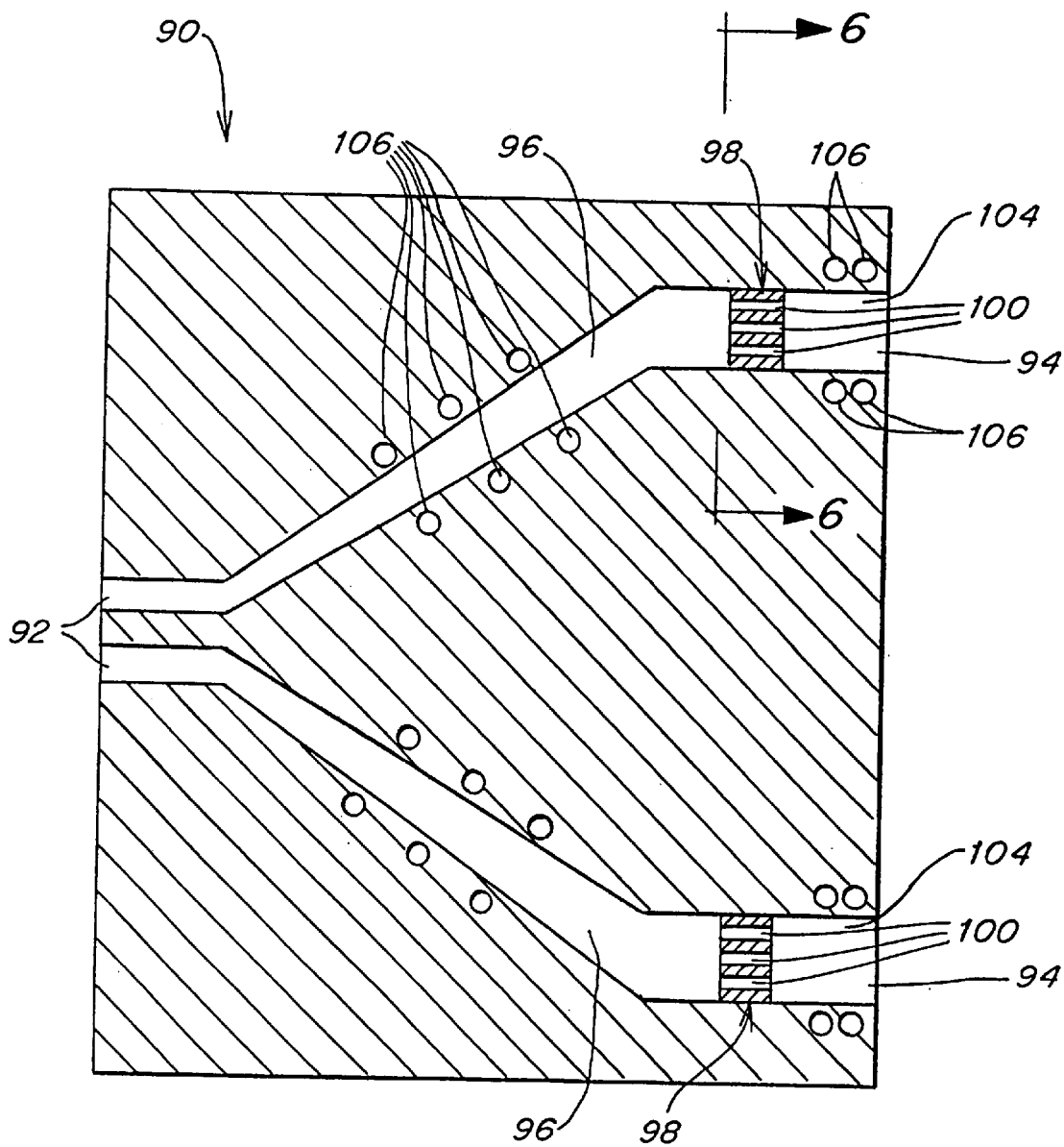
FIG. 5 illustrates a multi-passage nucleating and shaping die in accordance with the invention.

FIG. 5 is a cross-section of an annular die 90 that can serve as a die of the invention without separate nucleator 66. The die is designed to achieve a degree of solubility change by causing nucleation through a plurality of channels and shaping in a controlled manner, allowing formation of microcellular material. The die includes an annular fluid inlet 92 (the inlet can be non-annular, such as circular), an annular fluid outlet 94, and an annular section 96 connecting the inlet with the outlet that increases in radius as a function of distance from the inlet to the outlet so as to enable the manufacture of a large diameter tubular section. Alternatively, the annular section can decrease in radius to produce small diameter tubes. Annular section 96, as illustrated, also increases in cross-sectional area in a downstream direction to control pressure drop rates, but can be of constant cross-sectional area or can decrease in cross-sectional area. Sections that increase or decrease in cross-sectional area are included in the invention. Also located between inlet 92 and outlet 94 is a multiple-pathway nucleating section 98 of the die including a plurality of nucleating pathways 100, each constructed and arranged to provide a pressure drop rate thereacross allowing nucleation. In another embodiment, the die includes a single nucleating pathway rather than multiple nucleating pathways 100.

Die 90, as illustrated, includes a shaping section 104 in which nucleated material emerging from nucleating pathways 100 is recombined, and thereafter extruded to form a final part. Cooling channels 106 or other means of cooling the die can be provided upstream and/or downstream of the nucleating section 98 to control viscosity, pressure within cells, and to control the formability of the extrudate at exposure to ambient conditions. The ability to control the temperature of the polymer melt as it flows through the die allows improved control of cell size by minimizing growth of very large cells that can create imperfections in the surface of the extrudate. It also allows for formation of a smooth skin on the surface of the extrudate.

In FIG. 5, nucleating section 98 can be provided at other locations, such as in portion 96. Moreover, the annulus cross section and radius can be changed. For example, a die can be arranged in which flow would be as if 94 were an inlet and 92 an outlet.

Figure 6:
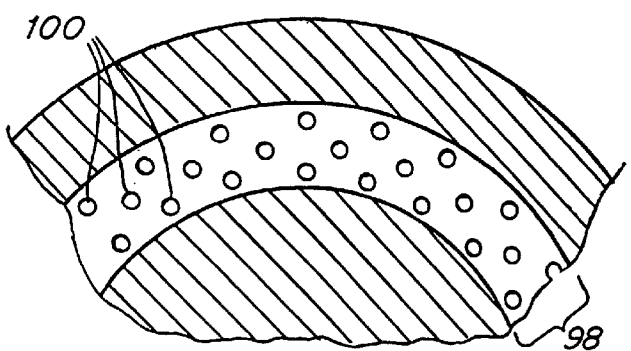
FIG. 6 is a cross-sectional view through line 6—6 of FIG. 5.

FIG. 6 is a cross-section through line 6—6 of FIG. 5, showing a plurality of nucleating pathways 100 of circular cross section within nucleating section 98.

Figure 7:
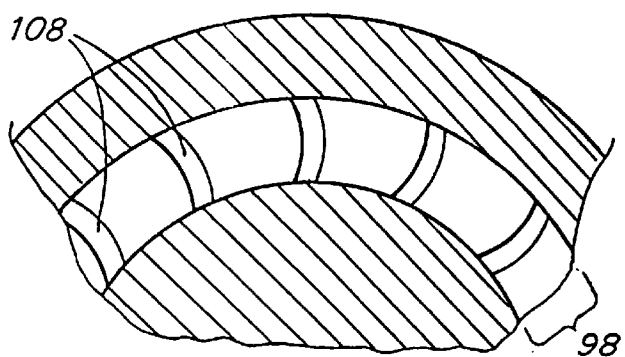
FIG. 7 is a cross-sectional view through line 6—6 of FIG. 5 according to an alternate embodiment of the invention.
Figure 8:
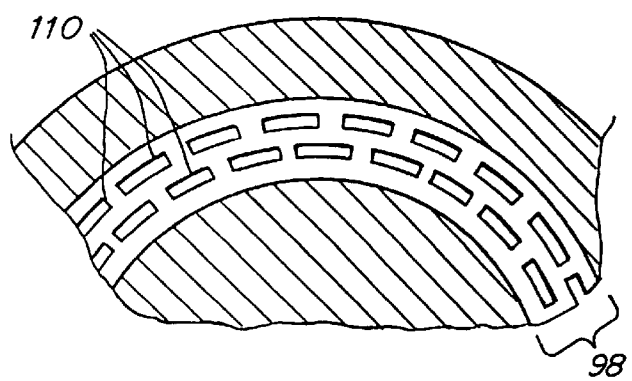
FIG. 8 is a cross-sectional view through line 6—6 of FIG. 5 according to yet another alternate embodiment of the invention.

FIGS. 7 and 8 illustrate alternate embodiments of the die 90 of FIG. 5, each taken in cross-section through line 6—6 of each alternative die. In FIG. 7, nucleating pathways 108 are curved slits that each pass from the outer limit of the nucleation section to the inner limit thereof. FIG. 8 includes nucleating slits 110, each of which is arranged to extend circumferentially in the nucleating section.

Figure 9:
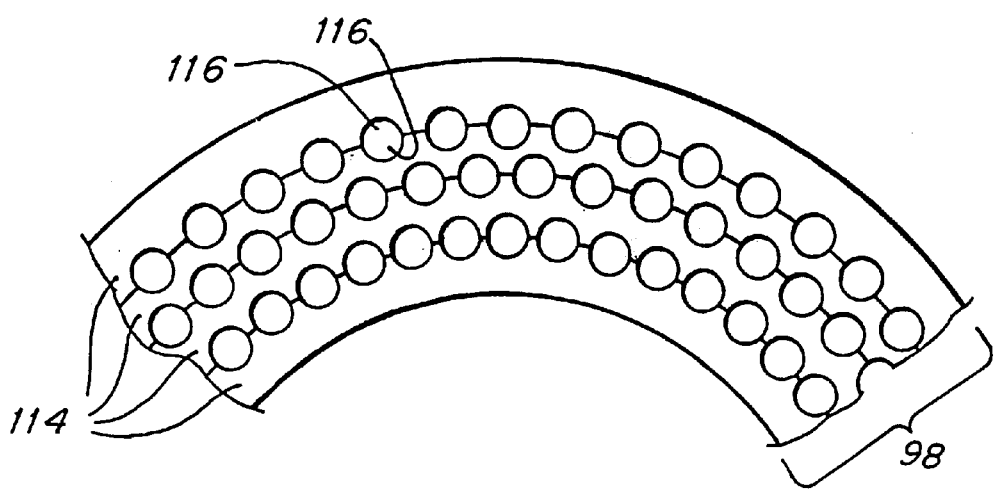
FIG. 9 illustrates a multiple concentric plate nucleator of a forming die of the type illustrated in FIG. 5.
Figure 10:
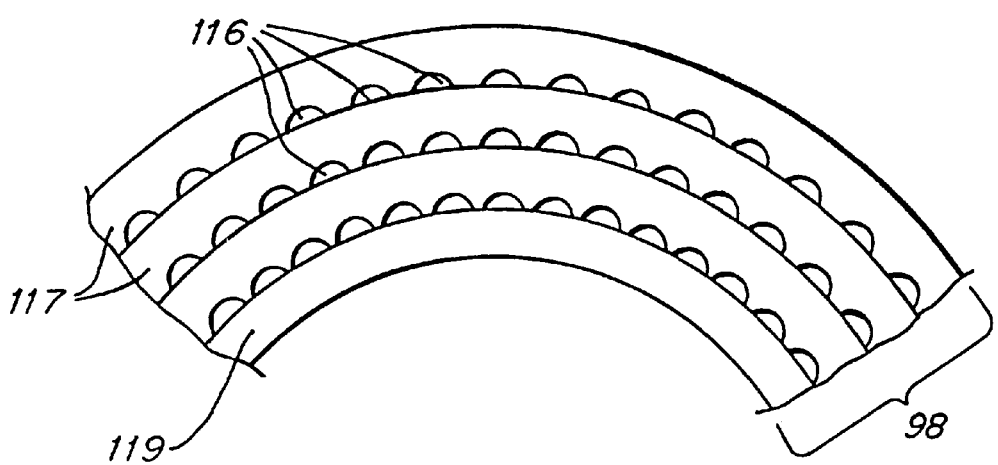
FIG. 10 is a multiple concentric plate nucleator of a forming die of the type illustrated in FIG. 5 according to another embodiment.

FIG. 9, taken along line 6—6 of FIG. 5 in another embodiment and showing the nucleation section only, includes a plurality of concentric annuli 114, each including a plurality of semicircular indentations 116 (or indentations of another geometry) arranged such that the semicircular indentations align with each other to provide a plurality of nucleating pathways. The uppermost and lowermost annuli 114 include indentations 116 only at one face of the annulus. Annuli 114 of FIG. 9 can be arranged with one or more of annuli 114 offset circumferentially such that the semicircular indentations 116 are not aligned, but communicate with each other, to provide a series of concentric, undulating annuli defining nucleating pathways. FIG. 10 illustrates an arrangement similar to that of FIG. 9 in which each of three top plates 117 include semicircular indentations in one face only, and bottom plate 119 includes no indentations, the arrangement defining a plurality of separate nucleating pathways of semicircular cross-section.

FIGS. 5–10 demonstrate that the annular die 90 of the invention can include nucleating pathways defined by slits or passages of any of a variety of geometries so long as the desired pressure drop and pressure drop rate across the passages is achieved, and fluid flowing through the passages can be recombined to form a final product. Other contemplated geometries include combinations of slits and holes, for example a series of holes, some or all of which are interconnected by slits to define dumbbell-shaped cross-sectional nucleating pathways. In these arrangements, the thickness, or cross-sectional dimension, of an extruded article can be controlled by providing additional layers of fluid passageways. Essentially any combination of shapes, sizes, and changes in shape, size, and cross section can be provided in the die and/or nucleator of the invention. For example, a die or nucleator can have any combination of different passages, so long as a desired pressure drop and pressure drop rate is achieved.

FIGS. 5–10 also demonstrate the ability of the dies of the present invention to extrude thick microcellular material, that is, material having a large cross-sectional dimension. Referring to any of FIGS. 5–10, it can be seen that increasing the width of the annulus of nucleation can be achieved while each separate nucleating pathway remains of a fixed cross-sectional dimension. Thus, pressure drop rate can remain constant while highly uniform, thick material is produced. A cylinder of microcellular material extruded from a die such as that shown in FIG. 5 can be sliced longitudinally following extrusion to produce an essentially non-corrugated sheet of any of a variety of widths and thicknesses, the thickness being controlled as described above and the width being controlled by adjusting the radius of the annular fluid outlet 94.

Figure 11:
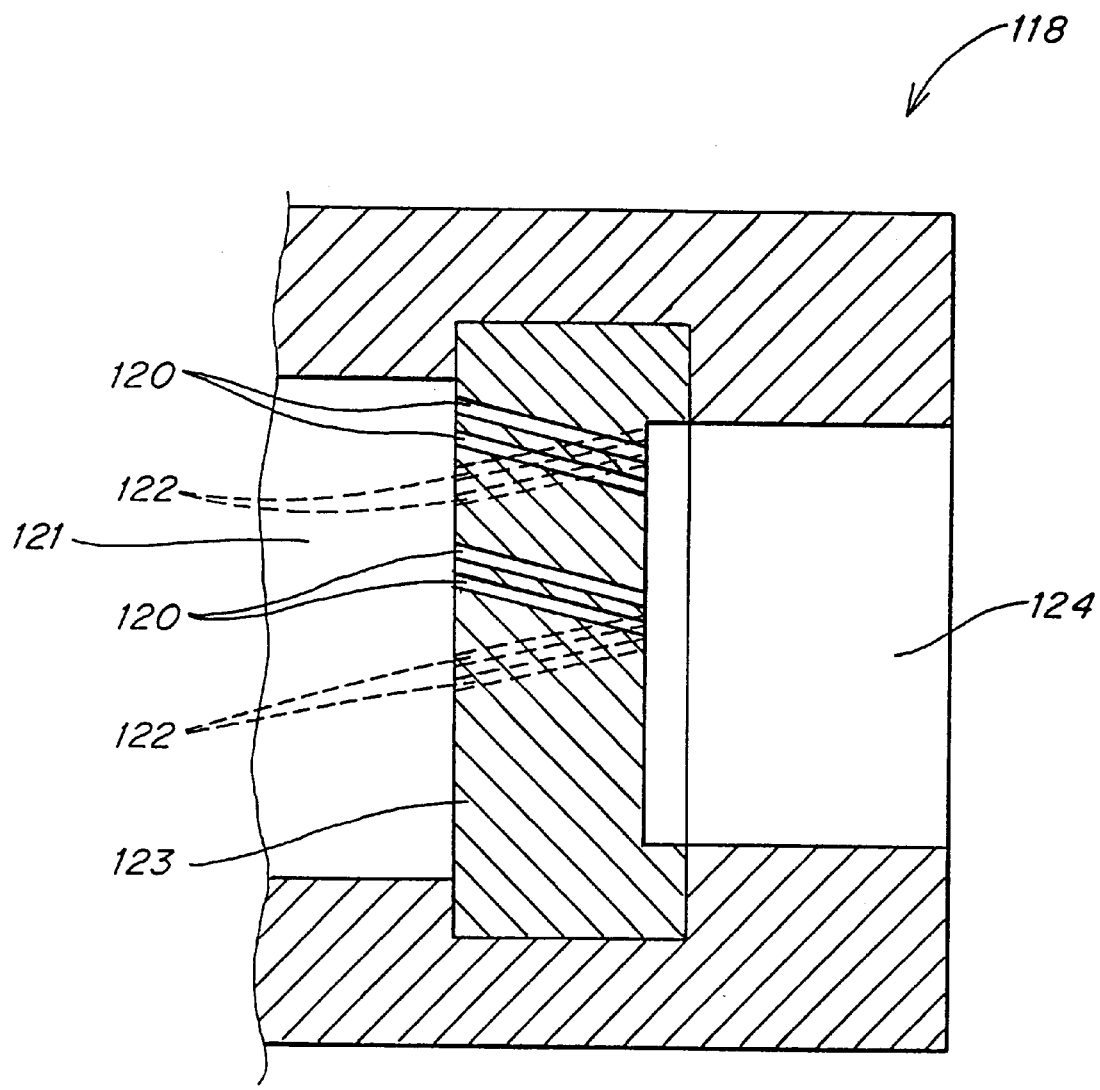
FIG. 11 illustrates a multi-hole nucleator or shaping die of the invention including separate, slanted nucleating pathways.

FIG. 11 illustrates a multiple-pathway die or nucleator 118 in accordance with the invention in which a plurality of nucleating pathways 120 communicate at their upstream ends with a section 121 of the extruder providing a single-phase solution of polymeric material and blowing agent, and at their downstream ends with a section 124 which can be the residence chamber 70 or a shaping section of a die. Nucleating pathways 120 are not aligned axially with the extruder, but are slanted relative to the extruder axis. A plurality of nucleating pathways 122, also communicating fluidly with sections 121 and 124, are arranged along axes that also are not in alignment with the axis of the extruder, and are not aligned with the axes of passages 120. That is, the pathways 120 and pathways 122 are not parallel, but slanted relative to each other. Each of the pathways 120 and 122 can provide flow into section 124 that is separate, for example as in passages 100 of FIG. 5, and then is recombined, or can provide flow that recombines at the exits of the pathways. That is, one or more of the pathways can converge and intersect each other at or prior to the end of each passageway. Additionally, as described above, the pathways can be of any cross-sectional shape such as circular, triangular, square, rectangular, slits, or the like, and can increase or decrease in cross-section in a downstream direction. This design, in which nucleating pathways are non-parallel, reduce molecular orientation and weak weld lines in the extrudate. For purposes of clarity, in FIG. 11 a plate 123 within which passages 120 and 122 are bored is not shown to contain pathways at all locations. Pathways can be provided throughout plate 123 from top to bottom, or at selected locations. For example, a series of clusters of pathways 120 and 122 can be provided, each cluster converging in an outlet, a plurality of resulting outlets providing nucleated material that is recombined in section 124.

Pathways that decrease or increase in cross-section allow control over the local pressure drop rate of polymeric material flowing though them. Passages with non-circular cross-sections and variable spacing between them control the distribution of nucleated material.

Figure 12A:
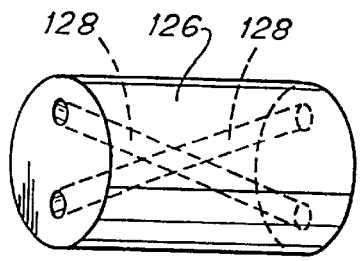
FIGS. 12a–12h illustrate multi-hole nucleators or nucleating portions of shaping dies having a variety of passageway arrangements and cross-sections.
Figure 12B:
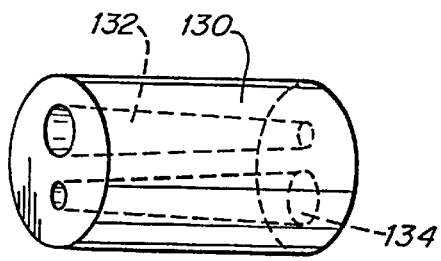
Figure 12C:
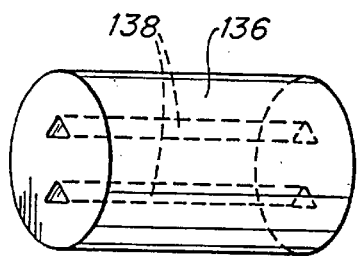
Figure 12D:
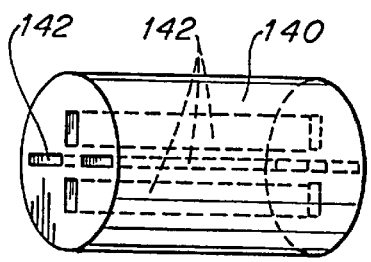
Figure 12E:
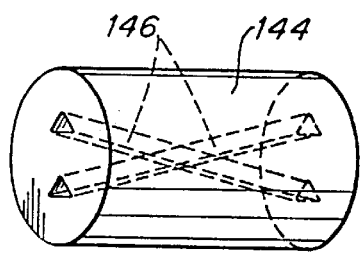
Figure 12F:
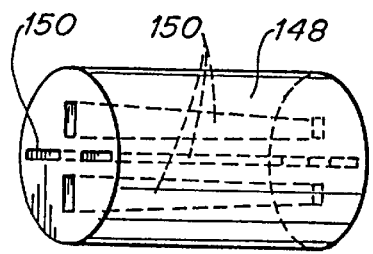
Figure 12G:
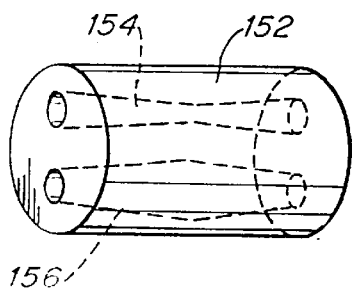
Figure 12H:
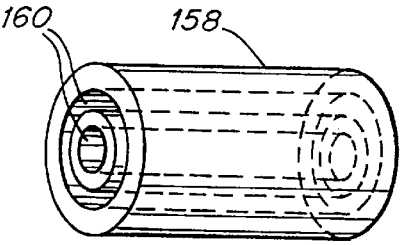

Referring now to FIGS. 12a–12h, a variety of geometries of separate nucleating pathways is illustrated. The various arrangements can be provided in the multi-hole nucleator of the invention or in a multi-hole nucleation section of a die. FIG. 12a illustrates an article (nucleator or nucleating pathway of die) 126 including pathways 128 of essentially circular cross-section. The pathways do not converge or change in cross-section along their length, but are slanted relative to the axis of the extruder and relative to each other. FIG. 12b illustrates an article 130 including a passageway 132 that decreases in cross-sectional area along its length and a passageway 134 that increases in cross-sectional dimension lengthwise. FIG. 12c illustrates an article 136 having two parallel pathways 138, each of triangular cross section, neither changing in cross-sectional dimension along its length. FIG. 12d illustrates an article 140 including a plurality of passages 142, each of essentially rectangular cross section, and none of which change in cross-sectional dimension along its length. The passages are arranged axially with the extruder, and each rectangle is arranged with its larger dimension aligned radially. FIG. 12e illustrates an article 144 including passages 146, each of triangular cross-section, neither of which changes in cross-sectional area along its length, and each of which is slanted relative to the axis of the extruder and relative to each other. FIG. 12f illustrates an article 148 including passages 150 each designed and arranged as in the article of claim 140 but of larger cross-section initially, with cross section decreasing in a downstream direction. FIG. 12g illustrates an article 152 having fluid pathways 154 and 156, each of essentially circular cross section and each arranged along the axis of the extruder. Passageway 154 decreases in cross-sectional area in a downstream direction until a midpoint of article 152, whereupon it begins increasing in cross-sectional area and terminates in cross-sectional area essentially identical to its starting cross-sectional area. Passageway 154 provides for an increasing pressure drop rate in the converging section and controlled cell growth, if pressure is low enough, in the diverging section. Passageway 156 begins and ends in similar cross-sectional area, but increases in cross-sectional area towards the middle where it reaches a maximum. FIG. 12h illustrates an article 158 including a plurality of concentric, annular passages 160. A standard spider arrangement rendering this arrangement feasible is not illustrated.

Figure 37:
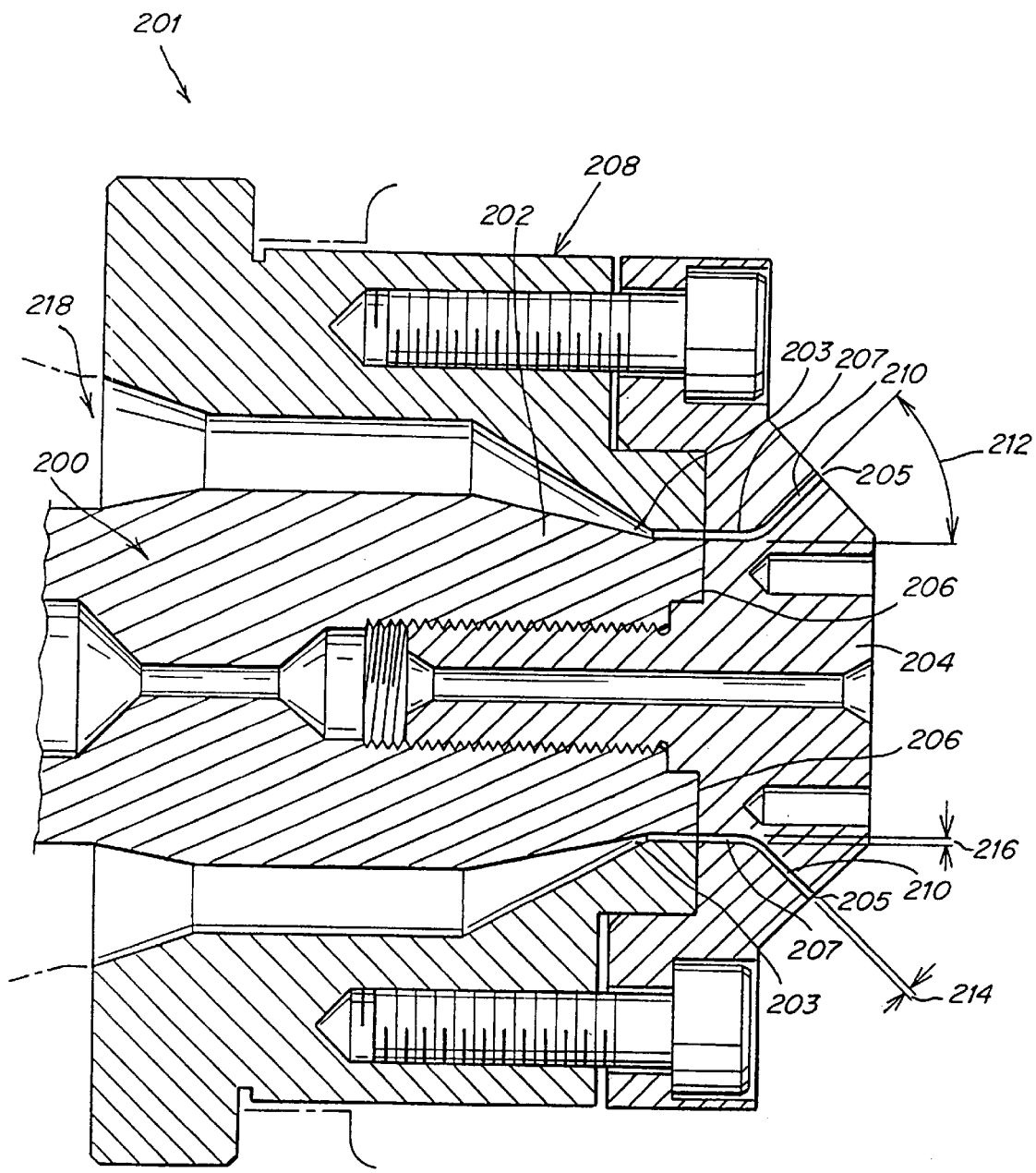
FIG. 37 illustrates a multi-nucleating pathway die in accordance with one embodiment of the invention.

FIG. 37, described in greater detail below, is a cross-section of an annular die 201 of the invention that is particularly useful in producing very smooth, thin microcellular material in cylindrical or sheet form at very high pressure drop rate during forming. That is, die 201 can receive a single-phase solution and nucleate, followed almost immediately by shaping. Nucleation and shaping are separate, but occur in rapid succession. The die includes an annular fluid inlet 203, an annular fluid outlet 205 and annular sections 207 and 210 adjoining inlet 203 and outlet 205, respectively, and connecting the inlet and the outlet. The more upstream annular section 207 has a constant radius and a constant gap dimension of a size selected to define a nucleating pathway. That is, section 207 is designed to receive a homogenous, single-phase solution of polymeric material and blowing agent and to subject the material to a rapid pressure drop to cause nucleation. Section 210 is of a radius that increases in a downstream direction but that, like section 207, includes a constant gap dimension. The gap dimension of section 210 typically is larger than the gap of section 207 and is sized to receive a nucleated solution and to allow controlled cell growth to form microcellular extrudate.

The die design of FIG. 37 has been identified in accordance with the invention as one that allows good control in formation of unexpectedly smooth, microcellular sheet material. Superior control is achieved in die 201 as follows. When nucleated material is allowed to grow in section 210, since section 210 includes a constant width gap, growth of the sheet can occur only laterally. Lateral growth of the sheeth is permitted due to the constantly increasing radius of the annulus at section 210, allowing growth without corrugation.

Although a variety of die geometries can be selected, a tapered die, that is, one having a nucleating pathway(s) that decrease(s) in cross-sectional area in a downstream direction can be advantageous in many situations since more reasonable system pressures and less blowing agent can be used which minimizes cell connectivity. When used as, for example, a wire coating, resulting microcellular material can be superior in having better water and water vapor barrier properties. In the invention, the single-phase solution is maintained in an un-nucleated state prior to the nucleating pathway. Where the nucleating pathway decreases in cross-sectional dimension in a downstream direction, the solution is maintained in an un-nucleated state between the mixing section at which the single-phase solution is achieved and the beginning of the decrease in cross-sectional dimension.

Figure 13:
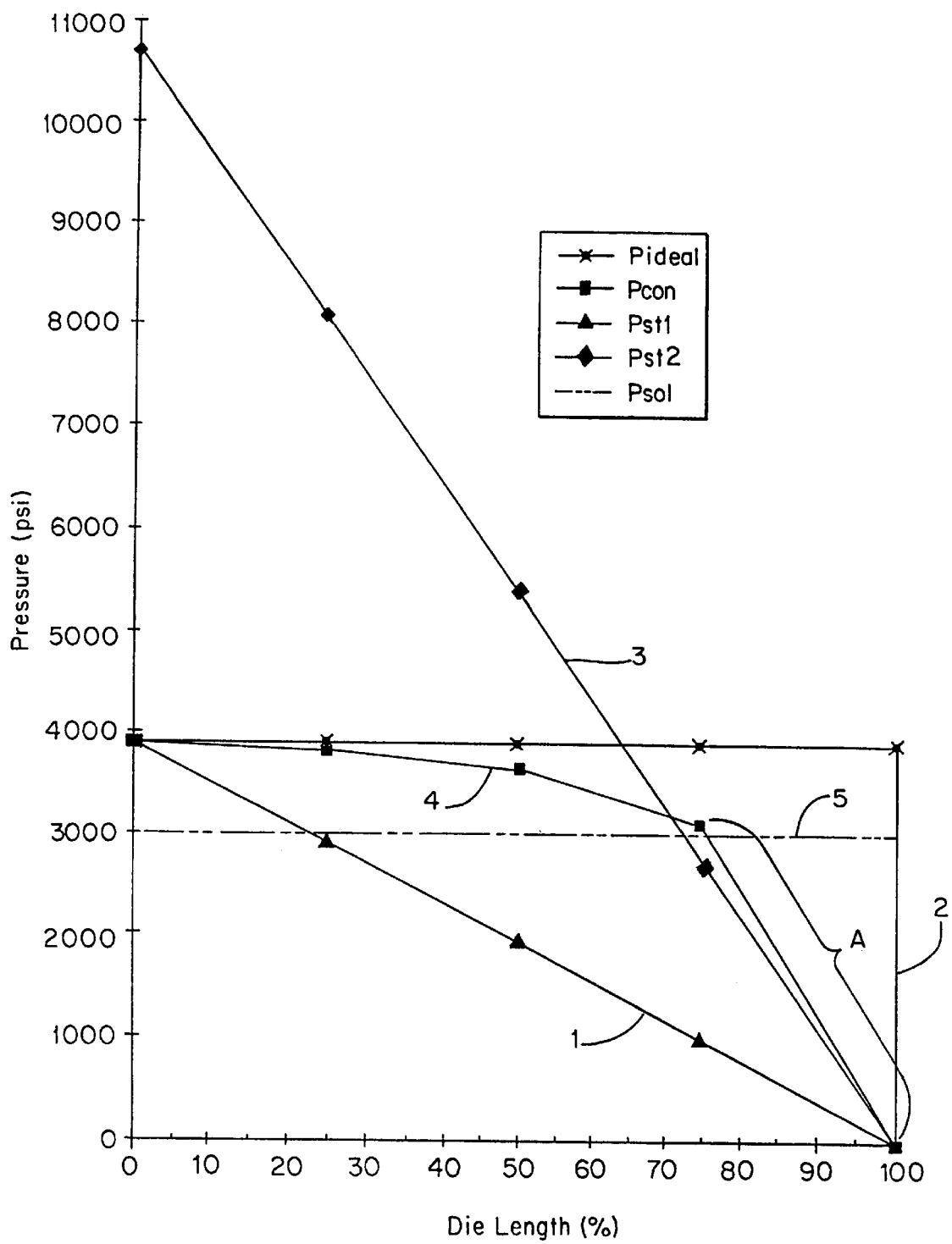
FIG. 13 is a plot of a typical pressure drop through a parallel-landed (straight) nucleating pathway typical of a standard extrusion die configuration, a plot of an ideal pressure drop through a parallel-landed pathway, and a plot of a pressure profile through a nucleating pathway of the invention which decreases in cross-sectional area in a downstream direction.

Pathways that decrease in cross-sectional area in a downstream direction have been found to create relatively high pressure drop rates across a relatively short length of the die, by creating a nonlinear pressure/displacement curve that includes a region of relatively high pressure drop rate without the need for high initial pressure. Referring to FIG. 13, pressure drop profiles are plotted. Curve 1 represents a typical pressure drop profile through a parallel-landed (straight) nucleating pathway typical of a standard extrusion die configuration. The typical pathway does not change in cross-sectional area along its length, thus pressure drop per unit length is constant throughout the pathway, i.e., the pressure drop curve has a constant negative slope. Curve 5 represents an exemplary critical solubility level of blowing agent in polymeric material, that is, the pressure above which a single-phase solution can exist and below which nucleation will occur.

The cross-sectional area of a nucleating pathway can change (e.g. decrease) at an essentially constant rate, or at a variable rate, for example a rate which increases. That is, the nucleating region can be a passageway of an essentially straight, increasing or decreasing taper or can be of an increasing or decreasing taper and also have a convex or concave wall or a wall having regions of differing taper. Thus, in one aspect, the invention provides a method involving continuously decreasing the pressure within successive, continuous portions of a flowing, single-phase stream at a rate which increases, while causing nucleation.

The present invention involves, according to one aspect, the recognition that it is desirable to maximize the pressure drop rate dP/dt across curve 5. Ideally, pressure drop would be instantaneous, as in curve 2. Of course, this is impossible. In a parallel-landed nucleating pathway, to increase dP/dt from, for example, 1.4 GPa/sec (curve 1) to approximately 25 GPa/sec (curve 3), initial pressure necessarily must be higher than 10,000 psi, which is unacceptable in extrusion apparatus. Curve 3 could be achieved, for example, by using the same die but drastically increasing flow rate, or by decreasing die diameter.

The nucleator of the invention including a tapered (decreasing cross-sectional area in a downstream direction) nucleating pathway solves the problem of achieving high pressure drop rates and sufficient overall pressure drop at acceptable system operating pressures. This is because the tapered nucleating pathway of the invention creates, in material urged therethrough, a pressure profile of curve 4. As the amount of taper increases from zero (parallel land) to a positive value, the slope of the pressure drop rate curve becomes non-linear where the pressure drop per unit length in the pathway increases. The result is a portion A of curve 4, through the critical solubility concentration, having a relatively steep slope (approximately 25 GPa/sec) where the curve represents an overall pressure drop of only 4000 psi through the nucleating pathway. Therefore, only 4000 psi need be established upstream of the pathway and a 25 GPa/sec pressure drop rate is achieved from a point above the solubility pressure threshold of the fluid stream to atmosphere. As described, significantly higher pressure drop rates are achievable in accordance with the invention.

Curves 1–4 are based on pressure calculations through the nucleating pathways based on rheological data obtainable from typical foamable polymeric material.

The pressure profile (curve 4) achievable with the tapered nucleating pathway can facilitate formation of closed-cell microcellular material under conditions in which, in prior art processes, open-cell material was formed. At a given dP/dt and melt temperature, increasing the percent blowing agent above a critical level can increase cell connectivity in microcellular material. That is, under certain conditions, too much blowing agent can cause cells to rupture. In connection with one set of embodiments, therefore, it has been found that it is desirable to use only that amount of blowing agent necessary, and lower levels of blowing agent are necessary when using the tapered nucleating pathway of the invention, in particular, blowing agent at levels substantially below saturation levels. This approach is in contrast with most prior art approaches which typically involved maximizing blowing agent concentration with the goal of thereby achieving maximum cell densities since more blowing agent creates, theoretically, more nucleation sites. In one set of preferred embodiments, in which pressure drop rate is high, blowing agent is present in the polymeric stream within the extruder at a level of less than about 4% by weight, more preferably less than about 3% by weight, and more preferably still less than about 2% by weight, and more preferably still less than about 1% by weight. In embodiments in which extremely high pressure drop rate is used, blowing agents can be present in amounts of about or less than about 0.5% by weight. In another embodiment, blowing agent is present in the solution in an amount less than about 80 percent by weight saturation concentration as determined at the lowest pressure in the system after the point of blowing agent injection prior to the nucleating pathway.

Figure 14:
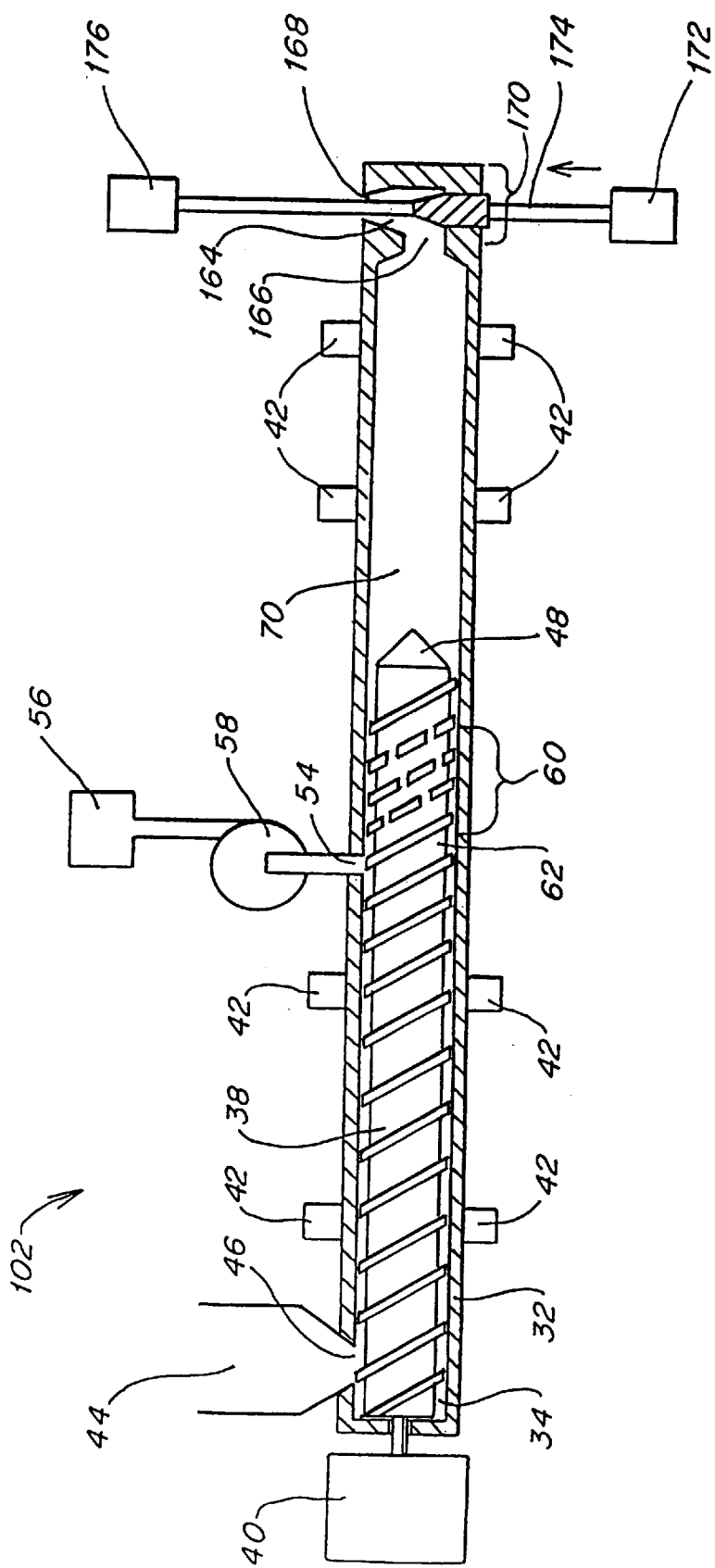
FIG. 14 illustrates a wire extrusion system of the invention including a tapered nucleating pathway.

Referring now to FIG. 14, an extrusion system 102 for extruding microcellular material onto wire according to one embodiment of the invention is illustrated schematically. Extrusion system 102 is similar to extrusion system 80 of FIG. 3, or can be similar to extrusion system 30 of FIG. 1 in that it can including a nucleator that is spaced from a shaping die. In the preferred embodiment illustrated, system 102 includes a constriction 164 that is a nucleating pathway having an entrance 166 and an exit 168, and the nucleating pathway 164 decreases in cross-sectional area in a downstream direction. Nucleating pathway 164 communicates with a crosshead die 170 arranged to receive extruded, nucleated microcellular material from exit 168 of nucleating pathway 164 and to apply the material to the exterior surface of a wire and allow the material to foam into microcellular material. A wire payoff 172 is positioned to feed wire 174 into the crosshead 170. A take-up arrangement 176 is positioned to receive wire coated with microcellular material from the crosshead. Wire payoffs and take-ups are known, and standard arrangements can be used in the invention. Although not shown, the system can include components such as wire preheaters, a cooling trough between the crosshead and take-up, and sensors such as capacitance sensors and thickness sensors arranged to sense dimensional and electrical characteristics of the coated wire.

Although a pressure type die is illustrated, a tube-type tooling design can be used in the invention. A pressure type design is a die and tip design in which the wire is exposed to polymer flow behind the die. A tube type design is one in which the wire is not exposed to polymer until the wire exits from the die.

The aspect of the invention that provides a system for extruding microcellular material onto wire is advantageous for the following reasons. Foam material is advantageous relative to solid material for wire insulation because foamed material provides enhanced electrical properties with increased void fraction (less material per unit volume). However, in any foaming technique, if the thickness of the material formed is less than the maximum cell size, holes will exist in the material. This is unacceptable in typical wire coating applications since holes would allow moisture ingress and compromise electrical performance. Physical properties of such material would also be compromised. In the very thin insulation wall thicknesses of Category 5 and similar wires it has been difficult or impossible to form foamed insulation on wire.

The present invention provides an arrangement in which microcells can be created in a manner in which the cellular structure is a relatively hermetic barrier to moisture as well as providing the required physical properties appropriate for category 5 applications.

The invention provides, according to one aspect, a method involving continuously extruding microcellular material onto a wire substrate in which the microcellular material has a void fraction of less than 50%, preferably less than about 30%, more preferably still less than about 20%. An article comprising a wire and a coating of microcellular material around the wire having a void fraction of less than about 50%, more preferably less than about 30%, and more preferably still less than about 20%, is provided as well in accordance with the invention.

A single or tandem extruder, as described, can be adapted to carry out all of the techniques of the invention, including wire coating. An arrangement can be adapted for wire coating by the addition of a crosshead die assembly, where the assembly is defined as an adapter, transfer tube, and wire handling system comprised of a payoff, wire straightener, preheater, cooling trough, puller, and winder.

Uniformity of cell structure is important in this arrangement for uniform capacitance, high velocity of propagation resulting from low dielectric constant, good mechanical strength, and low water absorbance. Compared to a solid material, a foamed material with similar characteristics will provide relatively less combustible mass and hence byproducts of combustion, making microcellular foam coated wires less hazardous.

In connection with formation of microcellular coatings on wires, particularly thin microcellular material is produced. This advantage is not limited to the coatings produced on wires, but involves recognition of conditions necessary for producing thin material that can be applied to free-standing sheet, tubes, and other thin articles. According to this aspect of the invention, microcellular material, preferably essentially closed-cell material, of thickness less than about 4 mm, preferably less than about 3 mm, more preferably less than about 1 mm is produced. In some embodiments extremely thin microcellular material is produced, namely material of less than about 0.5 mm in thickness, more preferably less than about 0.25 mm in thickness, more preferably still less than about 0.2 mm in thickness. In some particularly preferred embodiments material on the order of 0.1 mm in thickness is produced. All of these embodiments can include essentially closed-cell material.

As noted, the invention encompasses a variety of products shaped from very thin microcellular material. These materials can include articles such as wire coatings, described above, tubes, hose straws, and the like.

One aspect of the invention involves production of foamed, preferably microcellular foamed, crystalline and semi-crystalline polymeric material formed by continuous polymer extrusion. In preferred embodiments crystalline and semi-crystalline polymeric material is foamed as microcellular material with a blowing agent that is essentially solely carbon dioxide, preferably supercritical carbon dioxide. As noted above, the prior art generally teaches that the expansion of nucleation sites, or cell growth, may be minimized by, for example, cooling the melt prior to extrusion or by quenching the material upon exposure to atmosphere in order to freeze cell growth. Alternatively, the prior art teaches that such expansion may be controlled by the use of viscosity modifiers or foam-controllability additives. Such additives increase the controllability of foaming by generally functioning to increase melt strength and/or melt elasticity. Crystalline and semi-crystalline materials require much higher operating temperatures than amorphous materials, as it is necessary to operate at the Tm or above in order to prevent crystallization of such materials in, for example, an extruder. Such conditions are contrary to the prior art, which teaches that with regard to the production of amorphous microcellular material such as, for example, polystyrene, it is necessary to minimize the difference between the Tg and the extrusion temperature of an amorphous polymer in order to prevent expansion of cells beyond the microcellular range.

In general, the difference between the required operating temperature and the Tg of crystalline and semi-crystalline materials is much greater than for amorphous polymers, as shown by a comparison of such values in Table A. For example, the difference between the Tg and a typical operating temperature for extruding polystyrene is about 40° C., whereas for LDPE it is about 135° C., and for PET it is about 155° C. In the table, Tg and Tm refer to values of polymeric material free of blowing agent. While not wishing to be bound by any theory, it is likely that operating temperature can be slightly below Tm because of viscosity modification by the blowing agent.

TABLE A*

| Material | Material Type | Tg (° C.) | Tm (° C.) | Operating Temperature (° C.) | Delta (° C.) |
|---|---|---|---|---|---|
| Polystyrene | amorphous | 90–100 | n/a | 140 | 40–50 |
| Low Density Polyethylene | semi-crystalline | −110 | 115 | 110 | 220 |
| High Density Polyethylene | semi-crystalline | −110 | 134 | 145 | 255 |
| Polypropylene | semi-crystalline | −10 | 165 | 180 | 190 |
| Polyethylene Terephthalate | semi-crystalline | 70 | 260 | 230 | 160 |
| Nylon 6-6 | semi-crystalline | 50 | 240 | | |

*$T_g$ and Tm from "Principals of Polymer Processing", Tadmore, Z., Gogos, C., John Wiley & Sons, New York, 1979, p. 38.

Surprisingly, crystalline and semi-crystalline microcellular materials can be produced according to the method of the present invention without the need to cool the melt to temperatures near the Tg, and without the use of viscosity or foam-controllability modifiers, as taught in the prior art. The present invention involves the discovery that well-controlled extrusion of microcellular material may be achieved, even at temperatures well above the Tg of a polymer, by operating at particularly high pressure drop rates. Such high pressure drop rates facilitate the continuous formation of crystalline and semi-crystalline microcellular materials. Although not wishing to be bound by any theory, it is believed that a reduction in the internal force associated with each nucleation site may be achieved by reducing the size of the nucleation sites and maintaining very small cells during foaming. This can be achieved, in turn, by creating many sites of nucleation. Under comparable processing conditions, a nucleated solution having more numerous, and smaller, nucleation sites will produce relatively smaller cells, since blowing agent distributed among more numerous cells results in less blowing agent per cell, therefore smaller cells during growth. Further, since the expansion force acting on an interior wall of a gaseous cell at a constant pressure increases with the square of the cell diameter, a smaller cell experiences much less expansion force per unit area of cell wall than does a larger cell. Smaller sites contain less entrained gas, and therefore have a lower internal pressure than larger sites. A reduction in the internal pressure results in reduced cell expansion.

It is theorized that the prior art teaching of cooling the melt for the purpose of increasing melt strength also achieves such a reduction in the expansion force by reducing the energy associated with the molecules of gas contained in each nucleation site. The reduced energy associated with the gas entrained herein results in a reduction in the internal pressure and reduced cell expansion upon extrusion to atmosphere.

Semicrystalline and crystalline microcellular materials that can be processed according to the method include polyolefins such as polyethylene and polypropylene, crosslinkable polyolefins, polyesters such as PET, polyamides such as Nylons, etc., and copolymers of these that are crystalline. In particular, unmodified standard production grade material can be used in contrast to standard prior art materials which, it typically has been taught, require modifications such as incorporation of foam-controllability additives including components of other polymer families (e.g. polycarbonate in polyethylene terephthalate) (see, for example, Boone, G. (Eastman Chemical Co.), "Expanded Polyesters for Food Packaging", Conference Proceedings of Foam Conference, Sep. 10–12, 1996 Somerset, N.J.). These additives increase the controllability of foaming by generally functioning to increase melt strength and/or melt elasticity. In this aspect, microcellular material can be made having preferred average cell sizes, maximum cell sizes, and cell densities as described above, and can be processed according to techniques and systems described herein. Examples of material that do not include foam-controllability modifiers include Eastman 9663 PET and Wellman 61802 PET. According to the method, semicrystalline or crystalline microcellular material may be made having preferred average cell sizes, maximum cell sizes, and cell densities as described below.

Production of such crystalline or semi-crystalline material is facilitated by a method of the invention that involves melting the material and maintaining its temperature at least above the recrystallization temperature of the material. Preferably, a flowing fluid polymeric material is established by elevating the temperature of the material to at least the approximately Tm of the polymer or higher, and then extruding the material into ambient conditions while foaming and shaping the material into an extrudate shape at a die temperature at least about 100° F. (at least about 37.8° C.) above Tg, preferably at least about 120° F. (at least about 48.9° C.), more preferably at least about 150° F. (at least about 65.6° C.) above Tg of the crystalline or semi-crystalline polymer. In some embodiments foaming and shaping occurs at a die temperature even higher relative to Tg, for example at least about 200° F. (at least about 93.3° C.) above Tg, at least about 250° F. (at least about 121° C.), or at least about 300° F. (at least about 149° C.) above Tg. In this context, Tg and Tm refer to values of the polymer without addition of blowing agent.

This aspect of the invention facilitates a method of continuously extruding crystalline or semi-crystalline material from an extruder at a throughput rate of at least about 10 lbs/hr, preferably at least about 25 lbs/hr, more preferably at least about 40 lbs/hr, and in particularly high throughput rates at least 60, 80, or 100 lbs/hr. These high throughput rates are representative of a surprisingly advantageous result achieved not only with crystalline and semi-crystalline materials, but with other materials in the invention described herein.

Another aspect of the invention involves production of foamed, preferably microcellular foamed, low intrinsic viscosity (I.V.), standard production grade, polyethylene terephthalate (PET) of low density. The prior art teaches that, in production of foamed polymeric material, one generally needs to use material of a minimum I.V. for the support of cellular structure. It is known that higher I.V. material will have a higher melt elasticity and melt strength, both of which could contribute to the support of cell growth. The invention involves production of such material via higher concentration of blowing agent, for example blowing agent at greater than 3% by weight (which provides capability of operating at lower temperatures), higher pressure drop rates, for example greater than 0.5 GPa/sec (which provides efficient nucleation of many small cells leading to better control of growth), or both. In particular, the invention involves production of foamed PET of I.V. less than one, or in some cases less than 0.8. In another aspect, the invention involves production of crystalline or semi-crystalline microcellular material, such as PET, of density of less than 8 lbs/ft. In another aspect, the invention involves production of foamed crystalline or semi-crystalline microcellular material, such as PET, essentially free of foam-controllability modifiers.

Another aspect of the invention involves continuous extrusion of microcellular polymeric material including filler in minimum amounts. Addition of filler is expected to have an effect opposite that of addition of flow-control modifiers, that is, to weaken melt strength. Using high pressure drop rates of the invention, microcellular material, including crystalline and semicrystalline material, having filler in an amount of at least about 10% by weight based on the weight of the entire mixture, or at least about 25%, or at least about 35%, or at least about 50% can be achieved. "Filler", as used herein, includes those fillers known to those skilled in the art to be present in, for example, filled polyolefin. Typical fillers include talc, flame retardant, etc.

Selection of geometry and number of pathways for nucleating pathways of the nucleator or nucleating die of the invention can be made with consideration of the following physical principles. Nucleation is the beginning state in the creation of cells by phase separation in a material. The final cell density, number of cells in a unit volume of a original material, depends on the number of nucleation sites. The product density is a function of cell density and cell size, or alternatively, void fraction. The cell size is also related to the number of nucleation sites and amount of gas present, etc. Therefore, control of the nucleation number is very important in continuous microcellular processing. Classical nucleation theory shows the nucleation rate (N; 1/sec) as a function of many parameters according to equation 1

$$N = C \cdot f \exp(-\Delta G \cdot /kT) \tag{1}$$

where C is the concentration of gas molecules, f is the frequency factor for molecules of gas joining the nucleus [1/sec], $\Delta G$ is the activation energy for nucleation, k is Boltzmann constant, and T is the temperature. $\Delta G$ can be defined according to equation 2

$$\Delta G \cdot = (16 \Pi \gamma^3)/(3(\Delta P)^2) \tag{2}$$

where g is surface energy and $\Delta P$ is the pressure drop relative to saturation pressure. Equation (1) shows that the nucleation rate is proportional to the concentration of gas molecules, and cell density is higher with higher nucleation temperatures and larger pressure drops.

One must also consider the kinetic aspects between the nucleation and the diffusion. The characteristic nucleation time is a function of the characteristic length (diameter of cells), nucleation rate and the gas diffusivity. The characteristic diffusion time is a function of characteristic length and diffusivity. It is necessary that characteristic diffusion time, $\Delta t_d$, is much greater than characteristic nucleation time, $\Delta t_n$, to maximize cell density by avoiding competition for dissolved gas between nucleation and cell growth. Dimensionless analysis show the criteria in equation (3):

$$\Delta t_n/\Delta t_d \sim D/(N \cdot d^5) << 1 \tag{3}$$

where D is diffusivity, N is nucleation rate, and d is characteristic length.

From equation (1), it can be seen that the concentration of gas molecules and the magnitude of the pressure drop relative to the saturation pressure are important parameters for control of cell density. In continuous microcellular processing, the maximum amount of gas concentration and diffusivity depend upon the kind of gas and polymer. When the polymer and gas are given, pressure drop is an important process variable which can be determined by principles well known for flow through pipes. Equation (4) shows that pressure drop depends on parameters of the power-law viscosity model, diameter of pipe, land length of pipe and volumetric flow rate:

$$\Delta p = 4m \cdot \{[(8(3+1/n)Q)/(\pi d^3)]^n \cdot L\}/d \tag{4}$$

where $\Delta P$ is pressure drop, m and n are power law constants; L is land length of pipe; d is the diameter of pipe and Q is volumetric flow rate.

The pressure drop rate is another important factor for the nucleation in continuous microcellular processing. Pressure drop rate can be determined by calculating the pressure drop and the residence time of flow in the pipe. Equation (5) shows that pressure drop rate dP/dt is a function of viscosity, pipe diameter, and volumetric flow rate:

$$dP/dt = 16m \cdot \{[8(3+1/n)Q)/(\pi d^3)]^n \cdot Q\}/\pi d^3 \tag{5}$$

The design of nucleation devices is constrained by the shear rate of a polymer flow, because the flow may become unstable in the high shear rate region.

The function and advantage of these and other embodiments of the present invention will be more fully understood from the examples below. The following examples are intended to illustrate the benefits of the present invention, but do not exemplify the full scope of the invention.

The following abbreviations have been adopted for purposes of the following examples:

L = length of hole
d = hole Diameter
N = number in holes
$V_f$ = the velocity of the final extrudate
$A_f$ = cross-sectional area of the extrudate
$A_o$ = the total cross sectional area of all the holes
$r_f$ = density of the microcellular plastic.
$r_o$ = density of the plastic/$CO_2$ solution before foaming
M = mass flow rate from the extruder output
$r_o$ = the diameter of each hole
$V_o$ = velocity of unfoamed material at the exit
g = shear rate

EXAMPLE 1

The following example describes a process for determining the critical dimensions of a die of this invention, using an approximation analysis. This example will enable those skilled in the art to develop alternative die designs that can be used to make microcellular plastics, yet still fall within the spirit and scope of the presently claimed invention.

If it is assumed that the plastic will expand uniformly in all three directions, then the ratio of the density of the microcellular plastic $\rho_f$ to the density of the unfoamed plastic $\rho_0$ may be written, as a first approximation, as:

$$\rho_f/\rho_0 = (1/a)^3 \quad (6)$$

where a is the linear expansion ratio during foaming. Equation 6 states that if one wishes to decrease the density by a factor of two, the linear expansion ratio must be about 1.26.

If the die consists of a large number of circular holes through which the plastic is extruded, the area ratio of the holes to the total final area of the extrudate determines the final density, to a first approximation. The continuity relationship demands that:

$$M = \rho_f A_f V_f = \rho_0 A_0 V_0 \quad (7)$$

Where $\rho$=density, A=area, V=velocity, sub-f=foamed, and sub-0=unfoamed. If one assumes that $V_f$=a $V_0$, the area ratio may be expressed as:

$$A_f/A_0 = a^2 \quad (8)$$

where $A_0$ is the area of each hole, $A_i$, times the number of the holes N. The number of holes required to provide a desired density reduction is thus:

$$N = A_f/(a^2 A_i) \quad (9)$$

If one assumes that an extruder can process at a mass flow rate of M, the flow rate through each hole can be computed. The volume flow rate per hole $q_i$ is related to the mass flow rate as:

$$q_i = M/N\rho_0 \quad (10)$$

The flow rate through a single hole is related to the pressure drop $\Delta p$ as:

$$q_i = [(\pi r_0^3)/(1/n+3)][(r_0/2m)(\Delta p/L)]^{1/n} \quad (11)$$

Where L=length of a hole, $r_0$=radius of the hole, and m and n are materials constants for a power law viscosity model given by:

$$\eta = m(\gamma)^{n-1} \quad (12)$$

Equation (9) can be solved for $\Delta p$ over the length of the hole. Using the above equations, one can calculate the approximate number of holes required to process a given plastic at a given flow rate and at required pressure drop and pressure drop rate. For example, if one wants to make a polystyrene microcellular foam with a specific gravity of 0.3 and if the flow rate is 200 lbs/hr, one could use 130 holes, each having a diameter of 0.018 inches. The pressure drop and the pressure drop rate are calculated to be 44 MPa and 4 GPa/s, respectively, through the holes, assuming that m is 17,420 $Ns^{0.3}/m^2$ and n is 0.3, which are the values reported for impact grade polystyrene at 430° D (Novacor/Monsanto 3350). Since viscosity is affected by the concentration of $CO_2$ and temperature of operation, the actual viscosity data should be used to refine these calculations. Furthermore, the pressure in the holes must be high enough to keep the plastic/gas solution as a single phase until the plastic exits the die. In practice, the pressure will decrease throughout the length of the holes and therefore, the high pressure drop rate is essential.

EXAMPLE 2

Tandem Wire Extrusion System for Microcellular Material

A tandem extrusion line (Akron Extruders, Canal Fulton, Ohio) was arranged including a 2 inch, 32/1 L/D primary extruder and a 2.5 inch, 34/1 L/D secondary extruder. An injection system for injection of $CO_2$ into the primary was placed at a distance of approximately 20 diameters from the feed section. The injection system included 4 equally-spaced circumferentially, radially-positioned ports, each port including 176 orifices, each orifice of 0.02 inch diameter, for a total of 704 orifices.

The primary extruder was equipped with a two-stage screw including conventional first-stage feed, transition, and metering sections, followed by a multi-flighted (four flights) mixing section for blowing agent dispersion. The screw was designed for high-pressure injection of blowing agent with minimized pressure drop between the first-stage metering section and point of blowing agent injection. The mixing section included 4 flights unbroken at the injection ports so that the orifices were wiped (opened and closed) by the flights. At a screw speed of 80 RPM each orifice was wiped by a flight at a frequency of 5.3 wipes per second. The mixing section and injection system allowed for very rapid establishment of a single-phase solution of blowing agent and polymeric material.

The injection system included air-actuated control valve to precisely meter a mass flow rate of blowing agent at rates from 0.2 to 12 lbs/hr at pressures up to 5500 psi.

The secondary extruder was equipped with a deep channel, three-flighted cooling screw with broken flights, which provided the ability to maintain a pressure profile of microcellular material precursor, between injection of blowing agent and entrance to the point of nucleation (the die, in this case) varying by no more than about 1500 psi, and in most cases considerably less.

The system was equipped, at the exit of the secondary extruder, with a 90 degree adapter and transfer tube mounted horizontally to allow wire to be fed through a Genca LoVol™(Clearwater, Fla.) crosshead mounted at the end of the transfer tube. A die with an exit O.D. of 0.0291 inch was used having a 7 degree included taper. A 0.021 inch diamond tip was used.

24 AWG solid copper wire was fed to the crosshead utilizing a standard payoff system, straightener, and preheater before the crosshead. A cooling trough, nip roll puller, and winder were placed downstream of the crosshead to cool and take up the wire.

A bleed valve was positioned in the transfer tube to provide appropriate flow volume control for thin coating of small wire.

EXAMPLE 3

Extrusion of Microcellular, Flame-Retardant High-Density Polyethylene Onto 24 AWG Solid Copper Wire Polyethylene pellets (Union Carbide UNIGARD-HP™ DGDA-1412 Natural, 1.14 g/cc) were gravity-fed from the hopper of the primary screw into the extrusion system of Example 2. Primary screw speed was 15 RPM giving a total output (bleed and die) of approximately 15 lbs/hr of microcellular material. Secondary screw speed was 3 RPM. Barrel temperatures of the secondary extruder were set to maintain a melt temperature of 336° F. measured at the end of the secondary extruder. $CO_2$ blowing agent was injected at a rate of 0.54 lbs/hr resulting in 3.6 wt % blowing agent in the melt. Pressure profile between the injection ports and the inlet of the crosshead was maintained between 3400 and 4040 psi. Approximately 1.2 lbs/hr fluid microcellular material precursor flowed through the crosshead, which could be controlled by adjustment of the bleed valve.

Figure 15:
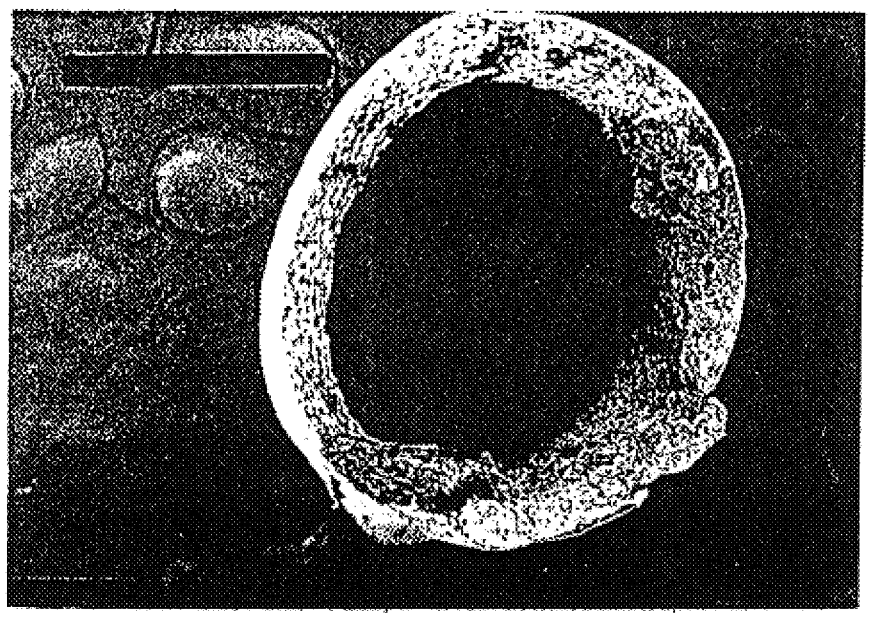
FIG. 15 is a photocopy of a scanning electron micrograph (SEM) image of a cross-section of microcellular polymeric material extrusion coated onto wire, following removal of the wire.
Figure 16:
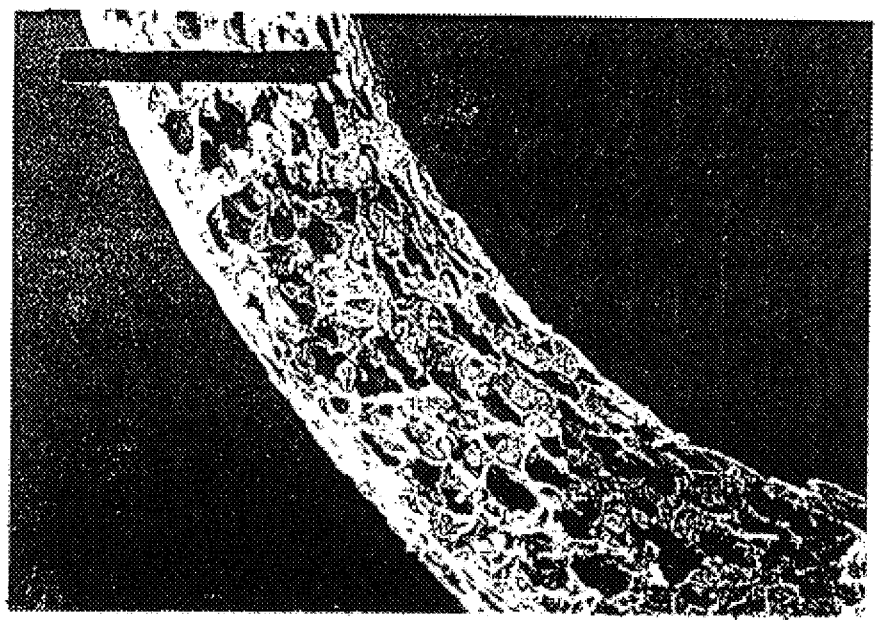
FIG. 16 is a photocopy of an SEM image of the coating of FIG. 15, at higher magnification.

FIGS. 15 and 16 are photocopies of SEM images of cross sections of microcellular wire coating, following removal of wire, according to this example, showing substantially uniform cells of approximately 20 microns average size, with maximum cell size of approximately 25 microns. Material density was approximately 0.96 g/cc, and cell density was approximately $40 \times 10^6$ cells/cc. Average coating thickness was approximately 0.005 inch.

EXAMPLE 4

Extrusion of Very Thin Microcellular Flame-Retardant Polyolefin Wire Coating onto a 24 AWG Solid Copper Wire Flame-retardant filled polyolefin was extrusion coated onto 24 AWG solid copper wire as an extremely thin, microcellular insulating coating.

A tandem extrusion system similar to that of example 2 was used in this example. The system included a 1.5 inch, 33:1 L/D primary extruder, a 2 inch, 24:1 L/D secondary extruder, a cross-head with a pressure-type die (0.0393 inch diameter), wire payoff, wire preheater, wire straightener, cooling trough, belt capstan type puller, and winder. A desiccating drying hopper was used to pre-condition polymer pellets to remove excess moisture.

Flame-retardant filled polyolefin pellets were gravity-fed from the desiccating hopper into the extrusion system. Primary screw speed was 40 RPM giving a calculated mass flow rate of 27.1 lb/hr (no bleed port in use). Secondary screw speed was 8 RPM. Barrel set point temperatures of the secondary extruder were set to maintain a melt temperature of 400° F. (204° C.) at the end of the extruder. $CO_2$ blowing agent was injected at a rate of 0.1 lb/hr resulting in a 0.9% by polymer weight blowing agent in the material. Pressure profile between the injection ports and the inlet to the cross-head was maintained between 4100 psi and 3600 psi, respectively. The estimated pressure before the die was 1500 psi. The wire line speed was approximately 600 fpm. With a cooling trough initial quench distance of 10 inches from the die exit, a 0.016 inch thick coating of microcellular material, with a density reduction of 48% (calculated material density of nominally 0.73 g/cc) of material was produced. Relocation of the cooling trough initial quench distance to 91 inches from the die exit (under otherwise identical conditions) resulted in a 0.013 inch thick coating with a density reduction of 27% (calculated material density of nominally 1.04 g/cc) of the solid material.

Figure 17:
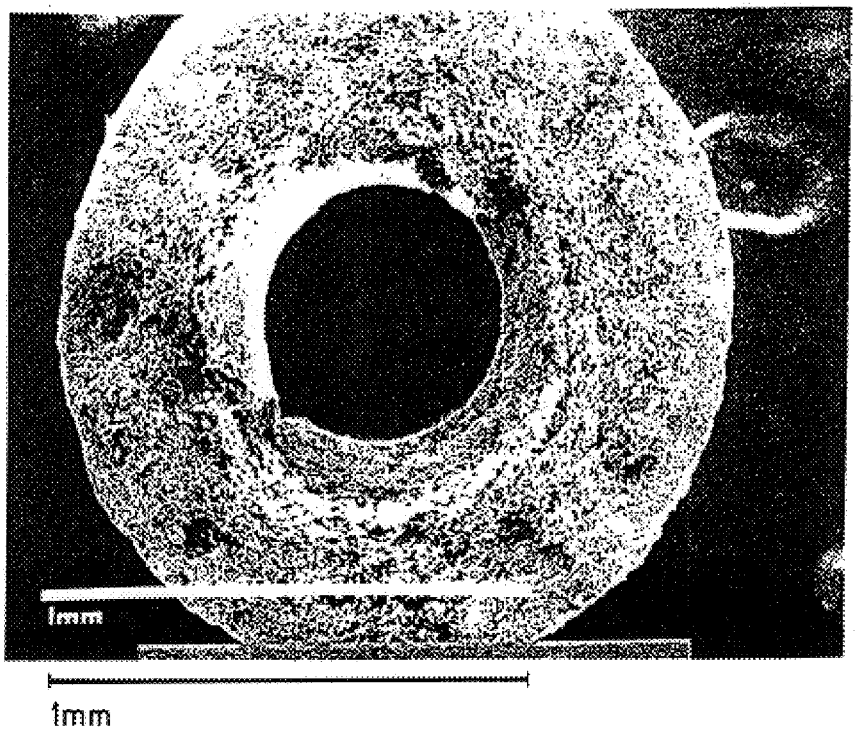
FIG. 17 is a photocopy of an (SEM) image of a cross-section of microcellular polymeric material extrusion coated onto wire, following removal of the wire.
Figure 18:
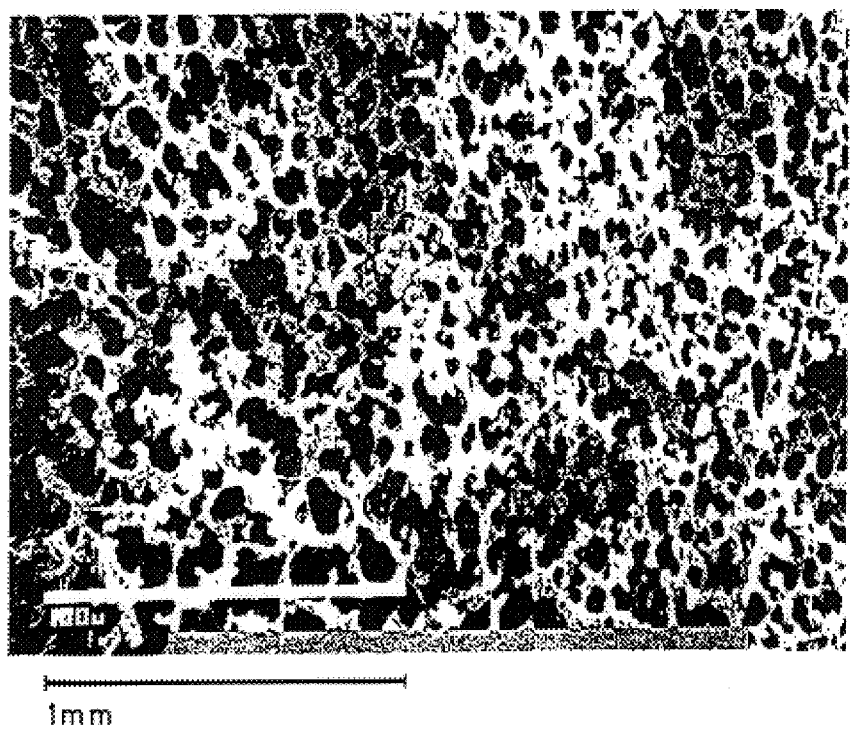
FIG. 18 is a photocopy of an SEM image of the coating of FIG. 17, at higher magnification.
Figure 19:
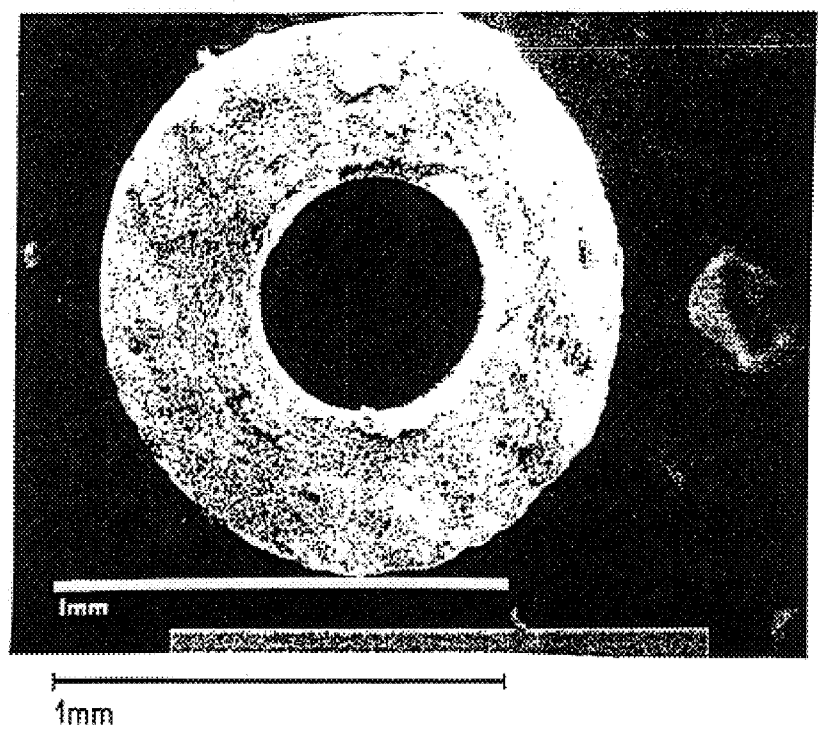
FIG. 19 is a photocopy of an SEM image of a cross-section of another example of microcellular wire coating.
Figure 20:
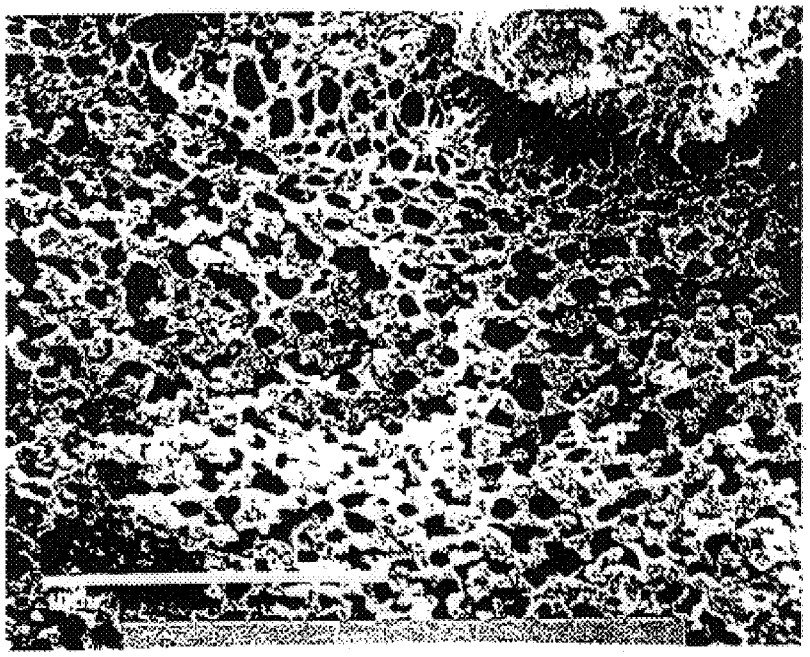
FIG. 20 is a photocopy of an SEM image of the microcellular wire coating of FIG. 19 at higher magnification.

FIGS. 17 and 18 are photocopies of SEM images of cross-sections of the resultant 0.016 inch thick microcellular wire coating, following removal of the wire (for ease of creation of the required fracture profile). Cell sizes range from about 8 to about 10 microns in diameter. FIGS. 19 and 20 are photocopies of SEM images of cross-sections of the 0.013 inch thick microcellular wire coating, following removal of the wire. Cell sizes range from about 5 to about 10 microns in diameter.

Figure 24:
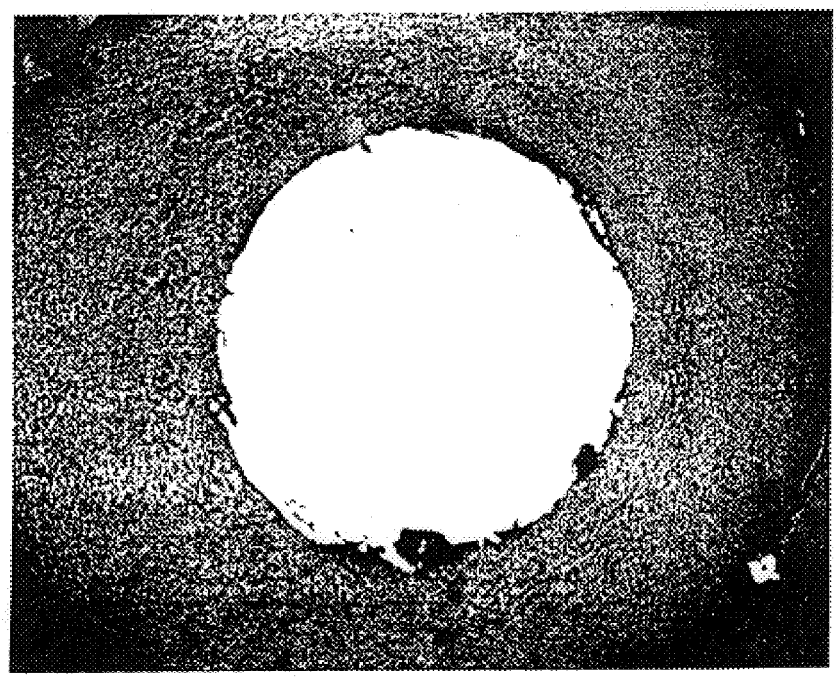
FIG. 24 is a photocopy of an optical micrograph of the wire coating sample of FIGS. 21 and 22, without wire removed, mounted in epoxy.

The microcellular wire coatings of this example essentially surround and are secured to the conductor (wire) with no discernable gap between the inner surface of the microcellular coating and the outer surface of the conductor. FIG. 24 is a photocopy of an optical micrograph of a wire coating sample, without wire removed, mounted in epoxy and sectioned to reveal cross-sectional detail of the rnicrocellular coating and wire. The light area in FIG. 24 is the copper conductor and the darker region is the microcellular wire coating.

The 0.016 inch thick wire coating samples were subjected, prior to removal of wire, to UL 444 Section 6.2 Crash Resistance Tests and all samples passed.

EXAMPLE 5

Extrusion of Very Thin Microcellular Flame-Retardant Polyolefin Wire Coating onto a 24 AWG Solid Copper Wire Flame-retardant filled polyolefin pellets were gravity fed from the hopper into a tandem extrusion system of example 4. Primary screw speed was 55 RPM giving a calculated mass flow rate of 13.7 lbs/hr onto the wire and 17.8 lbs/hr through a bleed port. Secondary screw speed was set at 11 RPM. Barrel set point temperatures of the secondary extruder were set to maintain a melt temperature of 400° F. (204° C.) at the end of the extruder. $CO_2$ blowing agent was injected at a nominal rate of 0.1 lbs per hour resulting in 0.7% by polymer weight blowing agent in the material. Pressure profile between the injection ports and the inlet to the cross-head was maintained between 4900 psi and 4100 psi. The estimated pressure before the die was 2000 psi. Wire line speed was approximately 820 fpm. A die with a 0.032 inch diameter was used. With cooling trough initial quench distance of 19 inches from the die exit, a 0.007 inch thick coating of microcellular material with a density reduction of 20% (from the solid material, calculated material density of nominally 1.13 g/cc) was produced.

Figure 21:
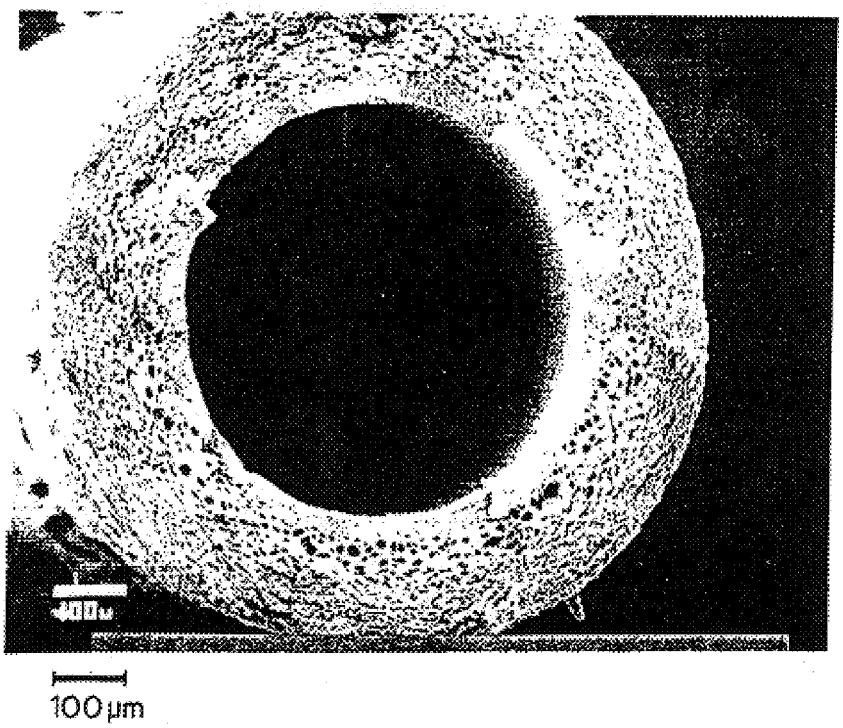
FIG. 21 is a photocopy of an SEM image of a cross-section of another example of microcellular wire coating.
Figure 22:
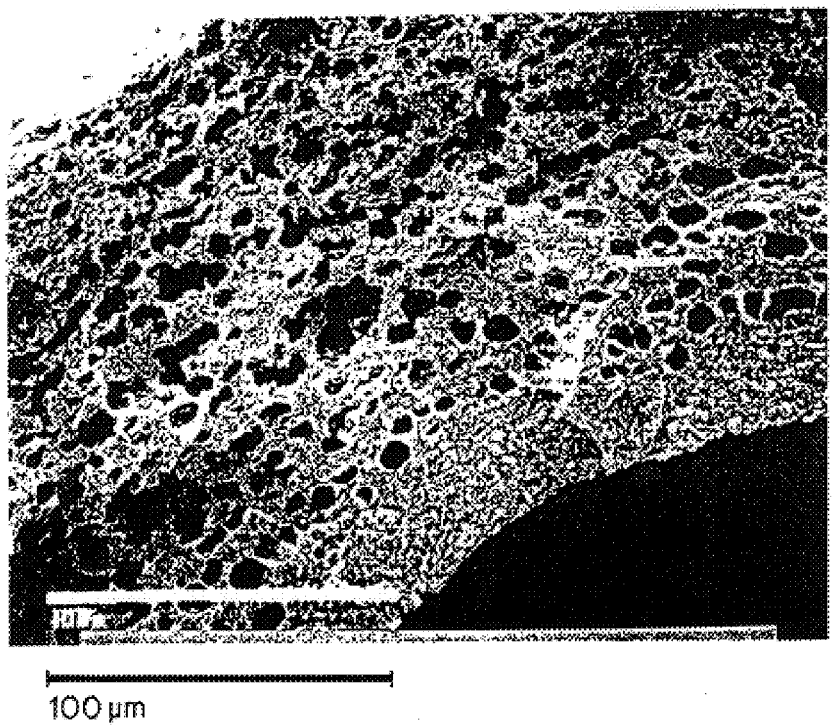
FIG. 22 is a photocopy of an SEM image of the microcellular wire coating of FIG. 21 at higher magnification.

FIGS. 21 and 22 are photocopies of SEM images of cross-sections of the resulting 0.007 inch thick microcellular wire insulating coating, following removal of the wire. Cell sizes range from about 5 to about 10 microns in diameter.

Figure 23:
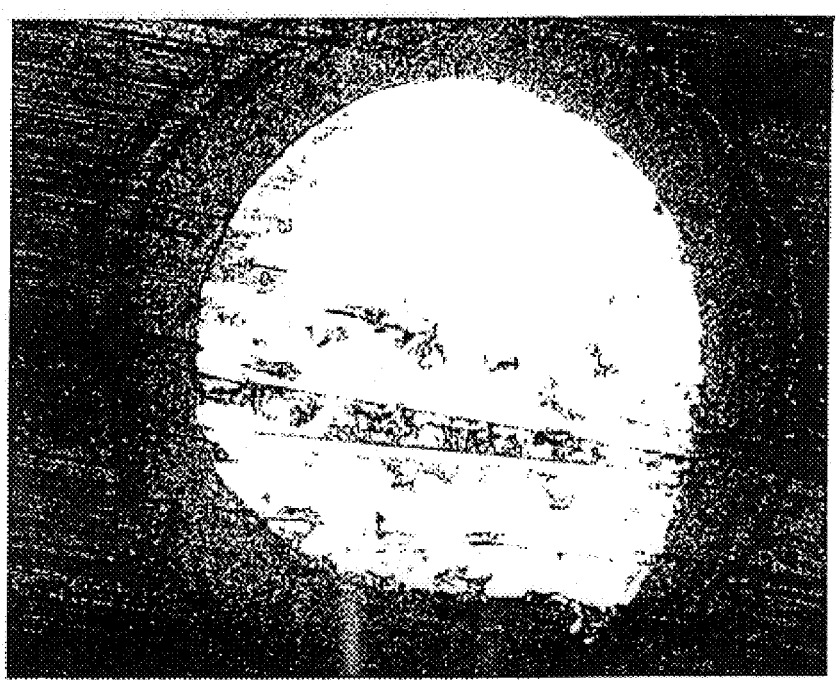
FIG. 23 is a photocopy of an optical micrograph of the wire coating sample of FIGS. 21 and 22, without wire removed, mounted in epoxy.

FIG. 23 is a photocopy of an optical micrograph of the wire coating sample of this example (without wire removed) mounted in epoxy and sectioned to reveal cross-sectional detail of the microcellular coating and wire (light copper conductor; dark: microcellular wire coating). The coating essentially surrounds and secures the conductor with no discernable gap.

The 0.007 inch thick wire coating samples were subjected to the UL 444 Section 6.2 pressure resistance test and all samples past.

EXAMPLE 6

Tandem Extrusion System for Microcellular Material

An Akron tandem extrusion line was arranged as in Example 2 but did not include the adapter, transfer tube, crosshead, die, wire payoff and winder, and bleed valve of Example 2. Instead, mounted at the end of the secondary extruder were a die adapter and a cylindrical rod die with a 0.080 exit orifice and a 0.60 land length. The die adapter was equipped with taps for measurement of melt temperature and pressure just prior to entry into the die.

The system included instrumentation allowing measurement of pressure and temperature of the melt stream at least six locations throughout the tandem system between a location just prior to the blowing agent injection ports to the point of entry into the die to precisely monitor material conditions. Along the screw, melt temperature was measured with infrared equipment to avoid disruption of the melt stream.

EXAMPLE 7 (COMPARATIVE)

Extrusion of Non-Microcellular Polyethylene Terephthalate (PET)

PET pellets (Wellman, 0.8 IV, bottle-grade resin) were dried in a Conair (Franklin, Pa.) drying system at 350 F. for 4 hours prior to use. The pellets were gravity-fed from the drying hopper into an extrusion system of Example 6. Primary screw speed was 26 RPM giving a total output of approximately 53 lbs/hr of material. Secondary screw speed was 5 RPM. Barrel temperatures of the secondary extruder were set to maintain a melt temperature of 532° F. measured at the end of the secondary extruder. $CO_2$ blowing agent was injected at a rate of 1.0 lb/hr resulting in 2.0% blowing agent in the melt. Pressure profile between the injection ports and the inlet of the die was maintained between 2910 and 3100 psi. The pressure drop rate across the die was 2.2 GPa/sec.

Figure 25:
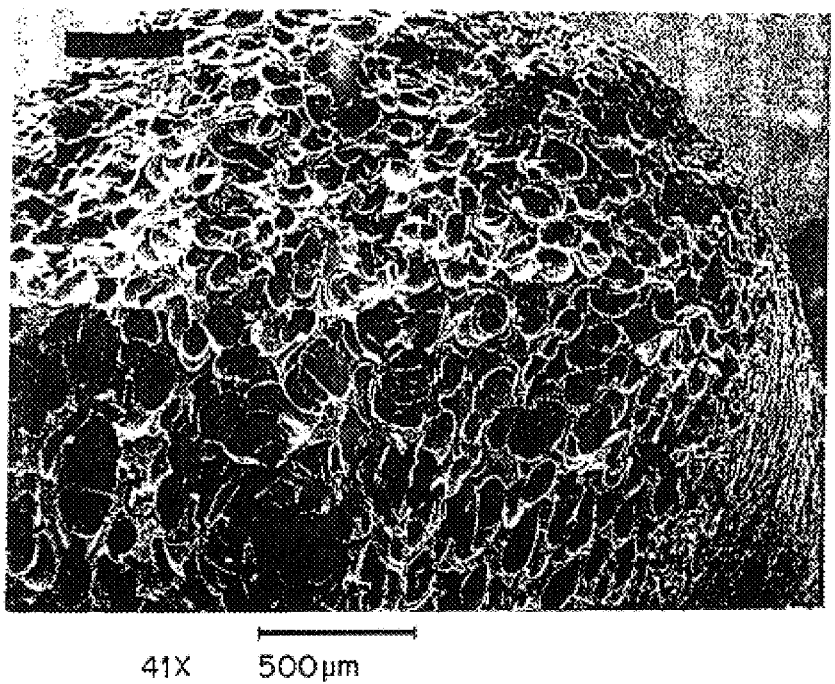
FIG. 25 is a photocopy of an SEM image of cross-section of polyethylene terephthalate (PET) extrudate that is non-microcellular.

FIG. 25 is a photocopy of an SEM image of the cross section of the extrudate, showing relatively large, non-uniform cells of approximately 100 to 300 microns average size.

EXAMPLE 8

Extrusion of Microcellular Polyethylene Terephthalate (PET)

Parameters and equipment were selected as in Example 7, with the exception that primary screw speed was 41 RPM, giving a total output of approximately 85 lbs/hr of microcellular material, $CO_2$ blowing agent was injected at a rate of 1.7 lb/hr resulting in 2.0 wt % blowing agent in the melt, and pressure profile between the injection ports and the inlet of the die was maintained between 3210 and 3430 psi. The pressure drop rate across the die was 3.9 GPa/sec.

Figure 26:
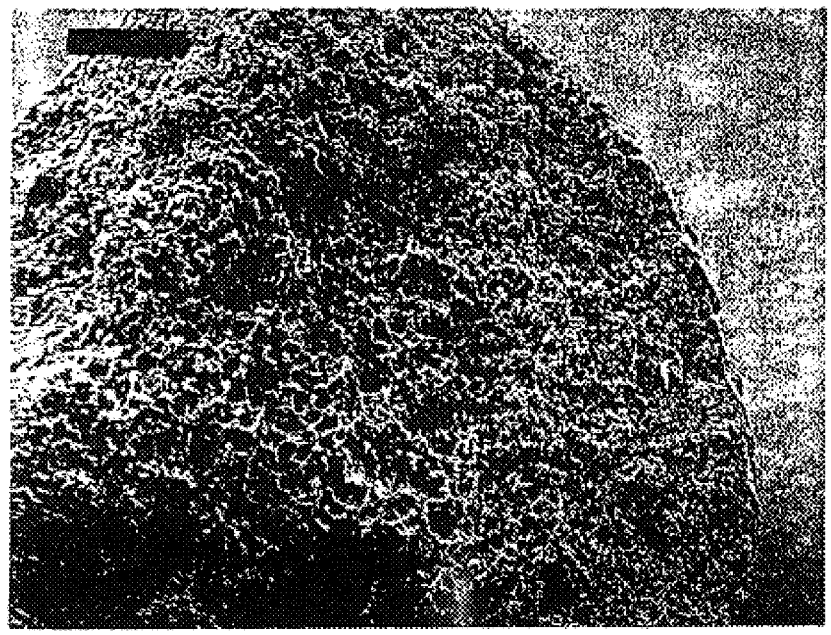
FIG. 26 is a photocopy of an SEM image of a cross-section of microcellular extrudate.

FIG. 26 is a photocopy of an SEM image of the cross section of the extrudate, showing substantially uniform cells of approximately 20 microns average size, with maximum cell size of approximately 40 microns. Material density was approximately 40 lbs/ft$^3$, and cell density was approximately 2.5×10$^8$ cells/cm3.

This example, taken with example 7, demonstrates experimentally that high pressure drop rates, with fixed wt % blowing agent and melt temperatures, yields higher cell densities with smaller cells.

EXAMPLE 9 (COMPARATIVE)

Extrusion of Flame Retardant Polyethylene (FRPE)

FRPE pellets (Union Carbide UNIGARD-HPTM DGDA-1412 Natural, 1.14 g/cc) were gravity-fed from the hopper of the primary extruder into a system of Example 6 including, additionally, a 90 degree adapter and transfer tube mounted horizontally at the exit of the secondary extruder with a Genca LoVol™(Clearwater, Fla.) crosshead at the end of the transfer tube. A bleed valve was positioned in the transfer tube to provide appropriate flow volume control through the die.

Primary screw speed was 25 RPM giving a total output of approximately 32 lbs/hr of material. Secondary screw speed was 8 RPM. Barrel temperatures of the secondary extruder were set to maintain a melt temperature of 331° F. measured at the end of the secondary extruder. $CO_2$ blowing agent was injected at a rate of 0.84 lb/hr resulting in 2.6 wt% blowing agent in the melt. Pressure profile between the injection ports and the inlet of the die was maintained between 2800 and 2280 psi. The pressure drop rate across the die was 0.48 GPa/sec.

Figure 27:
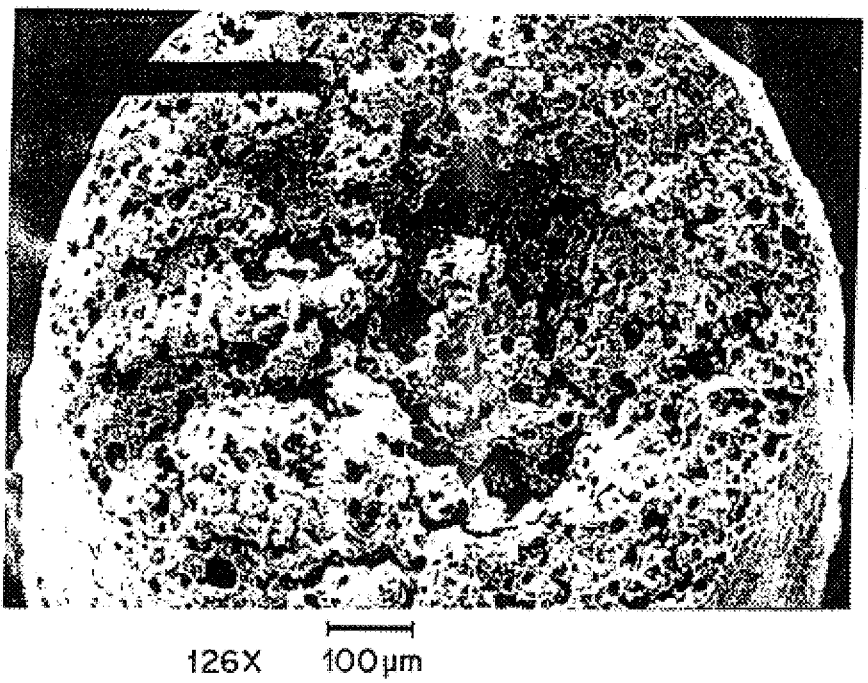
FIG. 27 is a photocopy of an SEM image of a cross-section of non-uniform flame retardant polyethylene (FRP) extrudate.

FIG. 27 is a photocopy of an SEM image of the cross section of the extrudate, showing cells of approximately 25 to 50 microns average size. Material density was approximately 0.8 g/cc, and cell density was approximately 15×10$^6$ cells/cc The extrudate included non-uniform cell distribution with cells significantly larger in the center of the material as compared to areas near the skin, with pronounced decrease in cell density near the center of the extrudate.

EXAMPLE 10

Extrusion of Microcellular Flame Retardant Polyethylene (FRPE)

Parameters and equipment were selected as in Example 9, with the exception that total output was approximately 27 lbs/hr of microcellular material, $CO_2$ blowing agent was present at 3.1 wt % blowing agent in the melt, and pressure profile between the injection ports and the inlet of the die was maintained between 3520 and 3540 psi. The pressure drop rate across the die was 1.1 GPa/sec.

Figure 28:
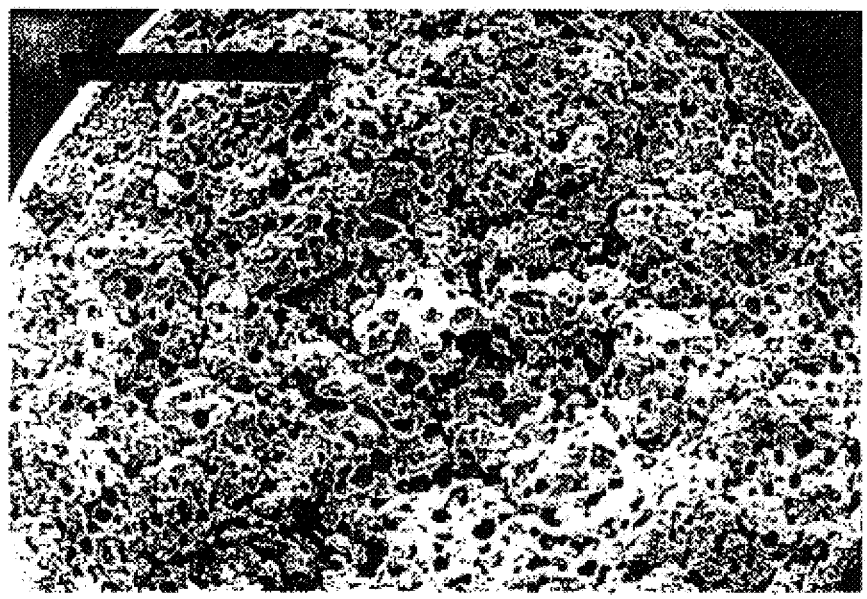
FIG. 28 is a photocopy of an SEM image of a cross-section of microcellular FRPE extrudate.

FIG. 28 is a photocopy of an SEM image of the cross section of the extrudate, showing substantially uniform cells of approximately 17–25 microns average size, with maximum cell size of approximately 35 microns. Material density was approximately 0.85 g/cc, and cell density was approximately 61×10$^6$ cells/cc.

This example, taken with example 9, demonstrates experimentally that high pressure drop rates, with essentially equal wt % blowing agent and melt temperatures, yields higher cell densities with smaller cells.

EXAMPLE 11

Long Single Extrusion System for Microcellular Material

An NRM (Pawcatuck, Conn.) 4.5 inch 44/1 L/D long single extrusion line was equipped with an injection system for injection of $CO_2$ placed at a distance of approximately 25 diameters from the feed section. The injection system included 4 equally-spaced circumferentially, radially-positioned ports, each port including 417 orifices, each orifice of 0.02 inch diameter, for a total of 1668 orifices.

The extruder was equipped with a two-stage screw including conventional first-stage feed, barrier flight transition, and metering sections, followed by a multi-flighted (six flights) mixing section for blowing agent dispersion. The screw was designed for high-pressure injection of blowing agent with minimized pressure drop between the first-stage metering section and point of blowing agent injection. The second stage of the screw included a mixing section having 6 flights unbroken at the injection ports so that the orifices were wiped (opened and closed) by the flights. At a screw speed of 80 RPM each orifice was wiped by a flight at a frequency of 8 wipes per second. The mixing section and injection system allowed for very rapid establishment of a single-phase solution of blowing agent and polymeric material. The injection system included an air-actuated control valve to precisely meter a mass flow rate of blowing agent at rates from 0.2 to 50 lbs/hr at pressures up to 5500 psi. The second stage of the screw was also equipped with a deep channel, three-flighted cooling section with broken flights, which provided the ability to cool the polymer melt stream.

The system included, at the end of the extruder, a die adapter and a cylindrical annular die with a gap of 0.34 inch, inner diameter of 0.4 inch, and land length of 2 inches. The die adapter was equipped with taps for measurement of melt temperature and pressure just prior to entry into the die.

The system included instrumentation allowing measurement of pressure and temperature of the melt stream at least 7 locations throughout the system between a location just prior to the blowing agent injection ports to the point of entry into the die to precisely monitor material conditions. Along the screw, melt temperature was measured with infrared equipment to avoid disruption of the melt stream.

EXAMPLE 12

Extrusion of Non-Microcellular Filled, Plasticized Polyvinyl Chloride (PVC)

PVC pellets (approx. ⅓ wt % filler, highly-plasticized). The pellets were gravity-fed from the hopper into the extrusion system of Example 11. Primary screw speed was 30 RPM giving a total output of approximately 246 lbs/hr of material. Barrel temperatures of the cooling section were set to maintain a melt temperature of approximately 300° F. measured at the end of the extruder. $CO_2$ blowing agent was injected at a rate of 2.5 lbs/hr resulting in 1.6 wt % blowing agent per weight PVC and plasticizer in the melt. The pressure drop rate across the die was 0.3 GPa/sec.

Figure 29:
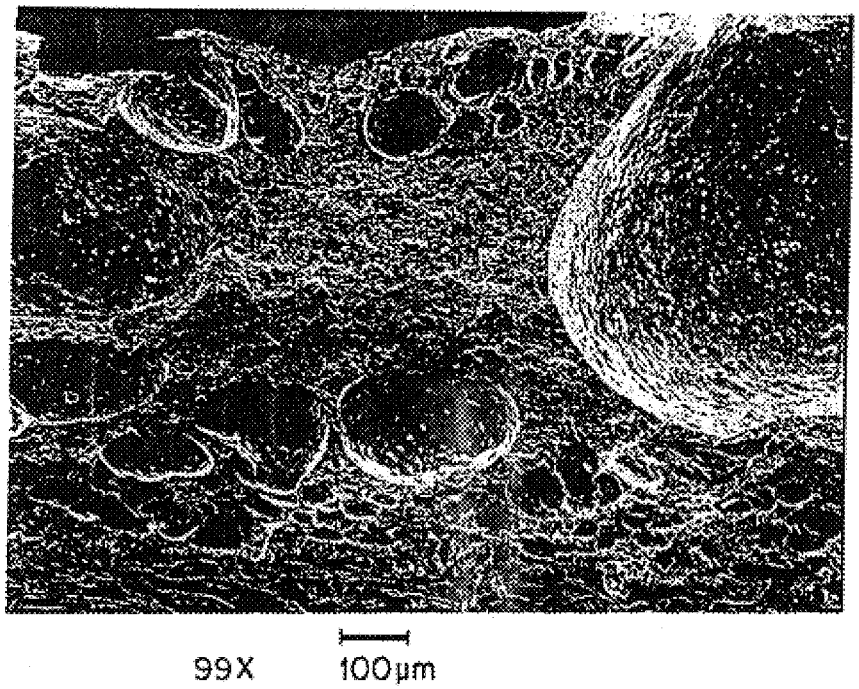
FIG. 29 is a photocopy of an SEM image of a cross-section of non-microcellular, filled, plasticized polyvinyl chloride (PVC) extrudate.

FIG. 29 is a photocopy of an SEM image of the cross section of the extrudate, showing very large, non-uniform cells of greater than 200 microns. Material density was approximately 0.96 g/cc, and cell density was approximately $3 \times 10^4$ cells/cc.

EXAMPLE 13

Extrusion of Microcellular Filled, Plasticized Polyvinyl Chloride (PVC)

Systems and parameters were selected as in Example 12 with the exception that die gap was 0.012 inch, inner diameter 0.538 inch, land length was 0.25 inch. Primary screw speed was 15 RPM giving a total output of approximately 176 lbs/hr of material. $CO_2$ blowing agent was injected at a rate of 1.95 lb/hr resulting in 1.7 wt % blowing agent per weight PVC and plasticizer in the melt. The pressure drop rate across the die was 6.9 GPa/sec.

Figure 30:
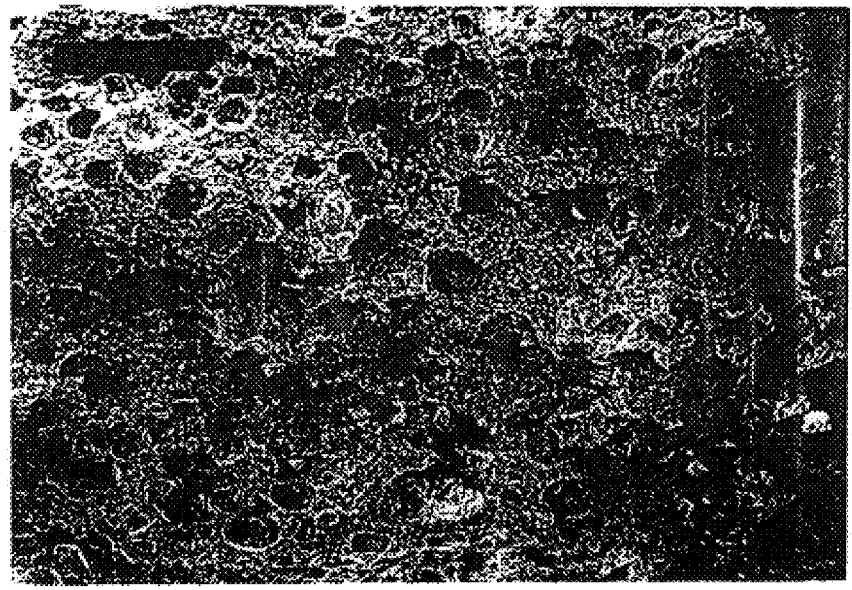
FIG. 30 is a photocopy of an SEM image of a cross-section of microcellular filled, plasticized PVC extrudate.

FIG. 30 is a photocopy of an SEM image of the cross section of the extrudates, showing substantially uniform cells of approximately 20 microns average size, with maximum cell size of approximately 35 microns. Material density was approximately 0.88 g/cc, and cell density was approximately $8 \times 10^7$ cells/cc.

This example, taken with example 12, demonstrates experimentally that high pressure drop rates, with essentially equal wt % blowing agent and melt temperatures, yields higher cell densities with smaller cells.

EXAMPLE 14

Extrusion of Non-Microcellular Polypropylene

A system was used as in Example 6, with the exception that the die land length was 1.2 inches. Polypropylene pellets (PP1602-WF, Quantum Chemical, Cincinnati) were gravity-fed from the hopper into the extrusion system. Primary screw speed was 11.5 RPM giving a total output of approximately 14.4 lbs/hr of material. Secondary screw speed was 4.8 RPM. Barrel temperatures of the secondary extruder were set to maintain a melt temperature of approximately 400° F. measured at the end of the secondary extruder. $CO_2$ blowing agent was injected at a rate of 1.04 lb/hr resulting in 7.2 wt % blowing agent in the melt. Pressure profile between the injection ports and the inlet of the die was maintained between 890 and 1090 psi. The pressure drop rate across the die was 0.15 GPa/sec.

Figure 31:
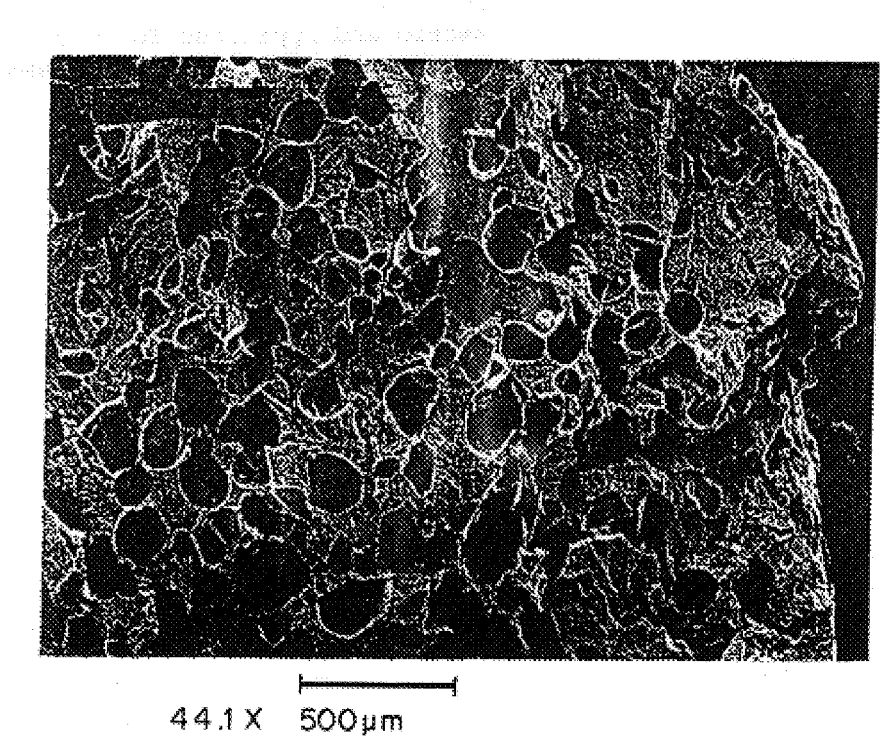
FIG. 31 is a photocopy of an SEM image of a cross-section of non-microcellular polypropylene extrudate.

FIG. 31 is a photocopy of an SEM image of the cross section of the extrudates, showing relatively large cells of approximately 150 microns average sizes Material density was approximately 0.57 g/cc, and cell density was approximately $322 \times 10^3$ cells/cc.

EXAMPLE 15

Extrusion of Microcellular Polypropylene

System and parameters were as in Example 14 with the following exceptions. The die diameter was 0.04 inch, die land length was 0.688 inch. Primary screw speed was 60.5 RPM giving a total output of approximately 45 lbs/hr of material. Secondary screw speed was 20 RPM. $CO_2$ blowing agent was injected at a rate of 3.0 lb/hr resulting in 6.7 wt % blowing agent in the melt. Pressure profile between the injection ports and the inlet of the die was maintained between 2010 and 3420 psi. The pressure drop rate across the die was 15 GPa/sec.

Figure 32:
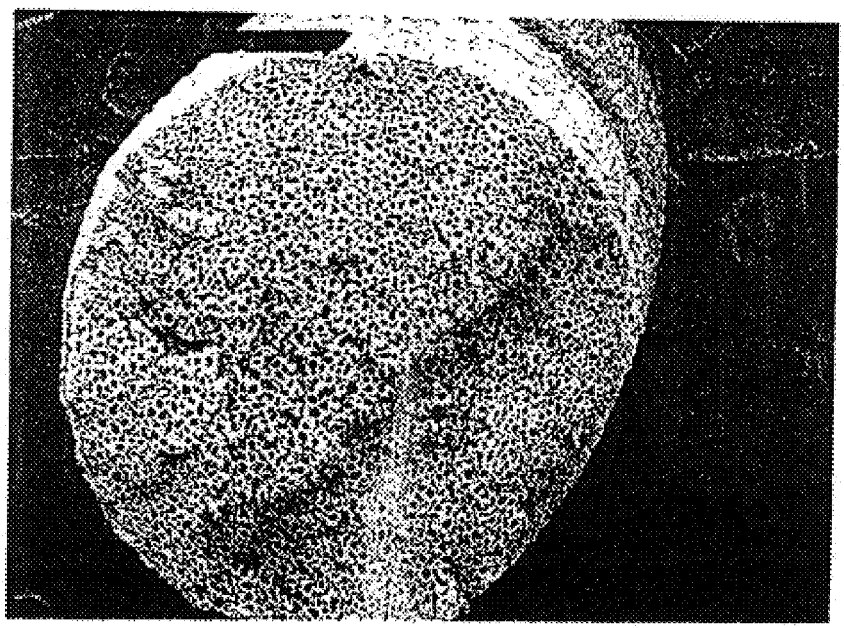
FIG. 32 is a photocopy of an SEM image of a cross-section of microcellular polypropylene extrudate.

FIG. 32 is a photocopy of an SEM image of the cross section of the extrudate, showing essentially uniform microcells of approximately 20 microns average size. Material density was approximately 0.44 g/cc, and cell density was approximately $246 \times 10^6$ cells/cc.

EXAMPLE 16

Extrusion of Relatively Open-Celled Microcellular FRPE

Examples 16 and 17 demonstrate that increasing concentration of $CO_2$ results in interconnected cell structure.

A system was used as in Example 9 with the exception that a straight cylindrical die with die diameter 0.06 and land length 0.688 inch was affixed to the transfer tube instead of the Genca LoVol head.

Primary screw speed was 80.1 RPM giving a total output of approximately 98.8 lbs/hr of material. Secondary screw speed was 28 RPM. Barrel temperatures of the secondary extruder were set to maintain a melt temperature of approximately 340° F. measured at the end of the secondary extruder. $CO_2$ blowing agent was injected at a rate of 5.0 lb/hr resulting in 5.1 wt % blowing agent in the melt. Pressure profile between the injection ports and the inlet of the die was maintained between 2370 and 3940 psi. The pressure drop rate across the die was 7.5 GPa/sec.

Figure 33:
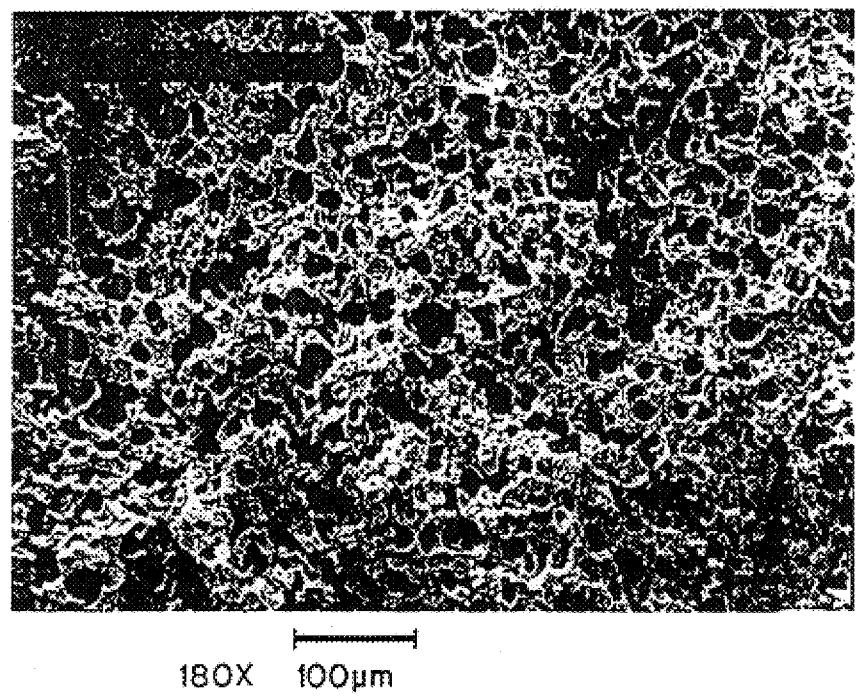
FIG. 33 is a photocopy of an SEM image of a cross-section of relatively open-celled microcellular FRPE extrudate.

FIG. 33 is a photocopy of an SEM image of the cross section of the extrudate, showing relatively open-cell microcellular material having cells of approximately 10–20 microns average size. Material density was approximately 0.85 g/cc, and cell density was approximately $196 \times 10^6$ cells/cc.

EXAMPLE 17

Extrusion of Relatively Closed-cell Microcellular FRPE

A system was used as in Example 16. Primary screw speed was 30.2 RPM giving a total output of approximately 39.4 lbs/hr of material. Secondary screw speed was 8 RPM. Barrel temperatures of the secondary extruder were set to maintain a melt temperature of approximately 340° F. measured at the end of the secondary extruder. $CO_2$ blowing agent was injected at a rate of 1.08 lb/hr resulting in 2.7 wt % blowing agent in the melt. Pressure profile between the injection ports and the inlet of the die was maintained between 1640 and 2810 psi. The pressure drop rate across the die was 2.1 GPa/sec.

Figure 34:
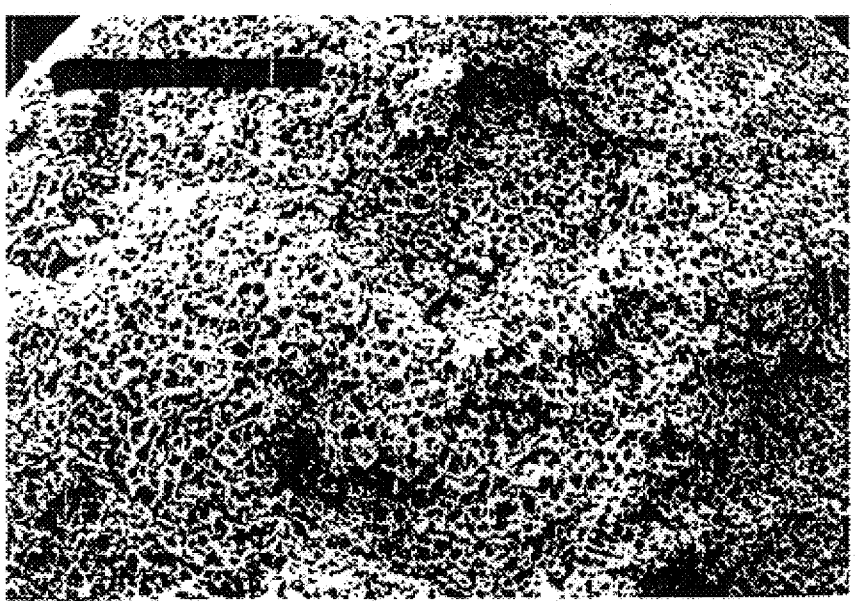
FIG. 34 is a photocopy of an SEM image of a cross-section of relatively closed-cell microcellular FRPE.

FIG. 34 is a photocopy of an SEM image of the cross section of the extrudate, showing relatively closed-cell microcellular material having cells of approximately 20 microns average size. Material density was approximately 0.76 g/cc (relatively lower). Cell density was approximately $119 \times 10^6$ cells/cc. Moisture absorption was less than one-half that of the open-celled material of Example 16. Lower material density and lower moisture absorption indicate a relatively more closed-cell structure.

EXAMPLE 18

Flat Pressure Profile Extrusion System Including Multi-hole Nucleator

Parameters and equipment were selected as in Example 6, with the following exceptions. The screw was designed such that at a screw speed of 59 RPM each orifice was wiped by a flight at a frequency of 3.9 wipes per second.

A multi-hole nucleator (66, FIG. 1) included 88 cylindrical nucleating pathways that did not change in cross-sectional dimension along their length. Each nucleating pathway had a hole diameter of 0.031 inch and a land length of 0.394 inch.

Additionally, the extrudate stands were cooled at exit from the die using a water spray located at approximately one inch from the die face. The water temperature used in the spray system was approximately 70° F.

EXAMPLE 19

Figure 35:
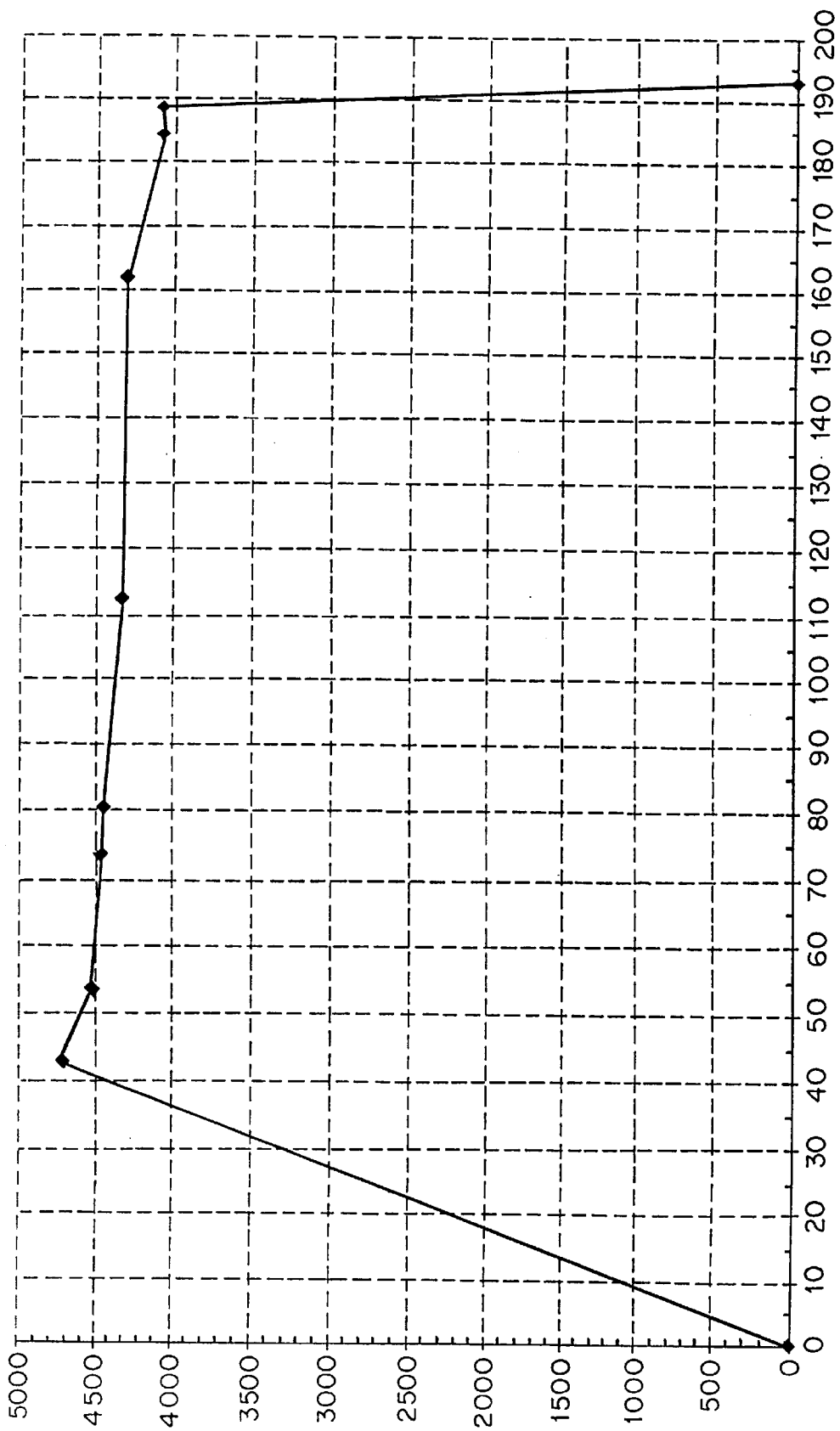
FIG. 35 is a graph of a pressure profile between stabilization after blowing each into injection and nucleation of molten PET containing 6.5% $CO_2$ blowing agent.

Extrusion of Microcellular Polyethylene Terephthalate (PET) Using Multi-hole Nucleator This example demonstrates production foamed, low I.V., unmodified standard production grade, crystalline polymeric material of low density. PET pellets were obtained and processed as in Example 7. A system was used as in Example 18. Primary screw speed was 59 RPM giving a total output of approximately 116 lbs/hr of material. Secondary screw speed was 18 RPM. Barrel temperatures of the secondary extruder were set to maintain a melt temperature of approximately 451° F. measured at the end of the secondary extruder. $CO_2$ blowing agent was injected at a rate of 7.6 lbs/hr resulting in 6.5% blowing agent in the melt. A single-phase solution of $CO_2$ blowing agent and polymer was created in less than one second after injection of the blowing agent, specifically within approximately 0.6 second. The pressure drop rate across the multi-hole nucleator was 0.80 GPa/sec. A very flat pressure profile was maintained between the pressure achieved after injection and the inlet of the nucleating pathways of the multi-hole nucleator was between 4100 and 4520 psi, in a very flat profile (FIG. 35).

Figure 36:
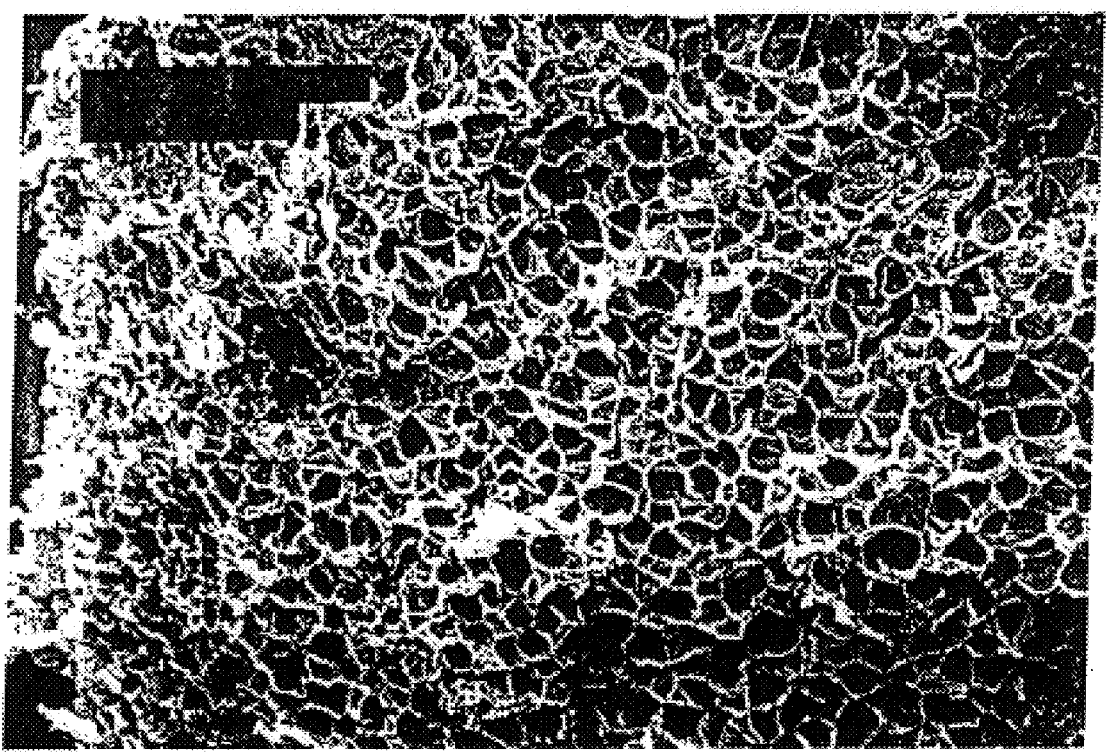
FIG. 36 is a photocopy of an SEM image of a cross-section of microcellular PET extrudate.

FIG. 36 is a photocopy of an SEM image of the cross section of the extrudate, showing substantially uniform cells of approximately 40 microns average size, with maximum cell size of about 65 microns. Material density was approximately 5 lbs/ft$^3$, and cell density was approximately $4.5 \times 10^8$ cells/cm$^3$.

EXAMPLES 20 AND 21

Extrusion of Microcellular, Unfilled, Polyvinylchloride (PVC)

Systems and parameters were selected as in Example 11 with the following exceptions. The extruder was equipped with a rod die with a straight land and exit into ambient. PVC pellets with plasticizer were obtained and extruded.

Example 20: a flow rate of 132 lbs/hr was established. $CO_2$ blowing agent was injected to establish blowing agent at 7.5 wt %. Tie pressure drop rate across the die was 2.75 GPa/S. The die had a circular opening of 95 mils diameter and a land length of 1.52 inches. Microcellular material having average cell size of 60 microns was produced.

Example 21: a flow rate of 271 lbs/hr was established. $CO_2$ blowing agent at 6.83% was introduced and the pressure drop rate was 4.17 GPa/S. The die was the same as in Example 20. Microcellular material having average cell size of 45 microns resulted.

EXAMPLES 22–26

Extrusion of Microcellular, Filled, Polyvinylchloride (PVC)

Systems, parameters and materials were selected as in Examples 20 and 21 with the exception that an annular straight land die into ambient conditions was used, and PVC pellets including approx. ⅓ wt % filler (plasticized) were used. The table below sets forth parameters and results. Gas % is on the basis of lbs of $CO_2$ per lb of PVC and plasticizer.

| Ex. No. | Flow lb/hr | dP/dt GPa/s | Gas % | ΔP psi | Gap mils | Land in. | Cell μ's |
| --- | --- | --- | --- | --- | --- | --- | --- |
| 22 | 241 | .33 | 3.06 | 2880 | 34 | 2 | 80 |
| 23 | 235 | .36 | 3.94 | 3190 | 34 | 2 | 25 |
| 24 | 293 | 1.41 | 2.41 | 3640 | 20 | .85 | 50 |
| 25 | 296 | 1.33 | 3.24 | 3400 | 20 | .85 | 30 |
| 26 | 166 | 6.76 | 4.66 | 4570 | 12 | .25 | 15 |

EXAMPLE 27

Extrusion of Microcellular Material From An Annular Nucleator Separated From An Adjustable Gap Lip Die by a Residence Chamber An NRM (Pawcatuck, Conn.) 2.5 inch 42/1 L/D long single extrusion line was equipped with an injection system for injection of $CO_2$ placed at a distance of approximately 18 diameters from the feed section. The injection system included 4 equally-spaced circumferentially, radially-positioned ports, each port including 305 orifices, each orifice of 0.02 inch diameter, for a total of 1220 orifices.

The extruder was equipped with a two-stage screw including conventional first-stage feed, barrier flight transition, and metering sections, followed by a multi-flighted (six flights) mixing section for blowing agent dispersion. The screw was designed for high-pressure injection of blowing agent with minimized pressure drop between the first-stage metering section and point of blowing agent injection. The second stage of the screw included a mixing section having 6 flights unbroken at the injection ports so that the orifices were wiped (opened and closed) by the flights. The mixing section and injection system allowed for very rapid establishment of a single-phase solution of blowing agent and polymeric material.

The injection system included an air-actuated control valve to precisely meter a mass flow rate of blowing agent at rates from 0.2 to 12 lbs/hr at pressures up to 5500 psi.

The second stage of the screw also included a cooling section equipped with a deep channel, three-flighted then two-flighted cooling section with broken flights, which provided the ability to cool the polymer melt stream.

The system included, at the end of the extruder, a die adapter and a cylindrical annular die with a gap of 0.020 in, inner diameter of 0.88 inch, and land length of 0.45–0.65 inches. The die adapter was equipped with taps for measurement of melt temperature and pressure just prior to entry into the die.

The system included instrumentation allowing measurement of pressure and temperature of the melt stream at least 7 locations throughout the system between a location just prior to the blowing agent injection ports to the point of entry into the die to precisely monitor material conditions. Along the screw, melt temperature was measured with infrared equipment to avoid disruption of the melt stream. An adjustable gap lip section downstream from a nucleator for the purpose of controlling the thickness of foamed sheet was used. The die is shown in FIG. 37 and includes a mandrel 200 consisting of a fixed section 202 and an adjustable section 204. The adjustable section can be positioned away from the fixed section by placing circular shims at locations 206. The die outer body 208 is fixed. The die shown has an annular flow channel 210 diverging from the die centerline by an angle 212 of 45°. Experiments were also performed with a die with a 70° diverging angle. The gap opening 214 is adjustable from 20 mils to 50 mils by the use of shims without changing the nucleator annular gap 216 from atypical value of 20 mils.

The variable gap lip die was used to investigate the influence of die gap opening on product thickness. As an example, polystyrene with 6% by weight $CO_2$ at a flow rate of approximately 84 lb/hr at a melt temperature of approximately 246° F. was shaped in the 70° diverging die at a die lip gap openings of 25 mils and 50 mils. The pressure measured approximately at location 218 for the 25 mil-gap was, as expected, higher (2710 psi) than the pressure (2060 psi) measured for the 50-mil gap. In these experiments, the foamed sheet thickness increased from 100 mils for the die with the 25-mil gap to 150 mils for the die with the 50-mil gap. The differences in cell size and cell density between these two die lip gaps were not considered significant.

EXAMPLE 28

Extrusion of Microcellular PET Using a Converging Die

This example demonstrates production of foamed, low I.V., unmodified standard production grade, crystalline polymeric material of very low density. Parameters and equipment were selected as in Example 6, with the following exceptions. The screw was designed such that at a screw speed of 53 RPM each orifice was wiped by a flight at a frequency of 3.5 wipes per second.

A die with an exit OD of 0.040 inch and an 18.4 degree included taper was used. The taper length of this die was 0.750 inch. Mounted on the outside of the taper length section of the die was a brass cooling block. This cooling block contained channels that allowed flow of heat transfer oil around the die taper length for control of the temperature of the die along the taper length.

PET pellets were obtained and processed as in Example 7. A system was used as in Example 18. Primary screw speed was 53 RPM giving a total output of approximately 96 lbs/hr of material. Secondary screw speed was 18 RPM. Barrel temperatures of the secondary extruder were set to maintain a melt temperature of approximately 472° F. measured at the end of the secondary extruder. $CO_2$ blowing agent was injected at a rate of 6.0 lbs/hr resulting in 6.3% blowing agent in the melt. A single-phase solution of $CO_2$ blowing agent and polymer was created in less than one second after injection of the blowing agent, specifically within approximately 0.6 second. The pressure drop rate across the converging die was 14.9 GPa/sec. A very flat pressure profile was maintained between the pressure achieved after injection and the inlet of the nucleating pathways of the multi-bole nucleator was between 3,580 and 3,250 psi, in a very flat profile.

Figure 38:
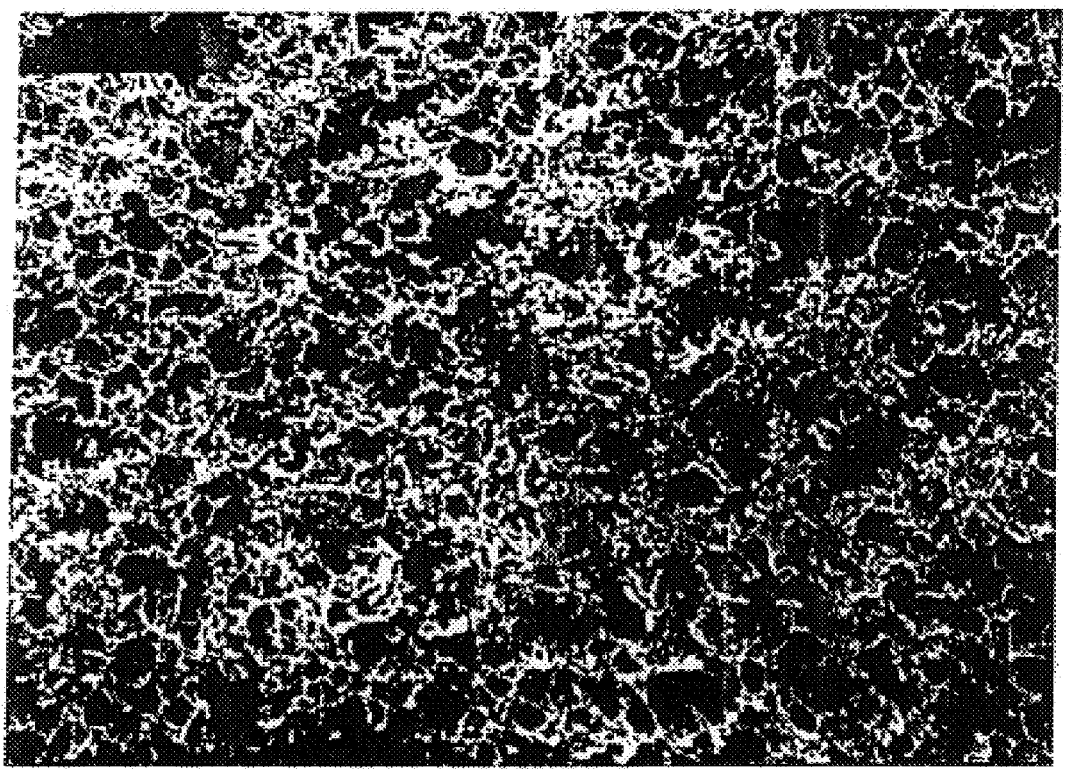
FIG. 38 is a photocopy of an SEM image of the cross section of microcellular PET extrudate.

FIG. 38 is a photocopy of an SEM image of the cross section of the extrudate, showing substantially uniform cells of approximately 40 microns average size, with maximum cell size of about 65 microns. Material density was approximately 3.2 lbs/ft$^3$, and cell density was approximately $7.3 \times 10^{-8}$ cells/cm$^3$.

EXAMPLE 29

A Tandem Extrusion Line for Microcellular Material

A tandem extrusion line including a 27 mm 40:1 L/D counter-rotating twin screw primary extruder (American Leistritz Extruder, Sommervile, N.J.) and a 2½ 46:1 L/D single screw secondary extruder (Akron Extruders, Canal Fulton, Ohio) were arranged in a right angle configuration. A weight loss feeder capable of supplying up to 100 lb/hr was mounted over the feed throat of the primary extruder. Polymer pellets at a precisely controlled output were metered out of the weight loss feeder and gravity fed to the primary extruder. An injection system for the injection of $CO_2$ into the secondary was placed at approximately 8 diameters from the inlet to the secondary. The injection system included 4 equally spaced circumferential, radially-positioned ports, each port including 131 orifices, each orifice of 0.02 inch diameter, for a total of 524 orifices.

The twin screw primary extruder was equipped with matched pair of screws employing conventional feeding, melting, mixing, venting and pressure building sections. The screw pair was designed for dispersion of high filler loading levels and pressure generation. The outlet of this primary extruder was connected to the inlet of the secondary extruder using a short connecting adapter about 8 inches in length.

An injection system included an air actuated control valve to precisely meter a mass flow rate of blowing agent at rates from 0.2 to 21 lbs/hr at pressures up to 5500 psi.

The secondary extruder was equipped with a specially designed screw to provide melt feeding, blowing agent dispersion and cooling of the polymer/blowing agent blend. The melt feeding section was a shallow single flighted section designed to provide a uniform polymer flow and polymer seal prior to blowing agent injection. This section was followed by a multi-flighted blowing agent dispersion section that included six flights unbroken at the injection ports so that the orifices were wiped (opened and closed) by the flights. At a screw speed of 35 rpm, each orifice was wiped at a frequency of 3.5 wipes per second. The cooling section of the screw was a deep channel, three flighted sections which provided to cool the polymer and maintain the pressure profile of the microcellular material precursor, between injection of blowing agent and entrance to the point of nucleation (the die in this case) varying by no more than about 1,500 psi.

The system was equipped, at exit from the secondary extruder, with a die adapter and a 10 inch wide flat die (Production Components, Eau Claire, Wis.) (FIG. 37). The die adapter was equipped with taps for measurement of melt temperature and pressure just prior to entry into the die. The flat die included a conventional coathanger type flow distribution channel and a flex lip adjustment system and die lip set that provided exit gaps from 0.000 to 0.040 inches with a 0.188 inch land length.

Also provided was a conventional three roll stack and tension winder. The three roll stack was equipped with 6 inch diameter rolls and temperature control units that provided roll temperature adjustment from 65° F. to 200° F.

EXAMPLE 30

Extrusion of a Very Thin Polypropylene Sheet

Polypropylene pellets containing 30 weight percent talc were metered into the tandem extrusion line described in example 29.

The weight loss feeder was adjusted to provide an output of 60 lb/hr. Screw speeds were set at approximately 330 rpm on the primary and 38 rpm on the secondary. Secondary barrel temperatures were set to maintain a melt temperature of 350° F. at entrance to the die. $CO_2$ blowing agent was injected at a nominal rate of 0.84 lb/hr resulting in a 2.0% by polymer weight blowing agent in the material. The die gap was adjusted to 0.004 inches. The nip of the three roll stack was set to 0.015 inches and placed approximately 1½ inches from the die exit. Roll temperatures were set at 75° F.

The above conditions produced a product that was 0.020 inch thick by 10 inches wide at a density of 0.67 g/cc. Based on a nominal solid material density of 1.14 g/cc, the achieved density reduction is 41%. The calculated pressure drop across the die land length is approximately X GPa/s.

Figure 39:
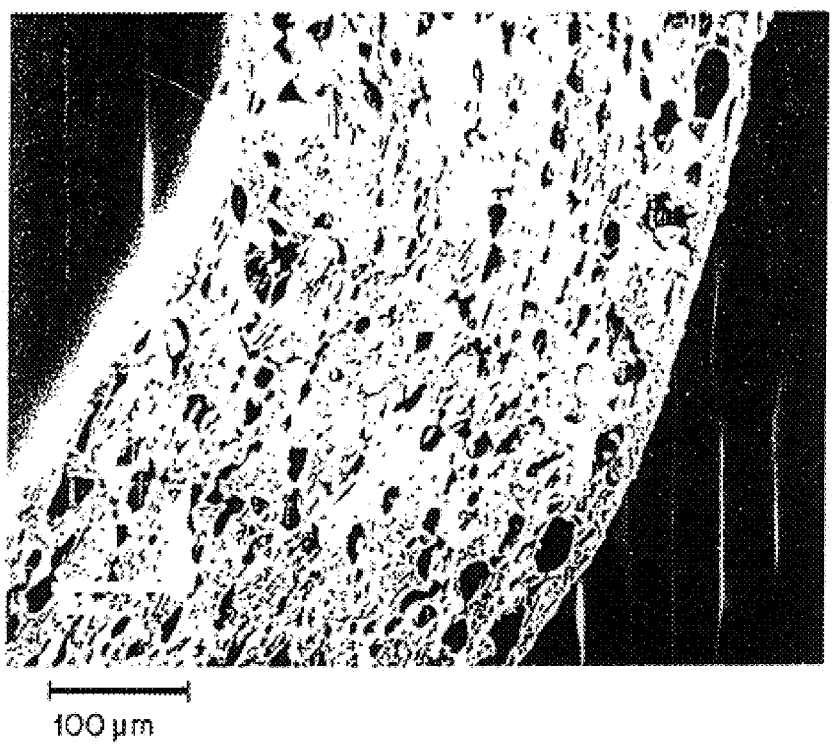
FIG. 39 is a photocopy of an SEM of a cross section of thin microcellular polypropylene.
Figure 40:
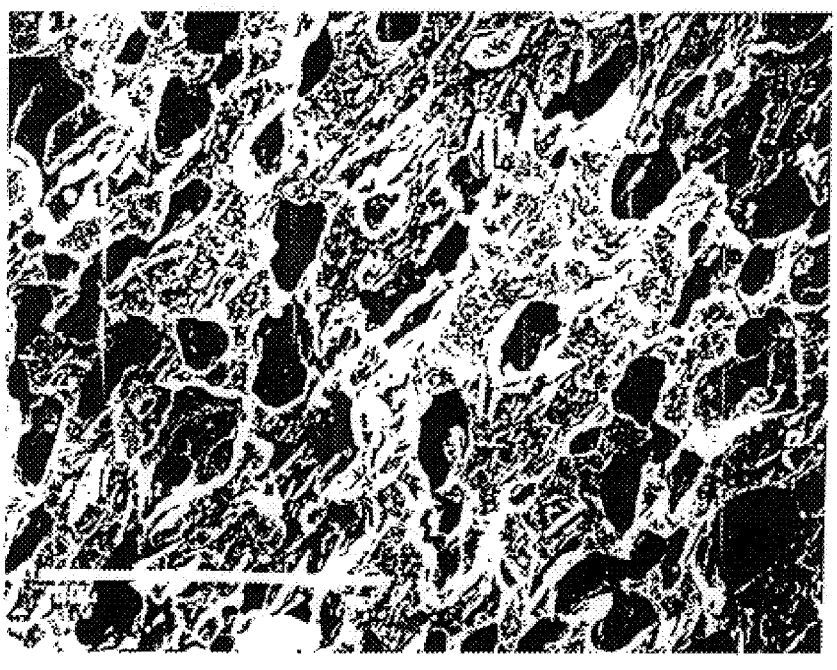
FIG. 40 is a photocopy of an SEM of the material of FIG. 39, at higher magnification.

FIGS. 39 and 40 are photocopies of SEM cross sections of this thin microcellular sheet showing cell sizes from 15 to 35 microns.

EXAMPLE 31

Extrusion of a Very Thin Polypropylene Sheet

Polypropylene pellets containing 30 weight percent talc were metered into the tandem extrusion line described in example 29.

The weight loss feeder was adjusted to provide an output of 60 lb/hr. Screw speeds were set at 333 rpm on the primary and 38 rpm on the secondary. Secondary barrel temperatures were set to maintain a melt temperature of 330° F. at entrance to the die. $CO_2$ blowing agent was injected at a nominal rate of 0.84 lb/hr resulting in a 2% by polymer weight blowing agent in the material. The die gap was adjusted to 0.004 inches. The nip of the three roll stack was set to 0.015 inches and placed approximately 1½ inches from the die exit. Roll temperatures were set at 75° F.

The above conditions produced a product that was 0.15 inch thick by 10 inches wide at a density of 0.80 g/cc. Based on a nominal solid material density of 1.14 g/cc, the achieved density reduction is 30%. The calculated pressure drop across the die land length is approximately 0.87 GPa/s.

Figure 41:
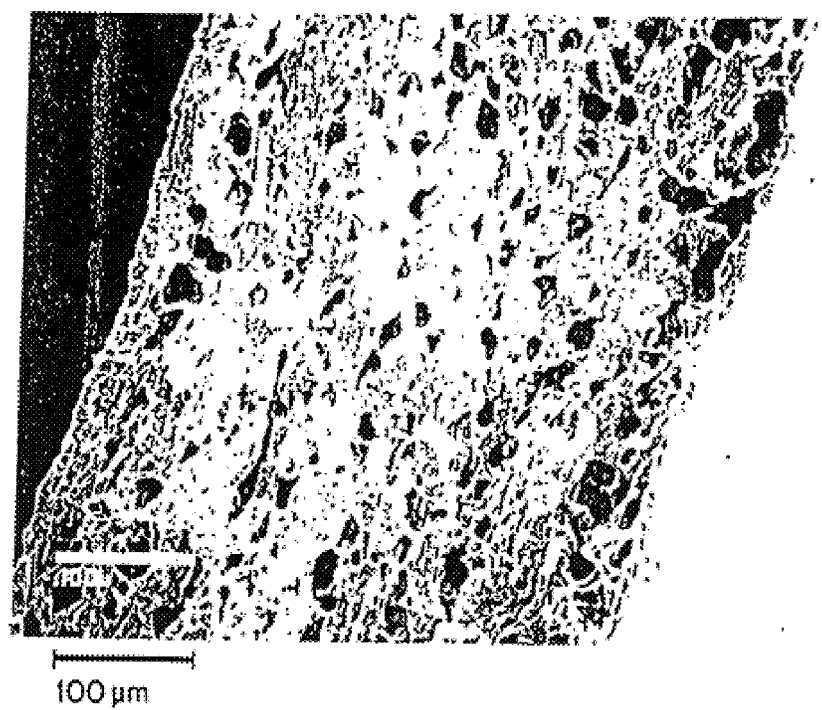
FIG. 41 is a photocopy of an SEM of a cross section of thin microcellular polypropylene of another example.
Figure 42:
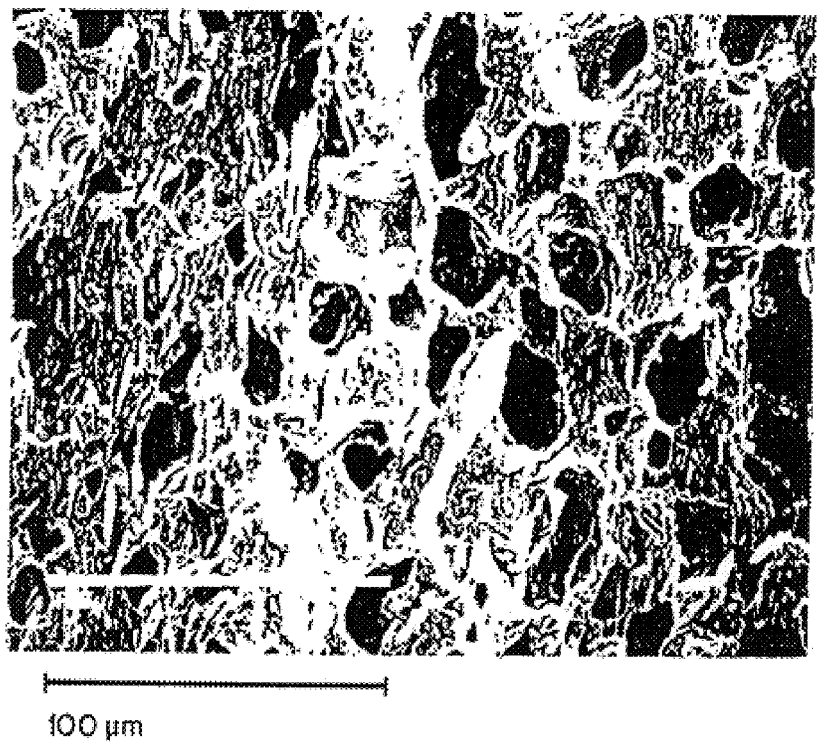
FIG. 42 is a photocopy of an SEM of the material of FIG. 41, at higher magnification.

FIGS. 41 and 42 are photocopies of SEM cross sections of this thin microcellular sheet showing cell sizes ranging from 15 to 35 microns.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method comprising:

establishing a first stream of a fluid, polymeric material;

admixing the first stream with a blowing agent to form a single-phase solution; and continuously nucleating the solution by dividing the stream into separate portions and separately nucleating each of the separate portions at a rate sufficient to form a microcellular polymeric material.

2. A method comprising:

establishing a first stream of a fluid, polymeric material;

admixing the first stream with a blowing agent to form a single-phase solution;

continuously nucleating the solution by dividing the stream into separate portions and separately nucleating each of the separate portions; and recombining the at least two portions to form a recombined stream of homogeneous nucleated, unfoamed fluid polymeric material.

3. A method comprising:

establishing a first stream of a fluid, polymeric material;

admixing the first stream with a blowing agent to form a single-phase solution;

continuously nucleating the solution by dividing the stream into separate portions and separately nucleating each of the separate portions;

recombining the at least two portions to form a single, recombined stream of nucleated, fluid polymeric material;

subjecting the recombined stream to conditions of elevated pressure sufficient to limit growth of cells and to prevent final foaming of the material; and shaping the recombined stream into a desired shape while lowering pressure applied to the stream to a pressure allowing final foaming of the material.

4. A method as in claim 1, wherein continuously nucleating involves creating sites of nucleation of the blowing agent in each of the separate portions by subjecting each of the separate portions to conditions of solubility change sufficient to create sites of nucleation in the solution in the absence of an auxiliary nucleating agent.

5. A method as in claim 1, involving establishing the first stream flowing at a rate of at least about 20 lbs. per hour, diverging the stream into at least two divided streams, and creating sites of nucleation in the at least two streams.

6. A method as in claim 1, wherein the separate portions are nucleated by advancing the separate portions through respective fluid pathways.

7. A method as in claim 6, wherein the fluid pathways are arranged in an annular arrangement.

8. A method as in claim 6, wherein the fluid pathways comprise channels having a non-circular cross section.

9. A method as in claim 1, wherein continuously nucleating involves subjecting the portions to a pressure drop at a pressure drop rate sufficient to create sites of nucleation at a density of at least about $10^6$ sites/cm$^3$.

10. A method as in claim 1, wherein continuously nucleating involves subjecting the portions to a pressure drop at a pressure drop rate of at least about 0.1 GPa/sec to create sites of nucleation.

11. A method as in claim 1, carried out in an extruder that includes a plurality of orifices connected to a blowing agent source and constructed and arranged to introduce the blowing agent into the stream of fluid, polymeric material, while being passed by a flight of a rotating screw, the flight passing each orifice at a rate of at least 0.5 passes per second.

12. A method as in claim 1, carried out in an extruder that includes at least 100 orifices connected to a blowing agent source and constructed and arranged to introduce the blowing agent into the stream of fluid, polymeric material.

13. A method as in claim 1, carried out in an extruder that includes a nucleation region, at which a single-phase solution of fluid polymetric material and blowing agent flowing therethrough is nucleated, and a blowing agent port constructed and arranged to inject blowing agent upstream of the nucleation region, and the fluid polymetric stream, downstream of the blowing port and upstream of the nucleation region, within the extruder, is maintained under pressure varying by no more than about 1000 psi.

14. A method as in claim 1, carried out in an extruder that includes a nucleation region, at which a single-phase solution of fluid polymetric material and blowing agent flowing therethrough is nucleated, and a blowing agent port constructed and arranged to inject blowing agent upstream of the nucleated region, and the fluid polymetric stream, downstream of the blowing agent port and upstream of the nucleation region, within the extruder, is maintained under pressure not less than about 2000 psi and not greater than about 4500 psi.

15. A method as in claim 1, carried out in an extruder that includes a nucleating pathway, in which a single-phase solution of blowing agent and microcellular polymetric material precursor passed therethrough can be nucleated, the nucleating pathway being constructed and arranged to subject the single phase solution to conditions of solubility change sufficient to create sites of nucleation in the solution in the absence of auxiliary nucleating agent.

16. A method as in claim 1, comprising forming microcellular polymeric material that is essentially closed-cell.

17. A method as in claim 2, wherein continuously nucleating involves creating sites of nucleation of the blowing agent in each of the separate portions by subjecting each of the separate portions to conditions of solubility change sufficient to create sites of nucleation in the solution in the absence of an auxillary nucleating agent.

18. A method as in claim 2, involving establishing the first stream flowing at a rate of at least about 20 lbs. per hour, diverging the stream into at least two divided streams, and creating sites of nucleation in the at least two streams.

19. A method as in claim 2, further comprising subjecting the recombined stream to conditions of elevated pressure by constraining and cooling the material.

20. A method as in claim 2, comprising recombining the at least two portions to form a single, recombined stream of nucleated, fluid polymeric material occurs simultaneous to shaping the recombined stream into a desired shape, and the recombined stream is released into ambient conditions.

21. A method as in claim 2, wherein the separate portions are nucleated by advancing the separate portions through respective fluid pathways.

22. A method as in claim 21, wherein the fluid pathways are arranged in an annular arrangement.

23. A method as in claim 21, wherein the fluid pathways comprise channels having a non-circular cross section.

24. A method as in claim 2, wherein continuously nucleating involves subjecting the portions to a pressure drop at a pressure drop rate sufficient to create sites of nucleation at a density of a least about $10^6$ sites/cm$^3$.

25. A method as in claim 2, wherein continuously nucleating involves subjecting the portions to a pressure drop at a pressure drop rate of a least about 0.1 GPa/sec to create sites of nucleation.

26. A method as in claim 2, carried out in an extruder that includes a plurality of orifices connected to a blowing agent source and constructed and arranged to introduce the blowing agent into the stream of fluid, polymeric material, while being passed by a flight of a rotation screw, the flight passing each orifice at a rate of a least 0.5 passes per second.

27. A method as in claim 2, carried out in an extruder that includes at least 100 orifices connected to a blowing agent source and constructed and arranged to introduce the blowing agent into the stream of fluid, polymeric material.

28. A method as in claim 2, carried out in an extruder that includes a nucleation region, at which a single-phase solution of fluid polymeric material and blowing agent flowing therethrough is nucleated, and a blowing agent port constructed and arranged to inject blowing agent upstream of the nucleation region, and the fluid polymeric stream, downstream of the blowing agent port and upstream of the nucleation region, within the extruder, is maintained under pressure varying by no more than about 1000 psi.

29. A method as in claim 2, carried out in an extruder that includes a nucleation region, at which a single-phase solution of fluid polymeric material and blowing agent flowing therethrough is nucleated, and a blowing agent port constructed and arranged to inject blowing agent upstream of the nucleation region, and the fluid polymeric stream, downstream of the blowing agent port and upstream of the nucleation region, within the extruder, is maintained under pressure not less than about 2000 psi and not greater than about 4500 psi.

30. A method as in claim 2, carried out in an extruder that includes a nucleating pathway, in which a single-phase solution of blowing agent and microcellular polymeric material precursor passed therethrough can be nucleated, the nucleating pathway being constructed and arranged to subject the single phase solution to conditions of solubility change sufficient to create sites of nucleation in the solution in the absence of auxiliary nucleating agent.

31. A method as in claim 2, comprising forming microcellular polymeric material that is essentially closed-cell.

32. A method as in claim 3, wherein continuously nucleating involves creating sites of nucleation of the blowing agent in each of the separate portions by subjecting each of the separate portions to conditions of solubility change sufficient to create sites of nucleation in the solution in the absence of an auxiliary nucleating agent.

33. A method as in claim 3, involving establishing the first stream flowing at a rate of at least about 20 lbs. per hour, diverging the stream into at least two divided streams, and creating sites of nucleation in the at least two streams.

34. A method as in claim 3, wherein subjecting the recombined stream to conditions of elevated pressure involves constraining and cooling the material.

35. A method as in claim 3, involving shaping the recombined stream and exposing the shaped, recombined stream to ambient conditions to produce a microcellular foamed article having a minimum cross-sectional dimension of at least 1/8 inch.

36. A method as in claim 35, involving exposing the shaped, recombined stream to ambient conditions to produce a microcellular foamed article having a cross-sectional dimension of at least 1/4 inch.

37. A method as in claim 3, wherein recombining the at least two portions to form a single, recombined stream of nucleated, fluid polymeric material occurs simultaneous to shaping the recombined stream into a desired shape, and the recombined stream is released into ambient conditions.

38. A method as in claim 3, wherein the separate portions are nucleated by advancing the separate portions through respective fluid pathways.

39. A method as in claim 38, wherein the fluid pathways are arranged in an annular arrangement.

40. A method as in claim 38, wherein the fluid pathways comprise converging channels.

41. A method as in claim 38, wherein the fluid pathways comprise channels having as essentially circular cross section.

42. A method as in claim 38, wherein the fluid pathways comprise channels having a non-circular cross section.

43. A method as in claim 38, wherein the fluid pathways comprise channels having an essentially rectangular cross section.

44. A method as in claim 42, wherein the cross sections of respective channels are tapered.

45. A method as in claim 3, wherein continuously nucleating involves subjecting the portions to a pressure drop at a pressure drop rate sufficient to create sites of nucleation at a density of a least about $10^6$ sites/cm$^3$.

46. A method as in claim 3, wherein continuously nucleating involves subjecting the portions to a pressure drop at a pressure drop rate of a least about 0.1 GPa/sec to create sites of nucleation.

47. A method as in claim 3, wherein continuously nucleating involves subjecting the portions to a pressure drop at a pressure drop rate of at least about 1 GPa/sec to create sites of nucleation.

48. A method as in claim 3, carried out in an extruder that includes a plurality of orifices connected to a blowing agent source and constructed and arranged to introduce the blowiing agent into the stream of fluid, polymeric material, while being passed by a flight of a rotating screw, the flight passing each orifice at a rate of a least 0.5 passes per second.

49. A method as in claim 3, carried out in an extruder that includes a plurality of orifices connected to a blowing agent source and constructed and arranged to introduce the blowing agent into the stream of fluid, polymeric material, while being passed by a flight of a rotation screw, the flight passing each orifice at a rate of at least 8 passes per second.

50. A method as in claim 3, carried out in an extruder that includes at least 100 orifices connected to a blowing agent source and constructed and arranged to introduce the blowing agent into the stream of fluid, polymeric material.

51. A method as in claim 3, carried out in an extruder that includes at least 300 orifices connected to a blowing agent source and constructed and arranged to introduce the blowing agent into the stream of fluid, polymeric material.

52. A method as in claim 3, wherein the blowing agent is introduced at a rate of at least 1 lbs. per hour into the stream of fluid, polymeric material.

53. A method as in claim 3, carried out in an extruder that includes a nucleation region, at which a single-phase solution of fluid polymeric material and blowing agent flowing therethrough is nucleated, and a blowing agent port constructed and arranged to inject blowing agent upstream of the nucleation region, and the fluid polymeric stream, downstream of the blowing agent port and upstream of the nucleation region, within the extruder, is maintained under pressure varying by no more than about 1000 psi.

54. A method as in claim 3, carried out in an extruder that includes a nucleation region, at which a single-phase solution of fluid polymeric material and blowing agent flowing therethrough is nucleated, and a blowing agent port constructed and arranged to inject blowing agent upstream of the nucleation region, and the fluid polymeric stream, downstream of the blowing agent port and upstream of the nucleation region, within the extruder, is maintained under pressure not less than about 2000 psi and not greater than about 4500 psi.

55. A method as in claim 3, wherein the first stream of fluid, polymeric material is established in the extruder at a rate of at least about 40 lbs. per hour.

56. A method as in claim 3, wherein the first stream of fluid, polymeric material is established in the extruder at a rate of at least about 120 lbs. per hour.

57. A method as in claim 3, carried out in an extruder that includes a nucleating pathway, in which a single-phase solution of blowing agent and microcellular polymeric material precursor passed therethrough can be nucleated, the nucleating pathway being constructed and arranged to subject the single phase solution to conditions of solubility change sufficient to create sites of nucleation in the solution in the absence of auxiliary nucleating agent.

58. A method as in claim 3, comprising forming microcellular polymeric material that is essentially closed-cell.

59. A method as in claim 3, comprising continuously extruding polymeric material having a minimum cross-sectional dimension of less than about 0.25 mm.

60. A method as in claim 3, comprising continuously extruding microcellular polymeric material that is essentially free of foam-controllability modifiers.

61. A method as in claim 3, comprising continuously extruding microcellular polymeric material that comprises PET.

62. A method as in claim 3, comprising continuously extruding microcellular polymeric material that comprises PET of I.V. less than about one.

63. A method as in claim 3, comprising continuously extruding microcellular polymeric material that comprises polyproplene.

64. A method as in claim 3, comprising continuously extruding microcellular polymeric material that comprises PE.

65. A method as in claim 3, comprising continuously extruding microcellular polymeric material has a density of less than about 8 lbs./ft$^3$.

66. A method as in claim 3, comprising continuously extruding microcellular polymeric material that includes filler.

67. A method as in claim 3, comprising continuously extruding microcellular polymeric material that includes at least about 10% filler.

68. A method as in claim 3, comprising continuously extruding microcellular polymeric material that includes at least about 25% filler.

69. A method as in claim 3, comprising continuously extruding microcellular polymeric material that is devoid of nucleating agents including filler.

70. A method as in claim 3, wherein the blowing agent is an atmospheric gas when under ambient conditions.

71. A method as in claim 3, wherein the blowing agent is supercritical carbon dioxide.

72. A method as in claim 3, wherein the blowing agent is a chemical blowing agent.

* * * * *